United States Patent
Maruyama et al.

(10) Patent No.: US 8,428,849 B2
(45) Date of Patent: Apr. 23, 2013

(54) ENGINE CONTROL PROGRAM, METHOD AND APPARATUS

(75) Inventors: Tsugito Maruyama, Yamato (JP); Arata Ejiri, Machida (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/528,364

(22) Filed: Jun. 20, 2012

(65) Prior Publication Data

US 2012/0265425 A1 Oct. 18, 2012

Related U.S. Application Data

(63) Continuation of application No. PCT/JP2009/071212, filed on Dec. 21, 2009.

(51) Int. Cl.
*G06F 19/00* (2011.01)
*F02M 25/07* (2006.01)
*F02B 47/08* (2006.01)
*F02B 33/44* (2006.01)

(52) U.S. Cl.
USPC ............. 701/103; 700/108; 60/602; 60/605.2

(58) Field of Classification Search ................... 123/563, 123/568.12, 568.21; 701/102–104, 108, 701/110; 60/599, 600, 602, 605.2
See application file for complete search history.

(56) References Cited

U.S. PATENT DOCUMENTS

| | | | |
|---|---|---|---|
| 6,973,785 B2 | 12/2005 | Umchara et al. | |
| 7,117,078 B1 * | 10/2006 | Gangopadhyay | 701/103 |
| 7,165,399 B2 * | 1/2007 | Stewart | 60/605.2 |
| 7,275,374 B2 * | 10/2007 | Stewart et al. | 60/602 |
| 7,328,577 B2 * | 2/2008 | Stewart et al. | 60/605.2 |
| 7,836,693 B2 | 11/2010 | Fujita et al. | |
| 2007/0012030 A1 | 1/2007 | Shirakawa | |
| 2011/0077836 A1 * | 3/2011 | Ejiri et al. | 701/102 |
| 2011/0077837 A1 * | 3/2011 | Ejiri et al. | 701/102 |

FOREIGN PATENT DOCUMENTS

| | | |
|---|---|---|
| JP | 10-252550 | 9/1998 |
| JP | 2000-170580 | 6/2000 |
| JP | 2004-36413 | 2/2004 |
| JP | 2006-183557 | 7/2006 |
| JP | 2007-315371 | 12/2007 |

OTHER PUBLICATIONS

International Search Report of PCT/JP2009/071212 mailed Jan. 19, 2010.

* cited by examiner

*Primary Examiner* — Willis R Wolfe, Jr.
(74) *Attorney, Agent, or Firm* — Staas & Halsey LLP

(57) ABSTRACT

Setting values of a fuel injection quantity for an engine having an exhaust gas recirculator (EGR) and variable nozzle turbo (VNT), and an engine speed, and measurement values of a manifold air pressure (MAP) and a mass air flow (MAF) are obtained. According to a combination of the reference values of an EGR valve opening degree and a VNT nozzle opening degree, which correspond to the setting values, or a combination of a control value of the EGR valve opening degree by a MAF controller and a control value of the VNT nozzle opening degree by a MAP controller, which correspond to the measurement values, a mode that the MAF and MAP controllers, a first interference compensator from the MAF controller to the MAP controller and a second interference compensator for the reverse direction are enabled and a mode that the MAF or MAP controller is enable are dynamically switched.

8 Claims, 38 Drawing Sheets

ENGINE CONTROL PROGRAM, METHOD AND APPARATUS

CROSS-REFERENCE TO RELATED APPLICATIONS

This application is a continuing application, filed under 35 U.S.C. section 111(a), of International Application PCT/JP2009/071212, filed Dec. 21, 2009.

FIELD

This technique relates to a technique for controlling an engine.

BACKGROUND

In a recent engine (e.g. diesel engine), in order to reduce the emission and improve the fuel-efficiency, the Mass Air Flow (MAF) and Manifold Air Pressure (MAP) are controlled optimally by an intake gas control system.

Typically, as illustrated in FIG. 1, the intake gas control system of the diesel engine includes a MAP control system and MAF control system, and MAP and MAF are independently controlled each other. In order to reduce Particulate Matters (PM) in the exhaust gas, the MAP control system controls a nozzle diameter of a Variable Nozzle Turbo (VNT) to control the MAP. On the other hand, in order to reduce nitrogen oxides (NOx) in the exhaust gas, the MAF control system controls a degree of the valve aperture of an Exhaust Gas Recirculator (EGR) that recirculates the exhaust gas into a cylinder to control MAF. Optimum target values of MAP and MAF, which were experimentally determined according to driving conditions (e.g. injection quantity, engine speed), are outputted to these control systems, and a reference value of the VNT nozzle aperture degree and a reference value of the EGR valve aperture degree are also outputted as feedforward values to the aforementioned control systems by a planning unit. Thus, conventionally, the MAP control system and MAF control system independently operate, and this is called "Single Input Single Output" (SISO). In the SISO control, when the MAP control system and MAF control system interfere with each other, it becomes difficult to simultaneously trace the targets of the MAP and MAF.

Thus, as illustrated in FIG. 2, a cooperative control system is considered in which interference compensators (i.e. first and second interference compensators) compensate the interference of these two control systems. Such a control system is called "Multi-Input Multi-Output" (MIMO) cooperative control system. In this cooperative control system, the control input by the first interference compensator from the MAP control system to the MAF control system and the control input by the second interference compensator from the MAF control system to the MAP control system compensate the interference between both of the control systems in the engine. By introducing this MIMO cooperative control system (hereinafter, which is abbreviated "MIMO control system"), it is said that it is possible to improve the target follow-up characteristic.

Incidentally, there is a technique for the EGR control system, in which, when the EGR valve is opened from an entirely closed state, chattering and/or overshoot is suppressed by adding a slope, hysteresis or time-delay to the target opening degree in the open control. In addition, a technique for stabilizing the control by setting the hysteresis when switching the feedback control target between the high pressure EGR and the low pressure EGR exists in an internal combustion engine using both of the high pressure EGR and the low pressure EGR.

The reduction of the emission is strongly requested from a viewpoint of the environment problem, and a control method is proposed that the completely-closed state of the EGR and VNT is positively utilized in the planning unit. However, the inventor of this application newly found that the emission, especially NOx, increases when the MIMO control system utilizing such a completely-closed state of the EGR and VNT is adopted.

SUMMARY

This engine control method includes (A) obtaining a setting value of a fuel injection quantity for an engine having an exhaust gas recirculator (EGR) and a variable nozzle turbo (VNT), a setting value of an engine speed, a measurement value of a manifold air pressure (MAP) of the engine and a measurement value of amass air flow (MAF) of the engine; and (B) controlling a MAF control system of the engine, a MAP control system of the engine, a first interference compensation system from the MAF control system to the MAP control system and a second interference compensation system from the MAP control system to the MAF control system according to a combination of a reference value of an EGR valve opening degree and a reference value of a VNT nozzle opening degree which correspond to the setting value of the fuel injection quantity and the setting value of the engine speed or a combination of a control value of the EGR valve opening degree by the MAF control system, which corresponds to the measurement value of the MAF, and a control value of the VNT nozzle opening degree by the MAP control system, which corresponds to the measurement value of the MAP. Then, the controlling includes (B1) upon detecting that both of a first condition and a second condition are not satisfied, enabling the MAP control system, the MAP control system, the first interference compensation system and the second interference compensation system, wherein the first condition is a condition that the reference value or the control value of the EGR valve opening degree is within a range considered as being completely closed or completely opened, and the second condition is a condition that the reference value or the control value of the VNT nozzle opening degree is within a range considered as being completely closed or completely opened; (B2) upon detecting that the first condition is satisfied and the second condition is not satisfied, disabling the MAF control system, the first interference compensation system and the second interference compensation system or adjusting outputs of the MAF control system, the first interference compensation system and the second interference compensation system, and enabling the MAP control system; and (B3) upon detecting that the second condition is satisfied and the first condition is not satisfied, disabling the MAP control system, the first interference compensation system and the second interference compensation system or adjusting outputs of the MAP control system, the first interference compensation system and the second interference compensation system, and enabling the MAF control system.

DESCRIPTION OF EMBODIMENTS

Embodiment 1

Figure 3:
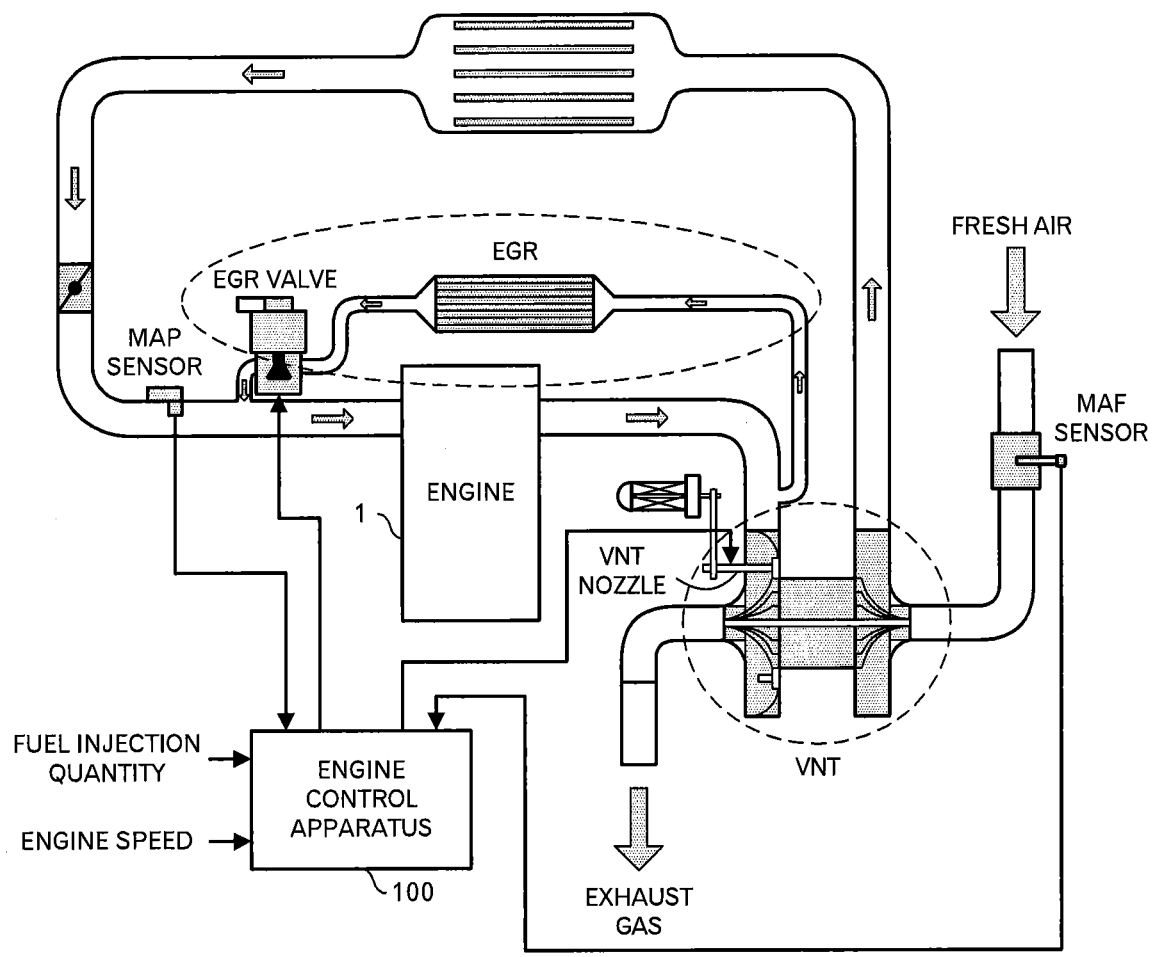
FIG. 3 is a diagram representing an outline of an engine.

FIG. 3 illustrates a diesel engine as one example of an engine relating to an embodiment of this technique. An Exhaust Gas Recirculator EGR to provide exhaust gas from an engine body 1 and a Variable Nozzle Turbo VNT to compress and provide fresh air to the engine body 1 by rotating a turbine by the pressure of the exhaust gas are coupled to the engine body 1. By adjusting a nozzle opening (or aperture) degree of the VNT, the rotation of the turbine of the VNT is adjusted, and a Manifold Air Pressure (MAP) measured by a MAP sensor is adjusted. On the other hand, by adjusting a valve opening (or aperture) degree of an EGR valve provided in the EGR, a Mass Air Flow (MAF) measured by a MAF sensor is adjusted.

A MAP measurement value from the MAP sensor, MAF measurement value from the MAF sensor, a setting value of the fuel injection quantity, which is given from the outside, and a setting value of the engine speed, which is also given from the outside, are inputted to the engine control apparatus 100 relating to this embodiment. Moreover, the valve opening degree of the EGR valve is outputted to the EGR valve from the engine control apparatus 100, and the nozzle opening degree of the VNT nozzle is outputted to the VNT nozzle from the engine control apparatus 100.

As described above, the reduction of the emission is strongly requested in view of the environment issue, and a control method is proposed that the completely-closed state is actively utilized in the planning unit. However, it is observed that the emission, especially NOx, increases when changing from the control that does not utilize the completely-closed state in the MIMO control system (hereinafter, referred to the MIMO control (without saturation)) to the control that utilizes the completely-closed state (hereinafter, the MIMO control (with saturation)).

Figure 4:
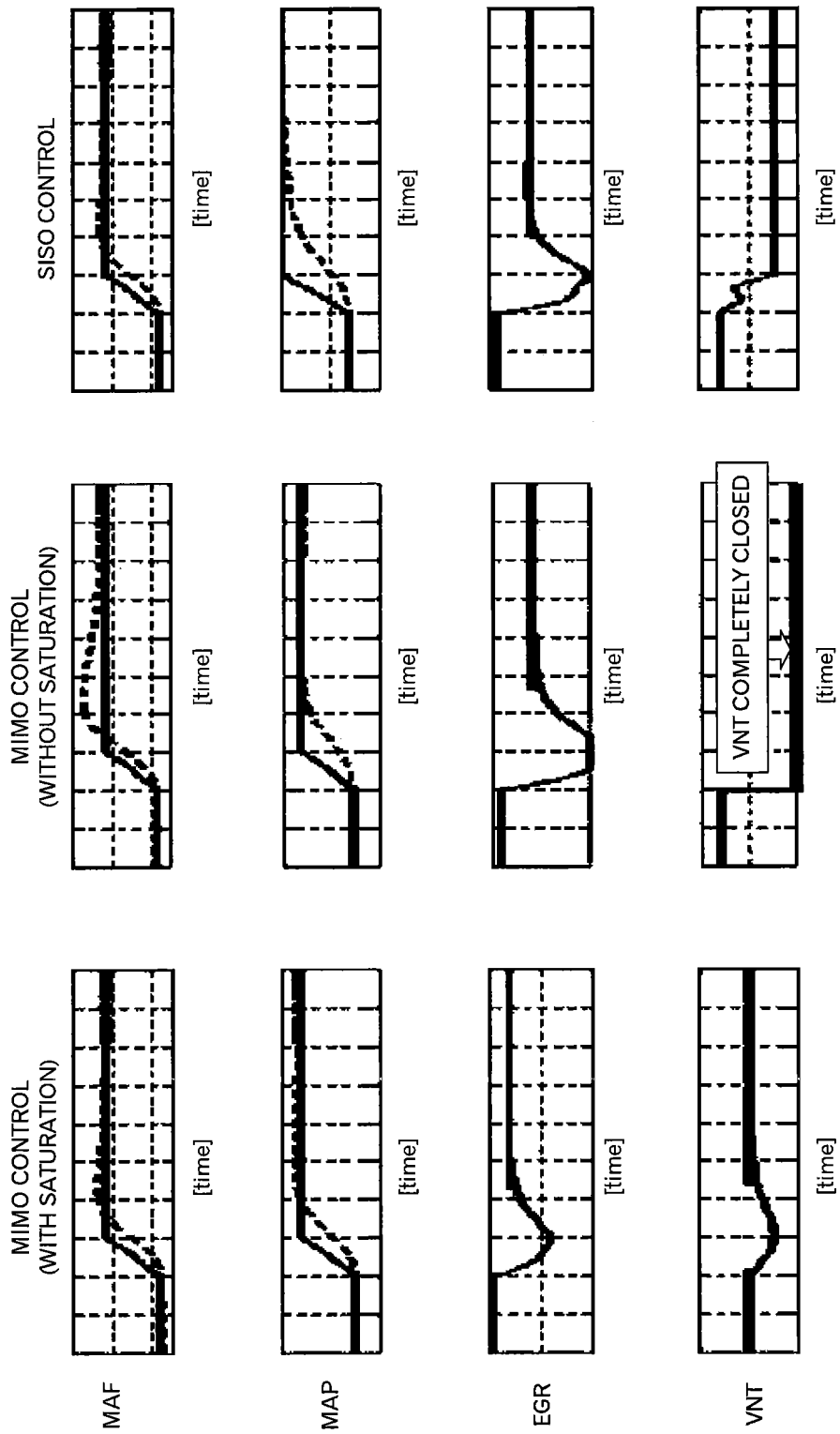
FIG. 4 is a diagram to explain a problem of a conventional technique.

This cause is simply described using FIG. 4. The left column of FIG. 4 represents temporal changes of the MAF, MAP, opening degree of the EGR valve and opening degree of the VNT nozzle in case of the MIMO control (without saturation). Moreover, the central column of FIG. 4 represents temporal changes of the MAP, MAF, opening degree of the EGR valve and opening degree of the VNT nozzle in case of the MIMO control (with saturation). Furthermore, the right column of FIG. 4 represents temporal changes of the MAP, MAF, opening degree of the EGR valve and opening degree of the VNT nozzle in case of the SISO control. Incidentally, the solid lines represent target values in the wave form charts of the MAF and MAP, and the dotted lines represent the actual values in the wave form charts of the MAF and MAP.

The noticeable points are the temporal changes of the MAF and opening degree of the VNT nozzle, and the opening degree of the VNT nozzle is not completely closed in the MIMO control (without saturation), however, there is a portion that the opening degree of the VNT nozzle is completely closed in the MIMO control (with saturation). Then, when confirming the temporal change of the MAF, a little overshoot (O/S) occurs in the MIMO control (without saturation), however, a large overshoot occurs in the MIMO control (with saturation). This large overshoot causes the increase of NOx. Incidentally, as will be explained later, the MIMO control (with saturation) is effective for PM of the emission, and when taking into consideration other elements, it is understood that the MIMO control (with saturation) is totally better. Although it is not drawn in figures, it is also understood that the undershoot reversely occurs in the MIMO control, in view of the temporal change of the MAF when the VNT valve is completely opened.

Then, in this embodiment, the SISO control is partially introduced. Namely, the SISO control is introduced for cases where the VNT nozzle is completely closed, the EGR valve is completely closed or both of them occur. In the SISO control, as being understood from the wave forms of the MAF in the right side of FIG. 4, the overshoot becomes small, and it is possible to reduce NOx. In addition, the SISO control is also introduced for cases where the VNT nozzle is completely opened, the EGR valve is completely opened or both of them occur. Thus, the aforementioned undershoot is improved, and it is similarly possible to reduce NOx.

Figure 5:
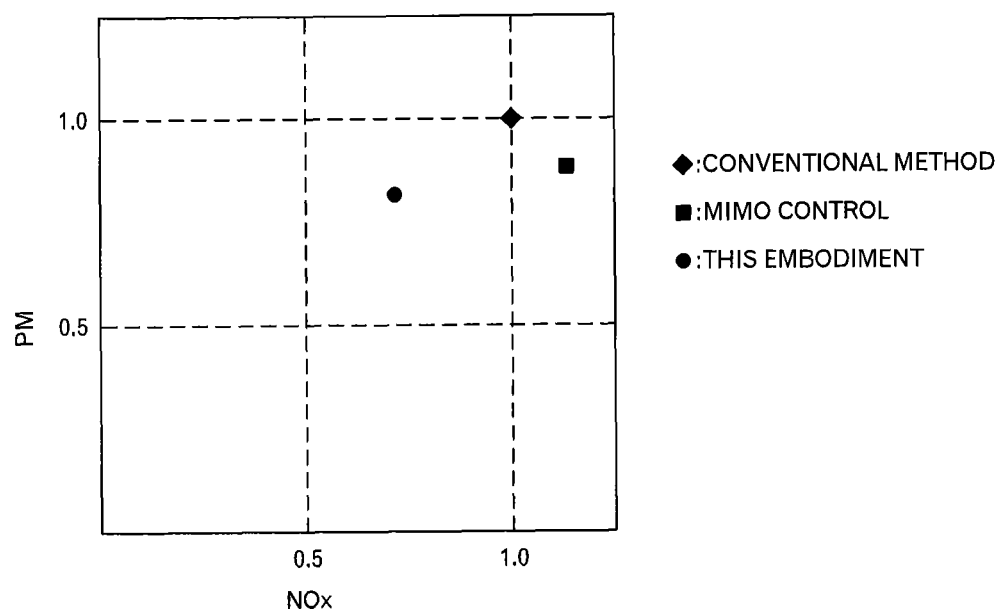
FIG. 5 is a diagram to explain the problem of the conventional technique and an effect of this embodiment of this technique.

FIG. 5 represents a relationship between quantities of NOx and PM. In FIG. 5, the vertical axis represents the quantity of PM, and the horizontal axis represents the quantity of NOx. Assuming that the quantity of PM is "1", and the quantity of NOx is "1" in case of the conventional method (i.e. two independent SISO controls), a diamond-shape point is plotted for the conventional method, and a rectangular point is plotted for the MIMO control (with saturation). Namely, NOx increases, however, PM decreases. On the other hand, by adopting a method for dynamically switching the MIMO control and SISO control like in this embodiment, a circle point is plotted. In other words, both of NOx and PM decrease compared with the two former methods, and it is understood that this embodiment is effective.

Figure 6:
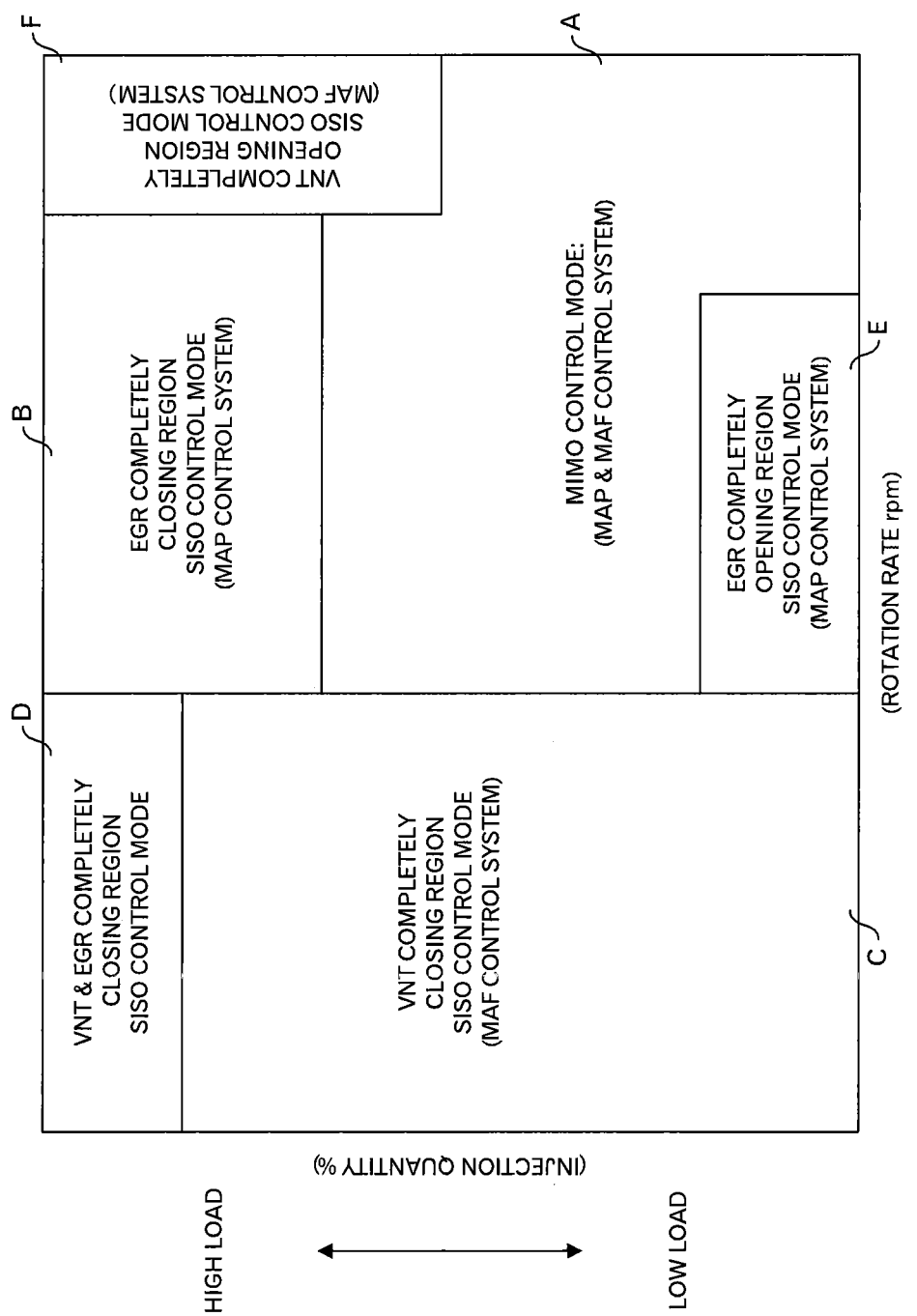
FIG. 6 is a diagram representing a control mode distribution diagram.

FIG. 6 illustrates in what case the MIMO control and SISO control should be switched. In FIG. 6, the vertical axis represents the fuel injection quantity (%), and the horizontal axis represents the rotation rate (rpm). The upper portion of FIG. 6 represents a high load state, and the lower portion of FIG. 6 represents a low load state. Moreover, the left side of FIG. 6 represents a low-speed rotation state, and the right side of FIG. 6 represents a high-speed rotation state. As illustrated in FIG. 6, such a plane is divided into 6 regions A to F. More specifically, in the EGR completely opening region E that covers a middle-speed rotation state and a part of the high-speed rotation state in the low load state, the MAP control system is enabled in the SISO control mode to completely open the EGR valve. In addition, in the EGR completely closing region B that covers the middle-speed rotation state and a part of the high-speed rotation state in the high load state, the MAF control system is enabled in the SISO control mode to completely close the EGR valve. Furthermore, in the VNT completely opening region F that covers a middle load state and the high load state in the high-speed rotation state, the MAF control system is enabled in the SISO control mode to completely open the VNT nozzle. Moreover, in the region A that is obtained by excluding the regions B, E and F in the middle-speed rotation state and the high-speed rotation state, the MAF control system, MAP control system and first and second interference compensators are enabled in the MIMO control mode. On the other hand, in the VNT completely closing region C that covers the low-speed rotation state, the VNT nozzle is controlled to be completely closed. Namely, the MAF control system is enabled in the SISO control mode. However, in the VNT and EGR completely closing region D that covers the very high load state in the low-speed rotation state, the VNT nozzle and the EGR valve are also controlled so as to be completely closed. In this region, the control is in the SISO control mode, however, all of the MAP control system, MAF control system and first and second interference compensators are disabled. According to such mode distribution, the mode switching is carried out when stepping over the boundary of the regions.

Figure 1:
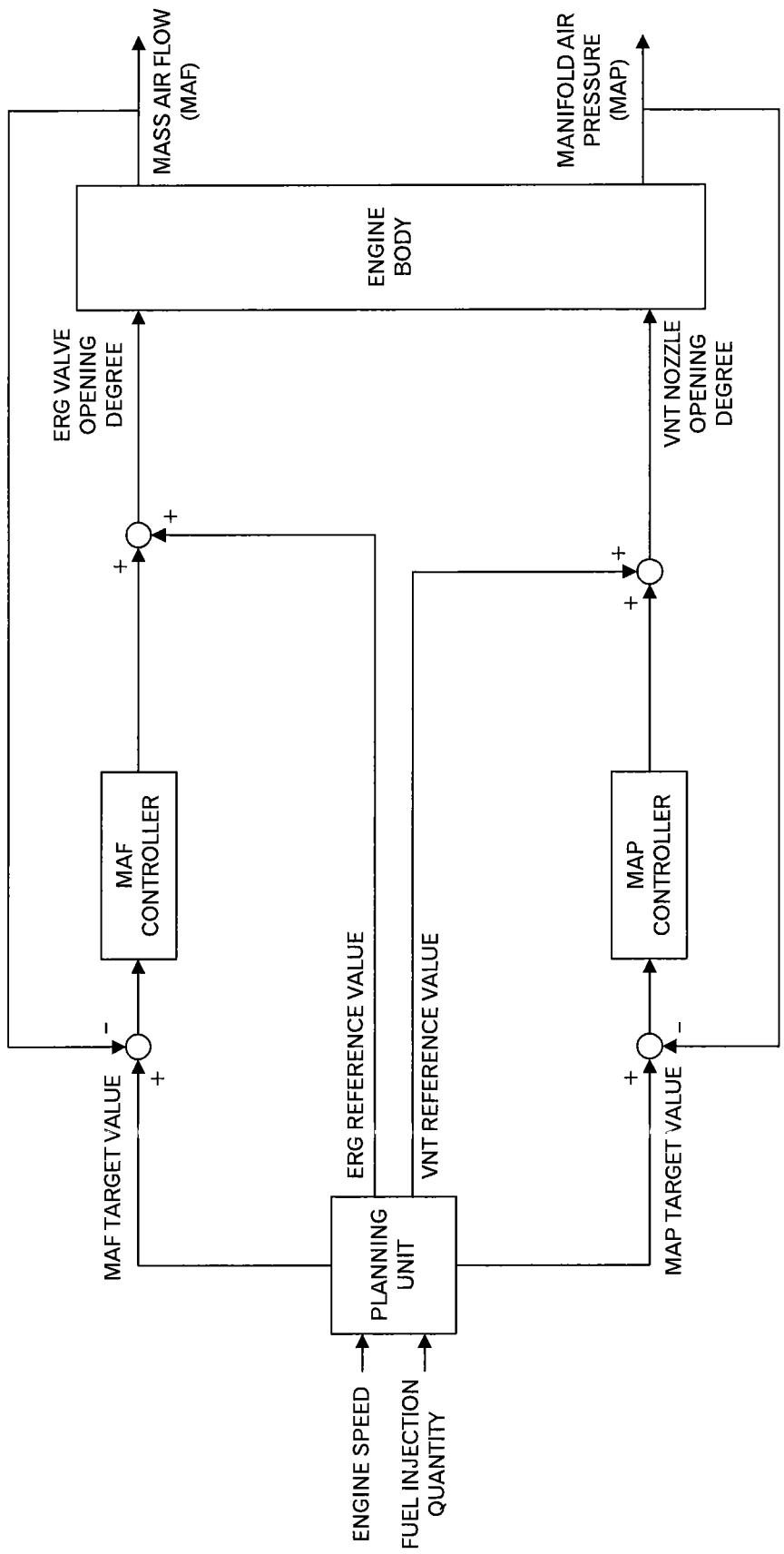
FIG. 1 is a diagram depicting a block diagram of a conventional engine control apparatus.
Figure 2:
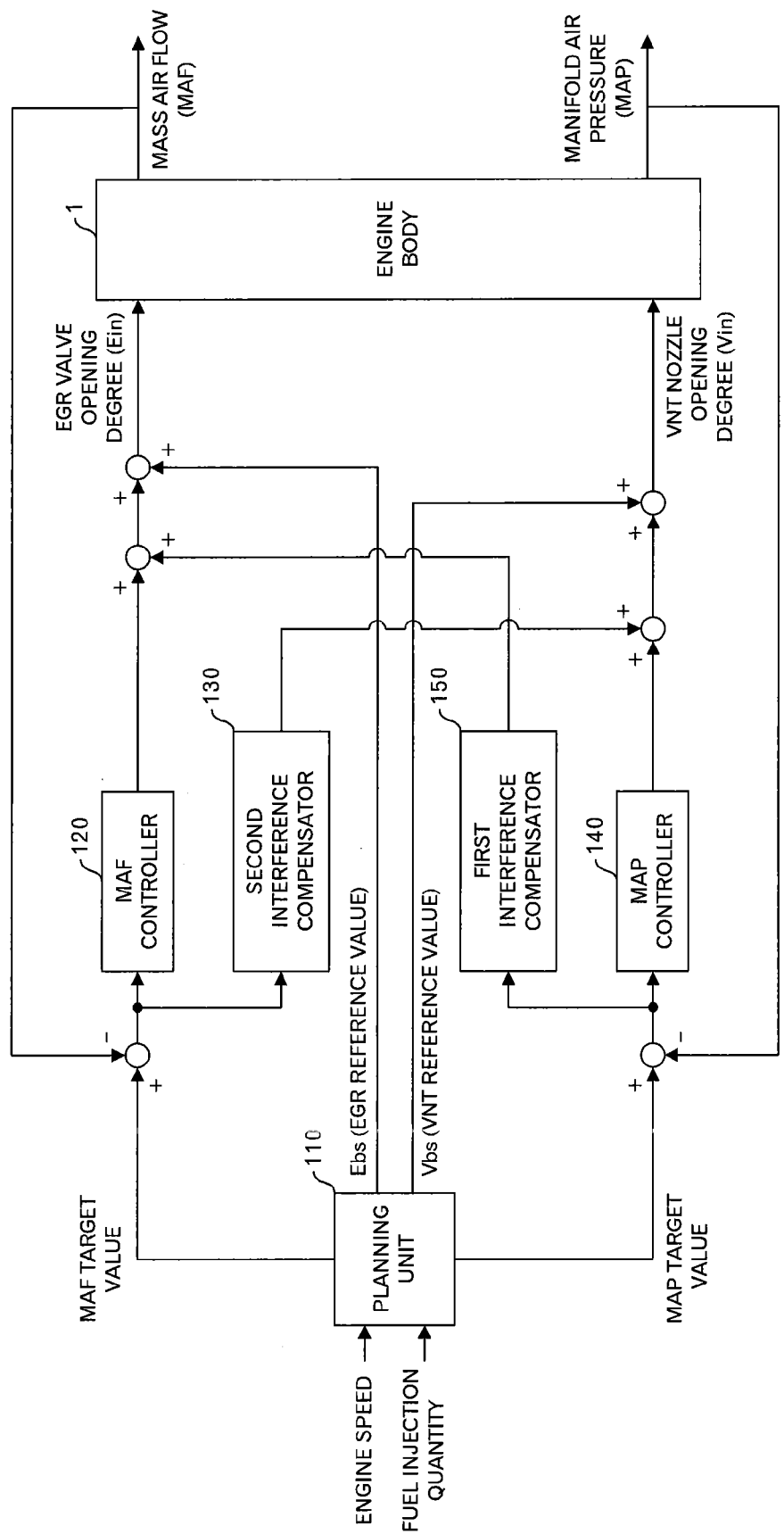
FIG. 2 is a diagram depicting an example of Multi-Input and Multi-Output cooperative control system.

In this embodiment, in the MIMO control mode, the control as illustrated in the block diagram of FIG. 2 is carried out. Namely, the planning unit 110 outputs a target value of the MAF and a target value of the MAP and a reference value of the opening degree of the EGR valve and a reference value of the opening degree of the VNT nozzle according the setting value of the engine speed and the setting value of the fuel injection quantity. The MAF controller 120 outputs a control value of the opening degree of the EGR valve for a difference between the target value of the MAF and the measurement value of the MAF. The second interference compensator 130 outputs a compensation value of the opening degree of the VNT nozzle for the difference between the target value of the MAF and the measurement value of the MAF. The MAP controller 140 outputs a control value of the opening degree of the VNT nozzle for the difference between the target value of the MAP and the measurement value of the MAP. The first interference compensator 150 outputs a compensation value of the opening degree of the EGR valve for the difference between the target value of the MAP and the measurement value of the MAP. The final opening degree Ein of the EGR valve is a sum of the control value from the MAF controller 120, the compensation value from the first interference compensator 150 and the reference value Ebs of the opening degree of the EGR valve from the planning unit 110. In addition, the final opening degree Vin of the VNT nozzle is a sum of the control value from the MAP controller 140, the compensation value from the second interference compensator 130 and the reference value Vbs of the opening degree of the VNT nozzle from the planning unit 110. Incidentally, the MAF is measured by the MAF sensor provided in the engine body 1 and feedback. Moreover, the MAP is measured by the MAP sensor and feedback. All settings of these planning unit 110, MAF controller 120, first interference compensator 150, second interference compensator 130 and MAP controller 140 are made according to the engine body 1, and they carry out the same operations as the conventional ones. Therefore, further explanation is omitted.

Figure 7:
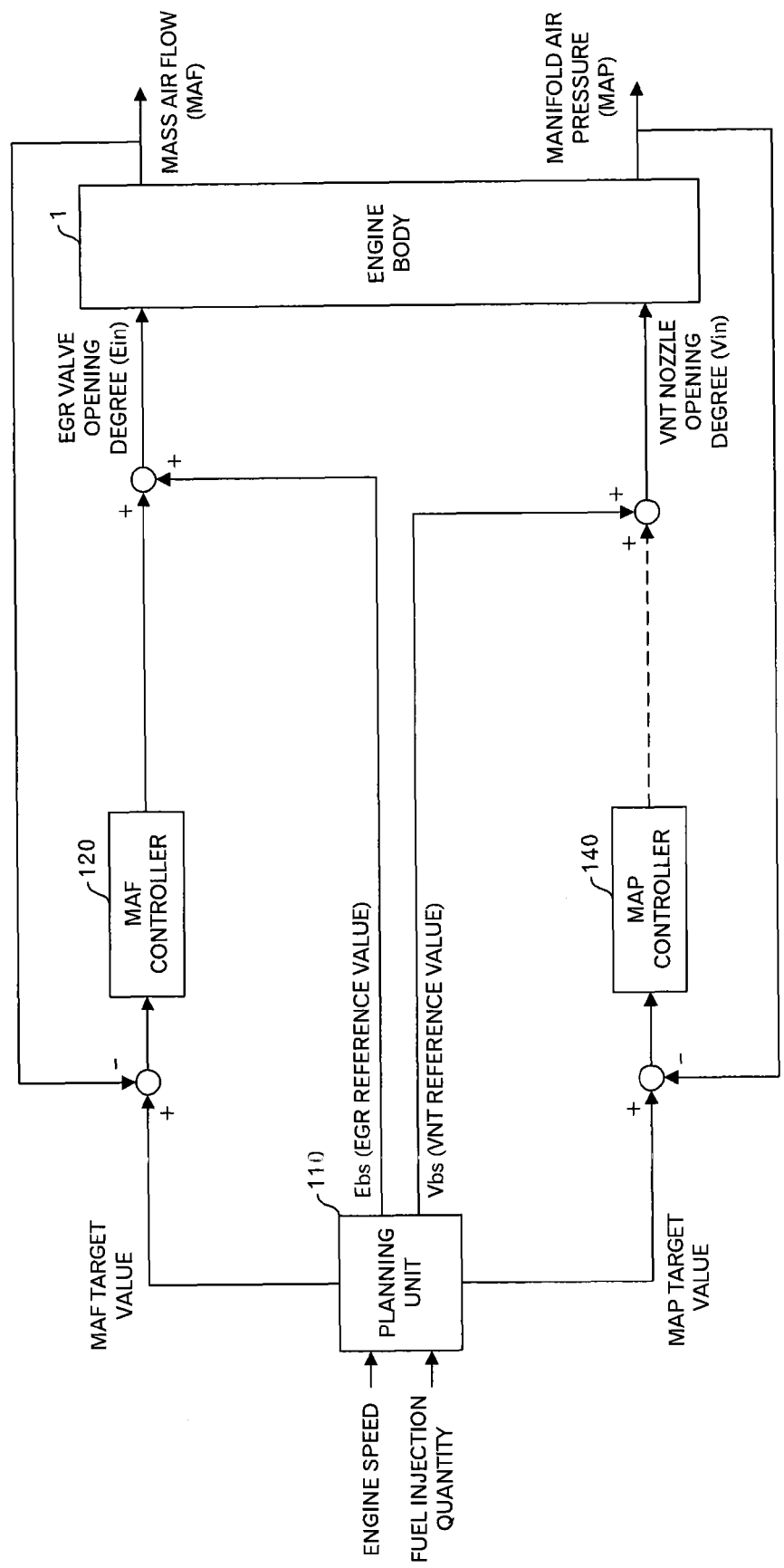
FIG. 7 is a diagram representing a block diagram in a region C.

In the SISO control mode, in which the VNT nozzle is completely closed (including a case where the opening degree is within a range considered as being completely closed. Hereinafter, this may be omitted.) or completely opened (including a case where the opening degree is within a range considered as being completely opened. Hereinafter, this may be omitted) and the MAP control system is disabled and the MAF control system is enabled, the control as illustrated in the block diagram of FIG. 7 is carried out. Namely, the first and second interference compensators 150 and 130 (not shown) are disabled, and the MAP controller 140 whose output is represented by the dotted line is also disabled. Therefore, the opening degree Vin of the VNT nozzle is the reference value Vbs of the opening degree of the VNT nozzle from the planning unit 110. On the other hand, the opening degree Ein of the EGR valve is a sum of the control value from the MAF controller 120 and the reference value Ebs of the opening degree of the EGR valve.

Figure 8:
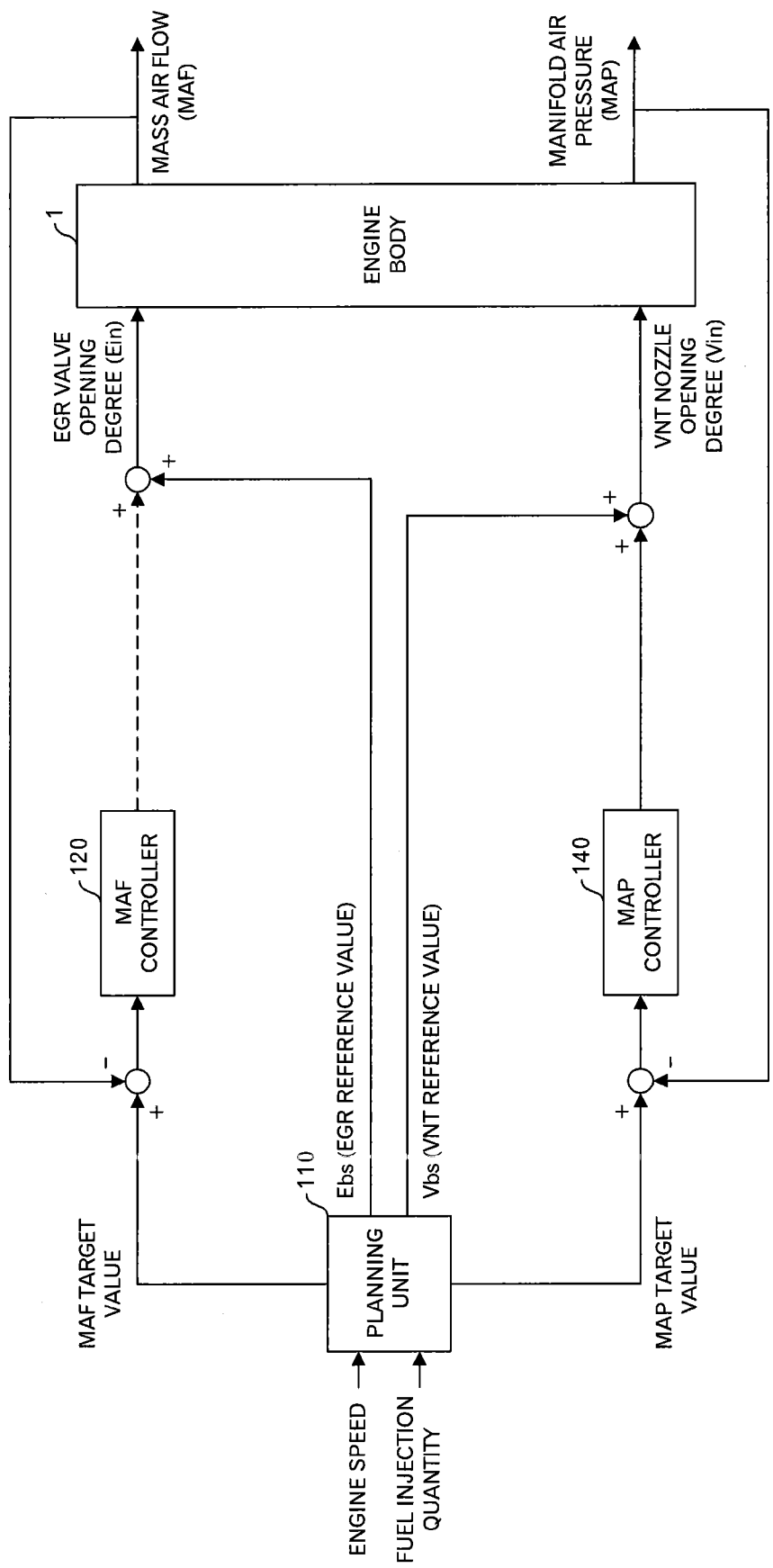
FIG. 8 is a diagram representing a block diagram in a region B.

On the other hand, in the SISO control mode in which the EGR valve is completely closed or completely opened, the MAF control system is disabled and the MAP control system is enabled, the control is carried out as illustrated in block diagram of FIG. 8. Namely, the first and second interference compensators 150 and 130 (not shown) are disabled, and the MAF controller 120 whose output is represented by the dotted line are also disabled. Therefore, the opening degree Vin of the VNT nozzle is a sum of the control value from the MAP controller 140 and the reference value Vbs of the opening degree of the VNT nozzle. On the other hand, the opening degree Ein of the EGR valve is the reference value Ebs of the opening degree of the EGR valve from the planning unit 110.

Figure 9:
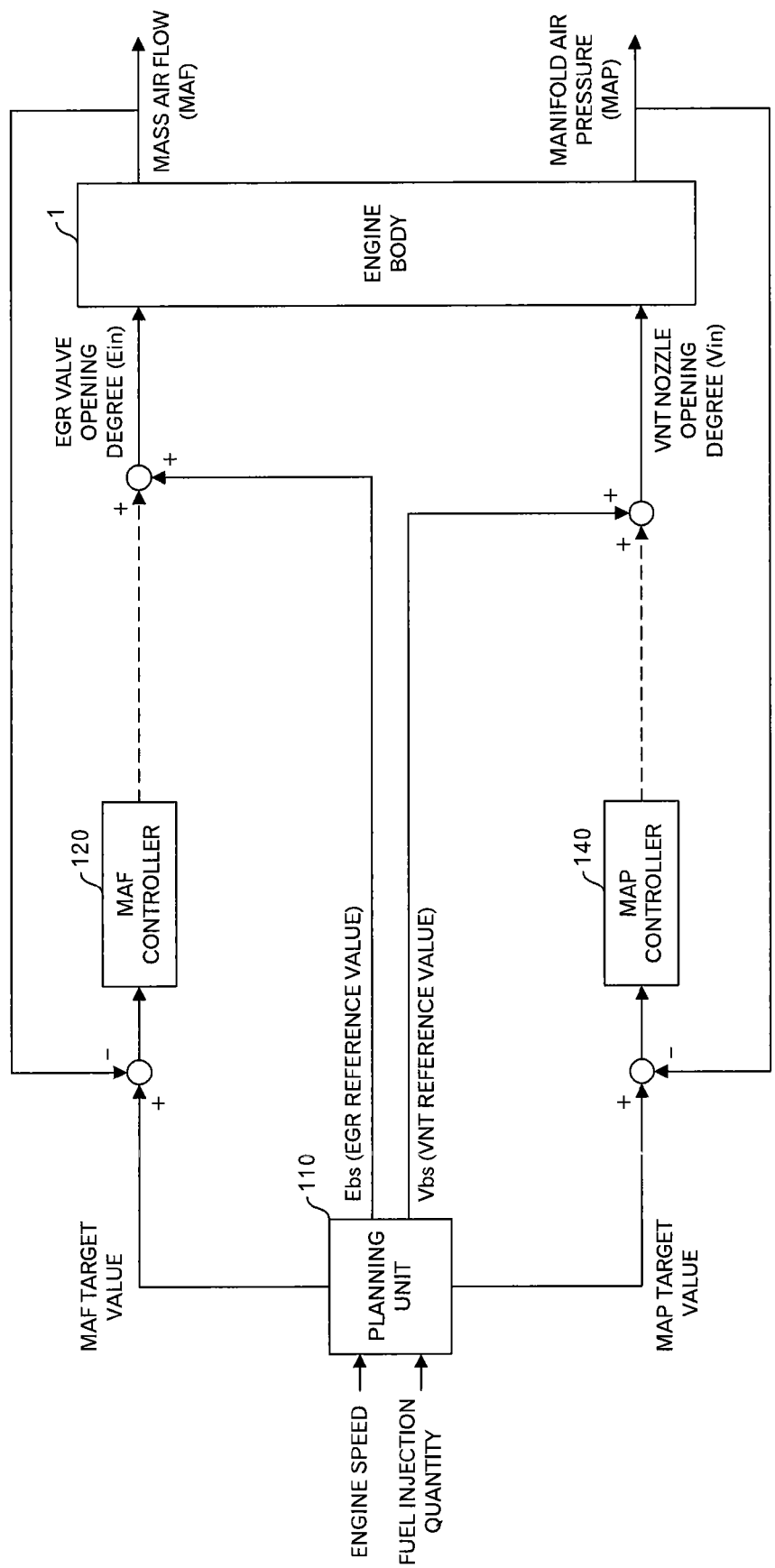
FIG. 9 is a diagram representing a block diagram in a region D.

Moreover, in the SISO control mode in which the EGR valve is completely closed or completely opened, the VNT nozzle is completely closed or completely opened, and both of the MAP control system and MAF control system are disabled, the control as illustrated in the block diagram of FIG. 9 is carried out. Namely, the first and second interference compensators 150 and 130 (not shown) are disabled, and the MAF controller 120 and MAP controller 140 whose output is represented by the dotted line is disabled. Therefore, the opening degree Vin of the VNT nozzle is the reference value Vbs of the opening degree of the VNT nozzle from the planning unit 110. On the other hand, the opening degree Ein of the EGR valve is the reference value Ebs of the opening degree of the EGR valve.

Specific Example 1 of the Embodiment 1

Figure 10:
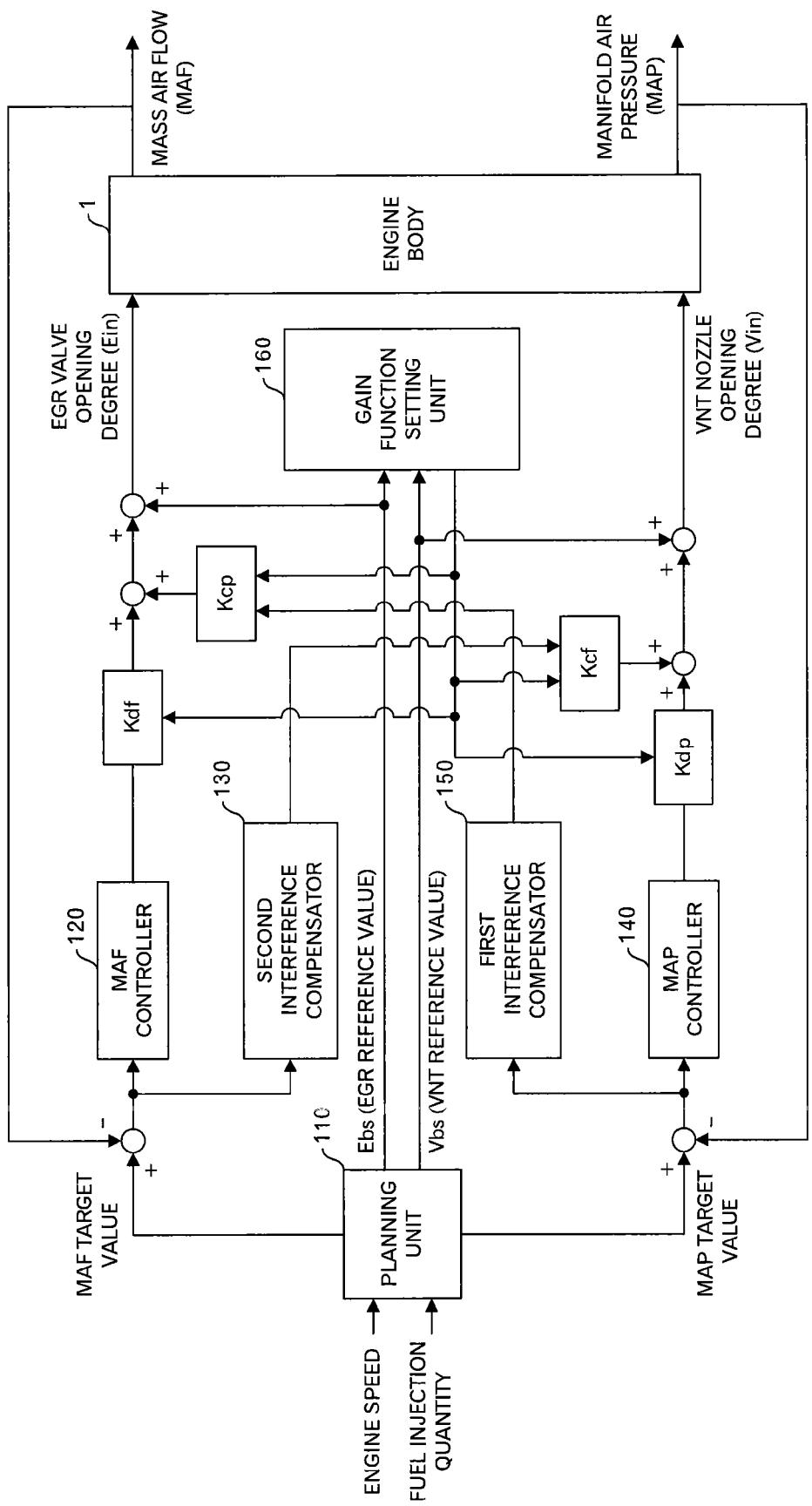
FIG. 10 is a diagram representing a block diagram in a specific example 1 of the embodiment 1.

The block diagram relating to a first specific example to realize the aforementioned mode switching is illustrated in FIG. 10. As illustrated in FIG. 10, a variable gain element Kdf (also called gain function) affecting the output of the MAF controller 120, variable gain element Kcf affecting the output of the second interference compensator 130, variable gain element Kcp affecting the output of the first interference compensator 150, variable gain element Kdp affecting the output of the MAP controller 140, and gain function setting unit 160 for setting the values of the gain elements Kdf, Kcp, Kcf and Kdp are introduced. In this specific example 1 the gain function setting unit 160 determines, from the reference value Ebs of the opening degree of the EGR valve and the reference value Vbs of the opening degree of the VNT nozzle, which are outputted from the planning unit 110, whether or not the opening degree Ein of the EGR valve is in a completely-closed state or completely-opened state or within a range considered as being completely closed or completely opened, and also determines whether or not the opening degree Vin of the VNT nozzle is in a completely-closed state or completely-opened state or within a range considered as being completely closed or completely opened, and sets the values of the gain elements based on the determination.

Figure 11:
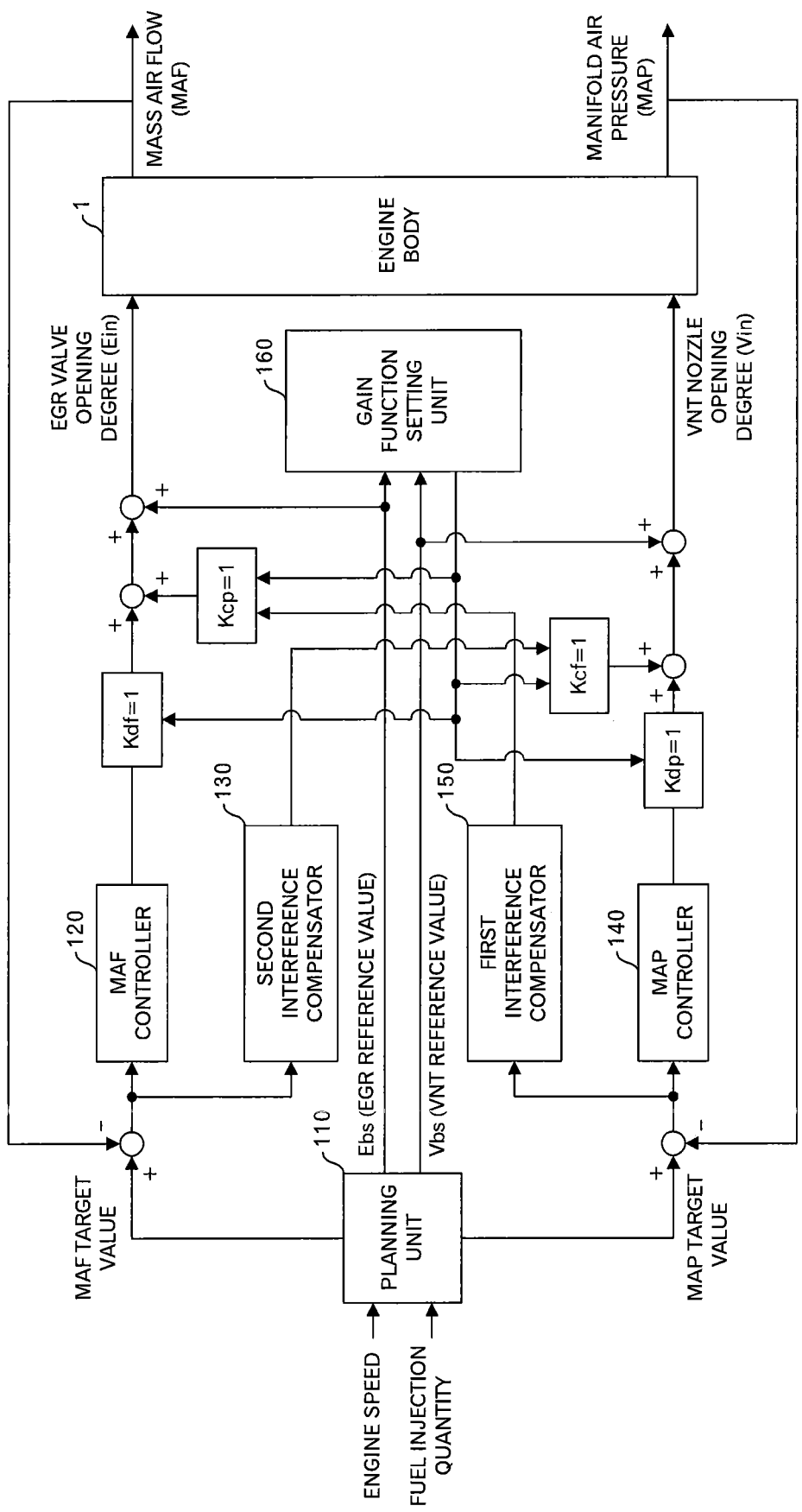
FIG. 11 is a diagram depicting a setting example of gain elements in a region A.

FIG. 11 illustrates settings of the gain elements in the MIMO control mode of the region A of FIG. 6. In other words, when the gain function setting unit 160 determines from the reference value Ebs of the opening degree of the EGR valve and reference value Vbs of the opening degree of the VNT nozzle, whether or not the EGR valve is not completely closed or completely opened and the VNT nozzle is not completely closed or completely opened, the gain function setting unit 160 sets Kdf=1, Kcp=1, Kcf=1 and Kdp=1 as illustrated in FIG. 11. By doing so, all of the MAF controller 120, the second interference compensator 130, the MAP controller 140 and the first interference compensator 150 are enabled, and the block diagram becomes as illustrated in FIG. 2, substantially.

Figure 12:
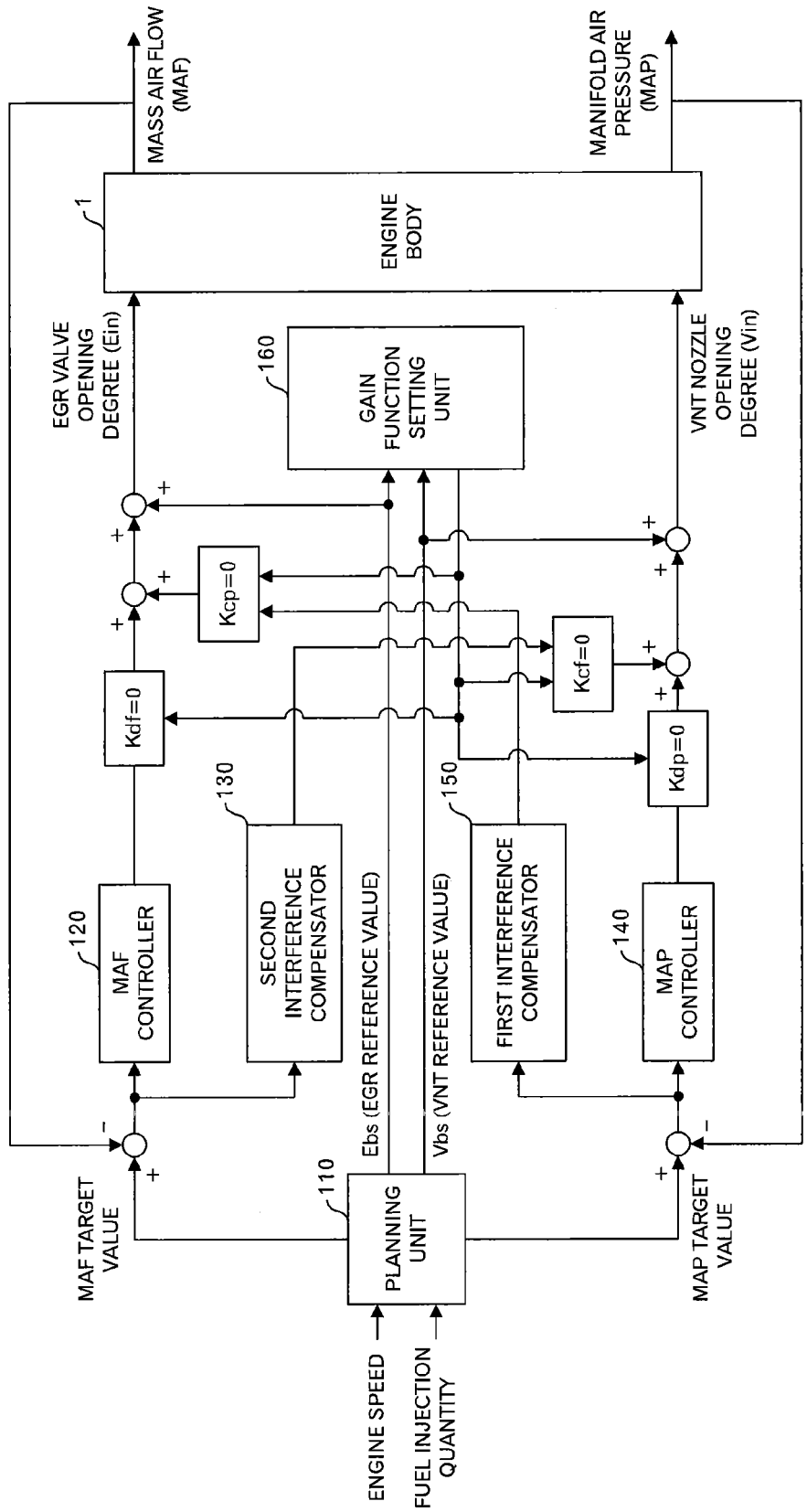
FIG. 12 is a diagram depicting a setting example of the gain elements in the region D.

FIG. 12 illustrates the settings of the gain elements in the SISO control mode of the VNT and EGR completely closing region D in FIG. 6. In other words, when the gain function setting unit 160 determines from the reference value Ebs of the opening degree of the EGR valve and the reference value Vbs of the opening degree of the VNT nozzle, that the EGR valve is completely closed or completely opened, and the VNT nozzle is completely closed or completely opened, the gain function setting unit 160 sets Kdf=0, Kcp=0, Kcf=0 and Kdp=0, as illustrated in FIG. 12. By doing so, the block diagram becomes as illustrated in FIG. 9, substantially. Thus, by multiplying all outputs of the MAF controller 120, the second interference compensator 130, the MAP controller 140 and the first interference compensator 150 by "0", the MAF controller 120, the second interference compensator 130, the MAP controller 140 and the first interference compensator 150 are disabled.

Figure 13:
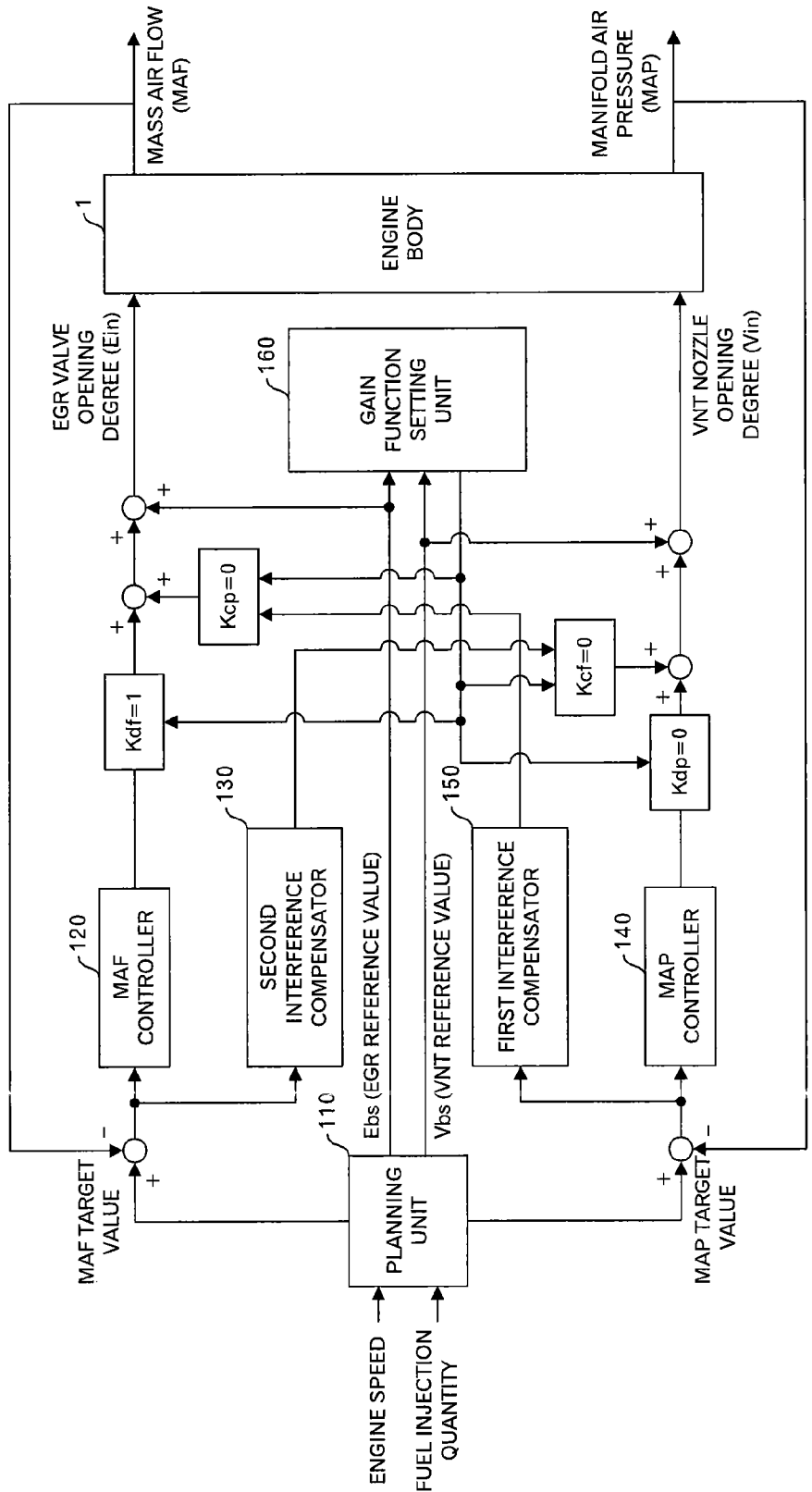
FIG. 13 is a diagram depicting a setting example of the gain elements in the region C.

FIG. 13 illustrates the setting of the gain elements in the SISO control mode of the VNT completely closing region C or VNT completely opening region F of FIG. 6. In other words, when the gain function setting unit 160 determines from the reference value Ebs of the opening degree of the EGR valve and the reference value Vbs of the opening degree of the VNT nozzle, that the EGR valve is not completely closed or completely opened, and the VNT nozzle is completely closed or completely opened, the gain function setting unit 160 sets Kdf=1, Kcp=0, Kcf=0 and Kdp=0 as illustrated in FIG. 13. By doing so, the block diagram becomes as illustrated in FIG. 7, substantially. Thus, the MAF controller 120 is enabled, and the second interference compensator 130, the first interference compensator 150 and the MAP controller 140 are disabled by multiplying the outputs of the second interference compensator 130, the first interference compensator 150 and the MAP controller 140 by the gain "0".

Figure 14:
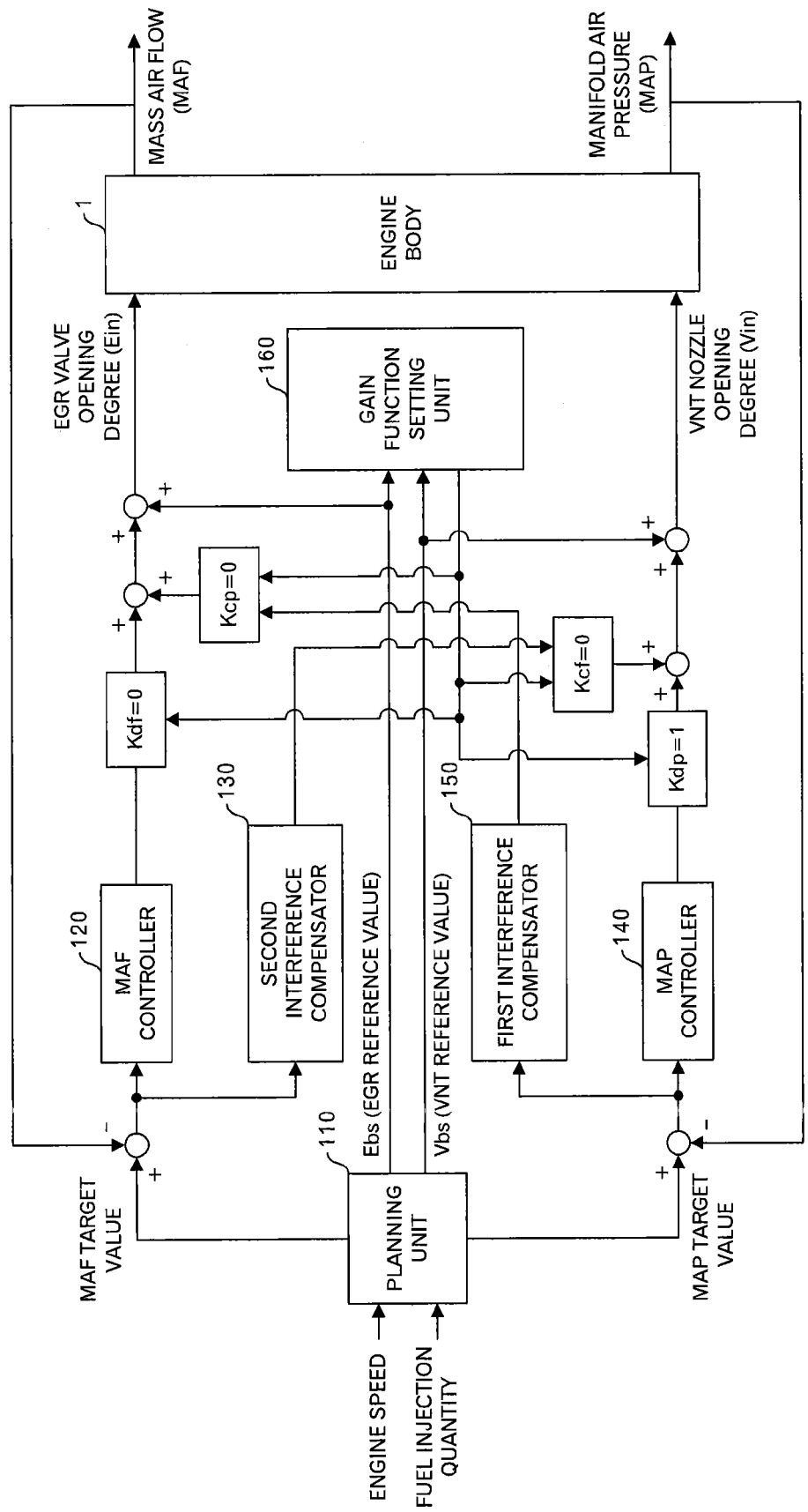
FIG. 14 is a diagram depicting a setting example of the gain elements in the region B.

FIG. 14 illustrates setting of the gain elements in the SISO control mode of the EGR completely closing region B or EGR completely opening region E of FIG. 6. Namely, when the gain function setting unit 160 determines from the reference value Ebs of the opening degree of the EGR valve and the reference value Vbs of the opening degree of the VNT nozzle, that the EGR valve is completely closed or completely opened, however, the VNT nozzle is not completely closed or completely opened, the gain function setting unit 160 sets Kdf=0, Kcp=0, Kcf=0 and Kdp=1 as illustrated in FIG. 14. By doing so, the block diagram becomes as illustrated in FIG. 8, substantially. Thus, the MAF controller 120, second interference compensator 130 and first interference compensator 150 are disabled by multiplying the outputs of the MAF controller 120, second interference compensator 130 and first interference compensator 150 by the gain "0". On the other hand, the MAP controller 140 is enabled.

Figure 15:
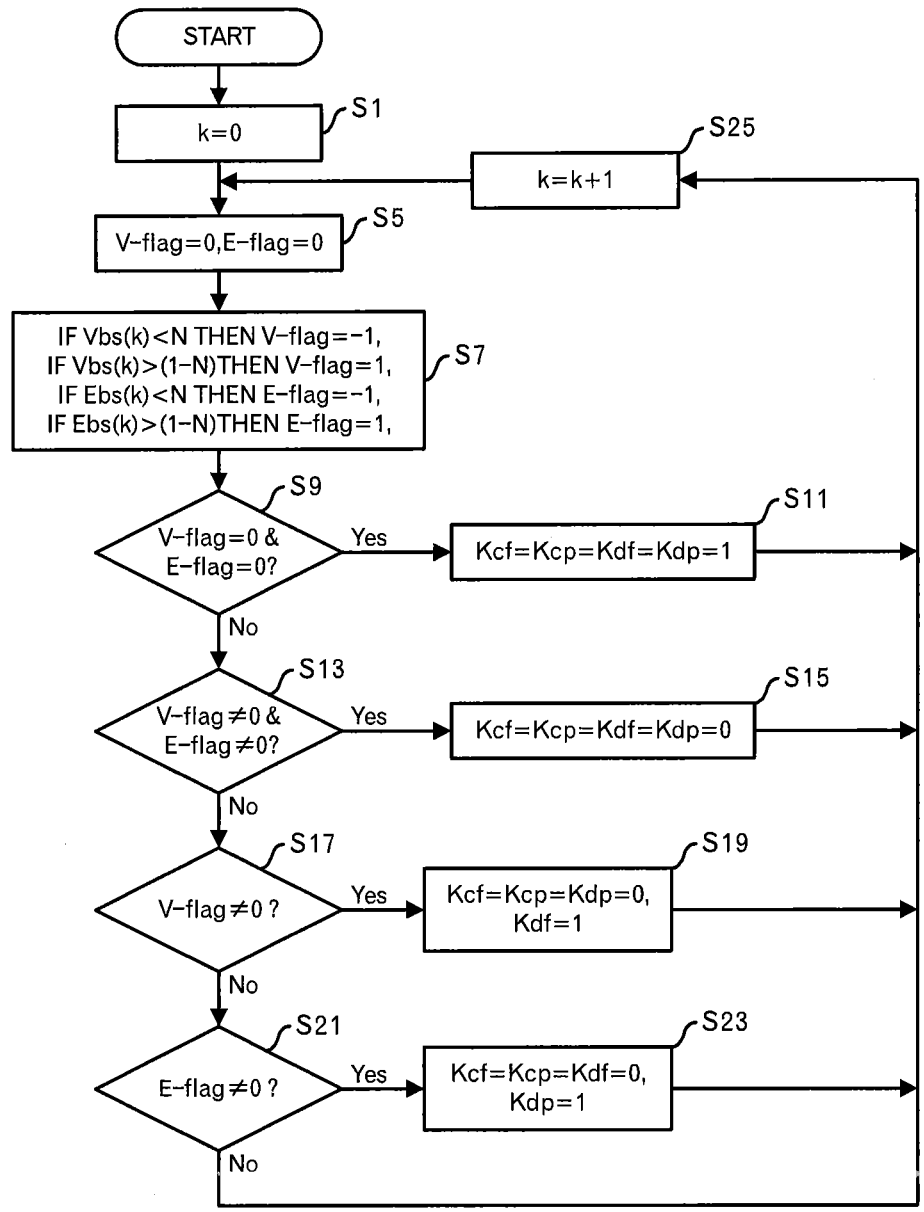
FIG. 15 is a diagram depicting a processing flow in the specific example 1 of the embodiment 1.

Next, the processing of the gain function setting unit 160 and the like will be explained by using FIG. 15. First, time k is initialized to "0" (step S1). Time k is the common time in the engine control apparatus 100. Then, when the setting values of the engine speed and fuel injection quantity at time k are inputted, the planning unit 110 outputs the reference value Vbs(k) of the opening degree of the VNT nozzle and the reference value Ebs(k) of the opening degree of the EGR valve, which correspond to the setting values of the engine speed and fuel injection quantity at time k Vbs(k) and Ebs(k) are values normalized to a range from 0 to 1 ("0" means a completely-closed state and "1" means a completely-opened state.). Furthermore, the planning unit 110 similarly outputs the MAF target value to the MAF control system including the MAF controller 120, and outputs the MAP target value to the MAP control system including the MAP controller 140.

Next, the gain function setting unit 160 sets "0" to V-flag representing a state of the opening and closing of the VNT nozzle, and sets "0" to E-flag representing a state of the opening and closing of the EGR valve (step S5). Then, when the reference value Vbs(k) of the opening degree of the VNT nozzle is less than N (i.e. N is a constant defining a range considered as being completely opened or completely closed. For example, the constant has a value from about 0.1 to about 0.15) (i.e. in a completely-closed state) the gain function setting unit 160 sets "−1" to V-flag. On the other hand, when Vbs(k) is greater than (1−N) (i.e. in a completely-opened state), the gain function setting unit 160 sets "1" to V-flag. Moreover, the gain function setting unit 160 sets "−1" to E-flag, when the reference value Ebs(k) of the opening degree of the EGR valve is less than N (i.e. in a completely-closed state.). On the other hand, when Ebs(k) is greater than (1−N) (i.e. in a completely-opened state.), the gain function setting unit 160 sets "−1" to E-flag (step S7). Thus, when Vbs(k) is equal to or greater than N and equal to or less than (1−N), V-flag remains "0", and when Ebs(k) is equal to or greater than N and equal to or less than (1−N), E-flag remains "0".

After that, the gain function setting unit 160 determines whether or not the state is a state where V-flag is "0" and E-flag is also "0" (step S9). When this condition is satisfied, the control mode is the MIMO control mode. Therefore, the gain function setting unit 160 sets Kcf=Kcp=Kdf=Kdp=1 as illustrated in FIG. 11.

On the other hand, when at least either of V-flag and E-flag is not "0", the gain function setting unit 160 determines whether or not the state is a state that V-flag is not "0" and E-flag also is not "0" (step S13). When such a condition is satisfied, the control mode is the SISO control mode in the VNT and EGR completely closing region D (i.e. either in case where both of them are completely opened or in case where both of them are completely closed). Therefore, the gain function setting unit 160 sets Kcf=Kcp=Kdf=Kdp=0 as illustrated in FIG. 12 (step S15).

Moreover, when either of V-flag and E-flag is not "0", the gain function setting unit 160 determines whether or not the state is a state that only V-flag is not "0" (step S17). When such a condition is satisfied, the control mode is the SISO control mode of the VNT completely closing region C. Therefore, the gain function setting unit 160 sets Kcf=Kcp=Kdp=0 and Kdf=1 as illustrated in FIG. 13 (step S19).

Furthermore, when only V-flag is not "0", the gain function setting unit 160 determines whether or not the state is a state that only E-flag is not "0" (step S21). When such a condition is satisfied, the control mode is the SISO control mode of the EGR completely closing region B. Therefore, the gain function setting unit 160 sets Kcf=Kcp=Kdf=0 and Kdp=1 as illustrated in FIG. 14 (step S23).

After the step S11, the MAF controller 120 calculates a control value according to the difference between the MAF target value and the measurement value of the MAF, and the first interference compensator 150 calculates a compensation value according to the difference between the MAP target value and the measurement value of the MAP. Then, the sum of the control value from the MAF controller 120, the compensation value from the first interference compensator 150 and Ebs(k) is calculated as the opening degree Ein of the EGR valve, and the EGR valve of the engine body 1 is controlled according to the Ein. Moreover, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the control value from the MAP controller 140, the compensation value from the second interference compensator 130 and Vbs(k) is calculated as the VNT nozzle opening degree Vin, and the VNT nozzle of the engine body 1 is controlled according to the Vin.

Moreover, after the step S15, Ebs(k) is adopted as the EGR valve opening degree Ein, and the EGR valve of the engine body 1 is controlled according to the Ein. Moreover, Vbs(k) is adopted as the VNT nozzle opening degree Vin and the VNT nozzle of the engine body 1 is controlled according to the Vin.

Furthermore, after the step S19, the MAF controller 120 calculates a control value according to the difference between the MAF target value and the measurement value of the MAF. Then, the sum of the control value from the MAF controller 120 and Ebs(k) is calculated as the EGR valve opening degree Ein, and the EGR valve of the engine body 1 is controlled according to the Ein. On the other hand, Vbs(k) is adopted as the VNT nozzle opening degree Vin, and the VNT nozzle of the engine body 1 is controlled according to the Vin.

In addition, after the step S23, the MAP controller 140 calculates a control value according to the difference between the MAP target value and the measurement value of the MAP. Then, the sum of the control value from the MAP controller 140 and Vbs(k) is calculated as the VNT nozzle opening degree Vin, and the VNT nozzle of the engine body 1 is controlled according to the Vin. On the other hand, Ebs(k) is adopted as the EGR valve opening degree Ein, and the EGR valve of the engine body 1 is controlled according to the Ein.

When it is determined that the condition of the step S21 is not satisfied, or after the steps S11, S15, S19 or S23, k is incremented by "1" (step S25), and the processing returns to the step S5. Such a processing is carried out until the engine body 1 is stopped.

Thus, by introducing the gain element, it is possible to easily set the enabling or disabling.

Specific Example 2 of Embodiment 1

Figure 16:
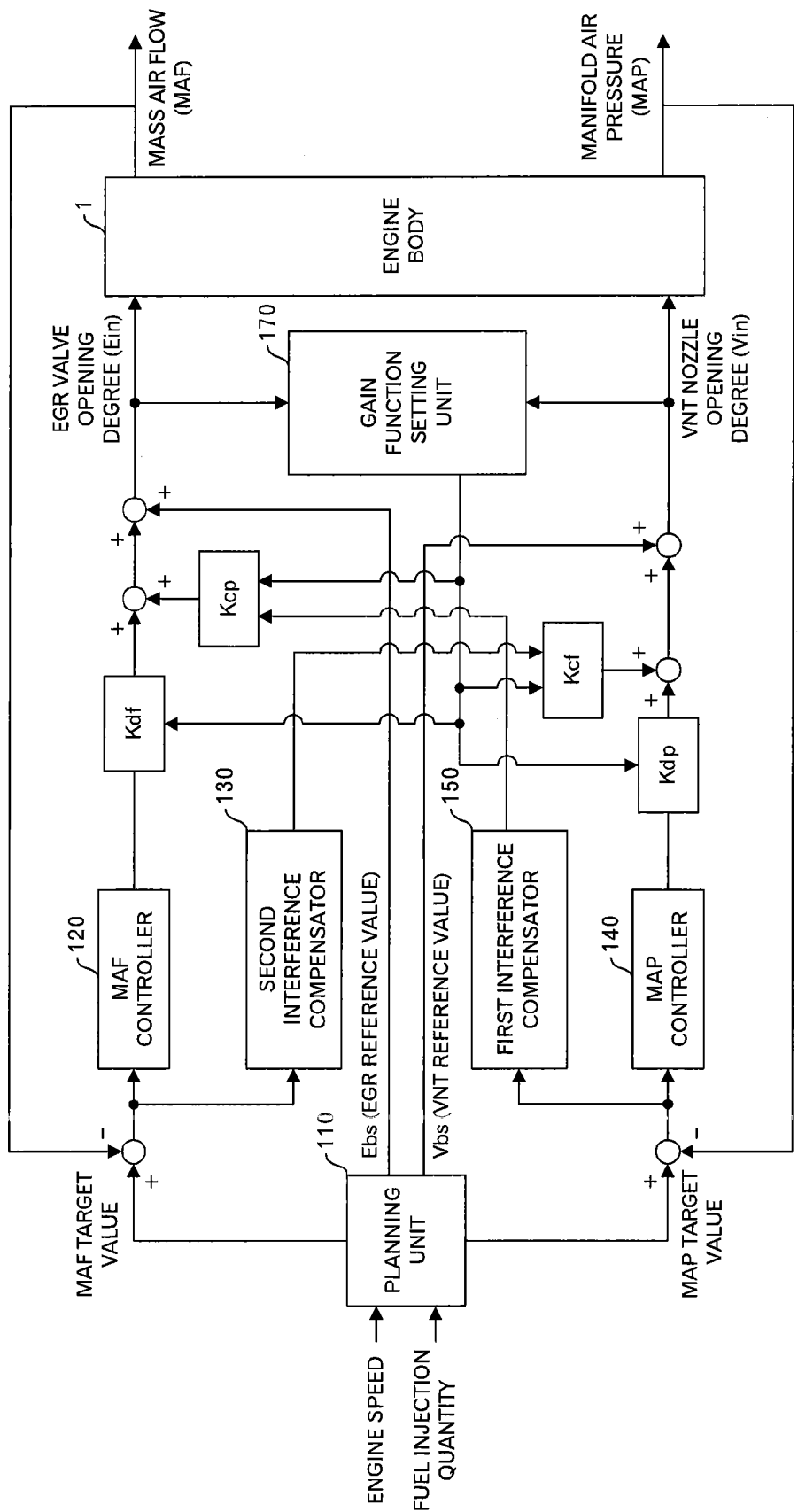
FIG. 16 is a diagram representing a block diagram in a specific example 2 of the embodiment 1.

FIG. 16 illustrates a block diagram relating to a second specific example to realize the aforementioned mode switching. As illustrated in FIG. 16, a variable gain element (also called "gain function") Kdf affecting the output of the MAF controller 120, variable gain element Kcf affecting the output of the second interference compensator 130, variable gain element Kcp affecting the output of the first interference compensator 150, variable gain element Kdp affecting the output of the MAP controller 140 and gain function setting unit 170 for setting values of the gain elements Kdf, Kcp, Kcf and Kdp are introduced. These are almost the same as those in FIG. 10.

However, in this second specific example, the gain function setting unit 170 determines, from the value of the EGR valve opening degree Ein, whether or not the EGR valve opening degree Ein itself is in a completely-closed state or completely-opened state or in a range considered as being completely closed or completely opened, and determines from the value of the VNT nozzle opening degree Vin, whether or not the VNT nozzle opening degree Vin itself is in a completely-closed state or completely-opened state, or in a range considered as being completely closed or completely opened, and sets the values of the gain elements based on the determination.

Figure 17:
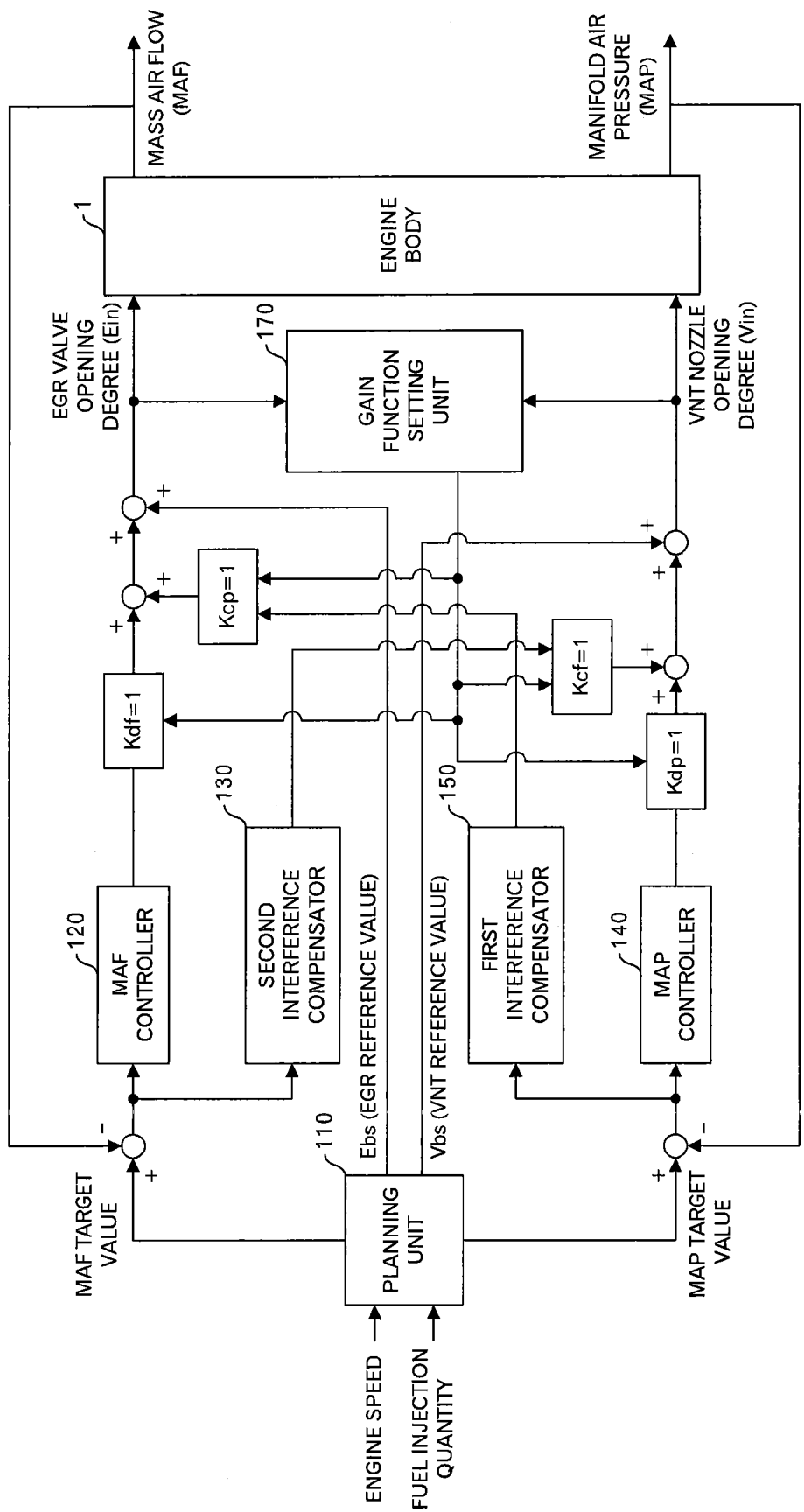
FIG. 17 is a diagram depicting a setting example of the gain elements in the region A.

FIG. 17 illustrates settings of the gain elements in the MIMO control mode of the region A in FIG. 6. In other words, when the gain function setting unit 170 determines, from the EGR valve opening degree Ein and VNT nozzle opening degree Vin, that the EGR valve is not completely closed or completely opened, and the VNT nozzle is not completely closed or completely opened, the gain function setting unit 170 sets Kdf=1, Kcp=1, Kcf=1 and Kdp=1 as illustrated in FIG. 17. By doing so, all of the MAF controller 120, second interference compensator 130, MAP controller 140 and first interference compensator 150 are enabled, and the block diagram as illustrated in FIG. 2 is substantially obtained.

Figure 18:
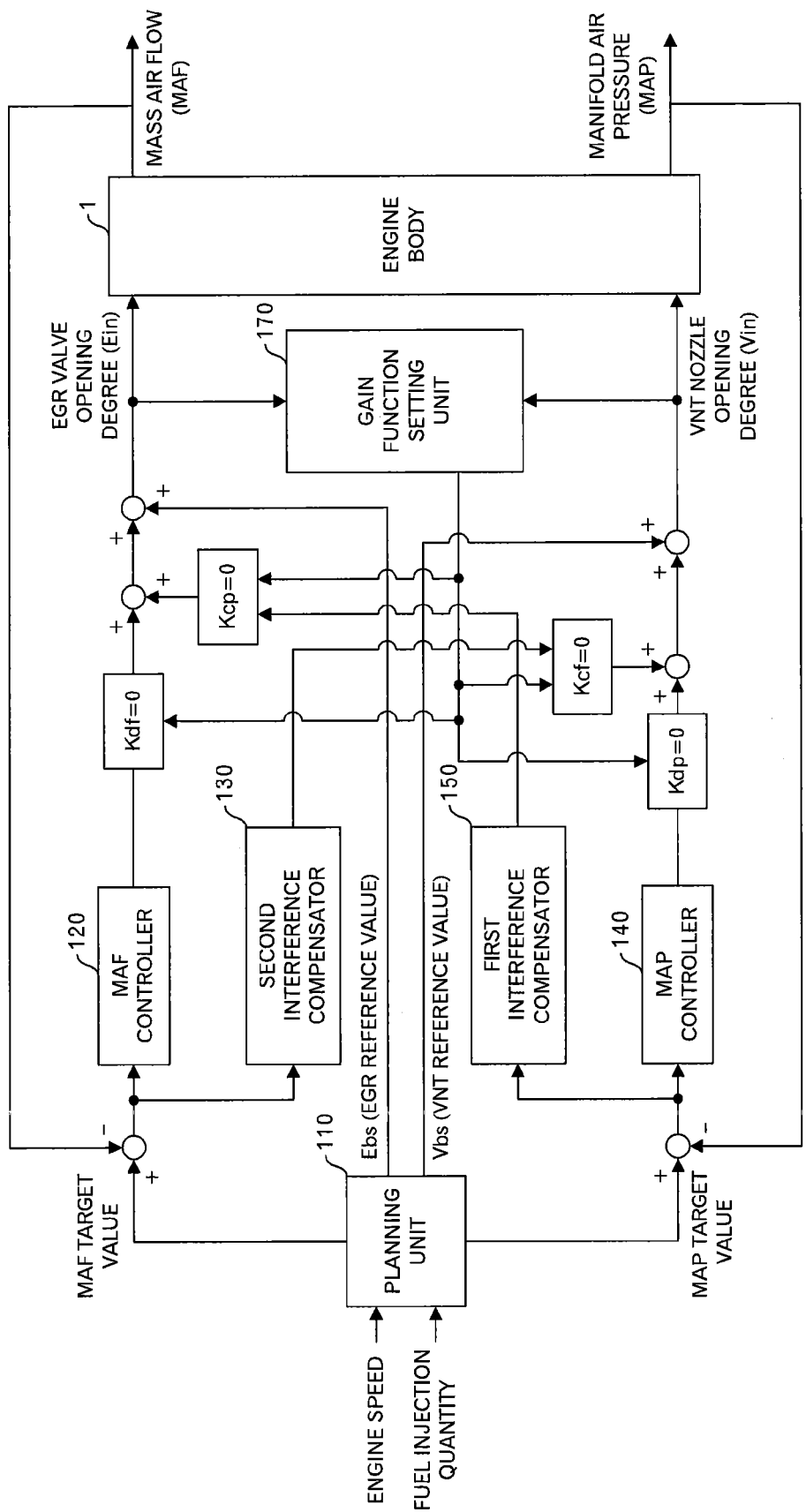
FIG. 18 is a diagram depicting a setting example of the gain elements in the region D.

FIG. 18 illustrates settings of the gain elements in the SISO control mode of the VNT and EGR completely closing region D in FIG. 6. In other words, when the gain function setting unit 170 determines, from the EGR valve opening degree Ein and VNT nozzle opening degree Vin, that the EGR valve is completely closed or completely opened and the VNT nozzle is completely closed or completely opened, the gain function setting unit 170 sets Kdf=0, Kcp=0, Kcf=0 and Kdp=0 as illustrated in FIG. 18. By doing so, the block diagram as illustrated in FIG. 9 is substantially obtained. Thus, By multiplying all of the outputs of the MAF controller 120, second interference compensator 130, MAP controller 140 and first interference compensator 150 by "0", they are disabled.

Figure 19:
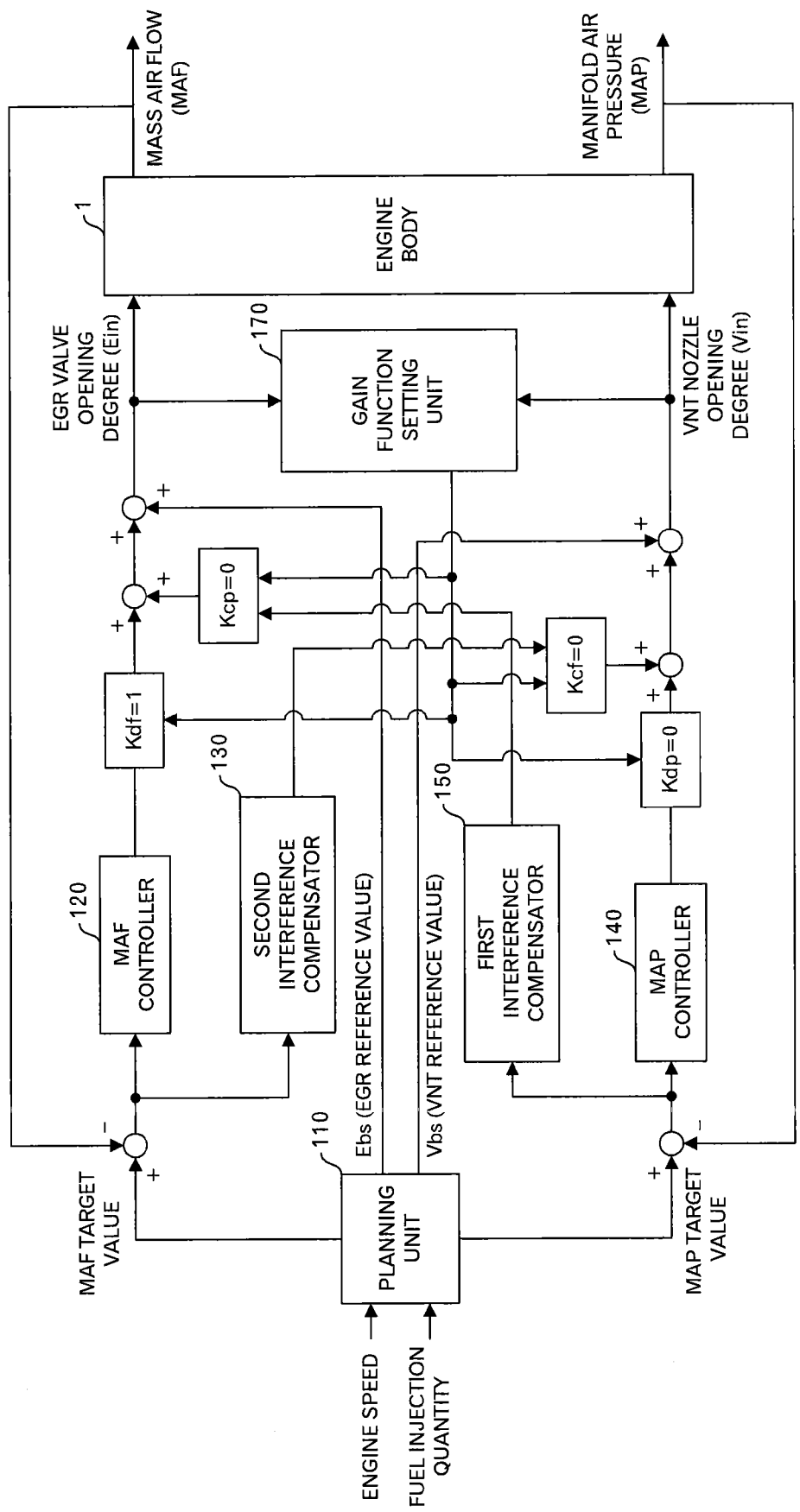
FIG. 19 is a diagram depicting a setting example of the gain elements in the region C.

FIG. 19 illustrates settings of the gain elements in the SISO control mode of the VNT completely closing region C or VNT completely opening region F in FIG. 6. Namely, when the gain function setting unit 170 determines, from the EGR valve opening degree Ein and VNT nozzle opening degree Vin that the EGR valve is not completely closed or completely opened, and the VNT nozzle is completely closed or completely opened, the gain function setting unit 170 sets Kdf=1, Kcp=0, Kcf=0 and Kdp=0 as illustrated in FIG. 19. By doing so, the block diagram as illustrated in FIG. 7 is obtained, substantially. Thus, the MAF controller 120 is enabled, and by multiplying the outputs of the second interference compensator 130, first interference compensator 150 and MAP controller 140 by "0", they are disabled.

Figure 20:
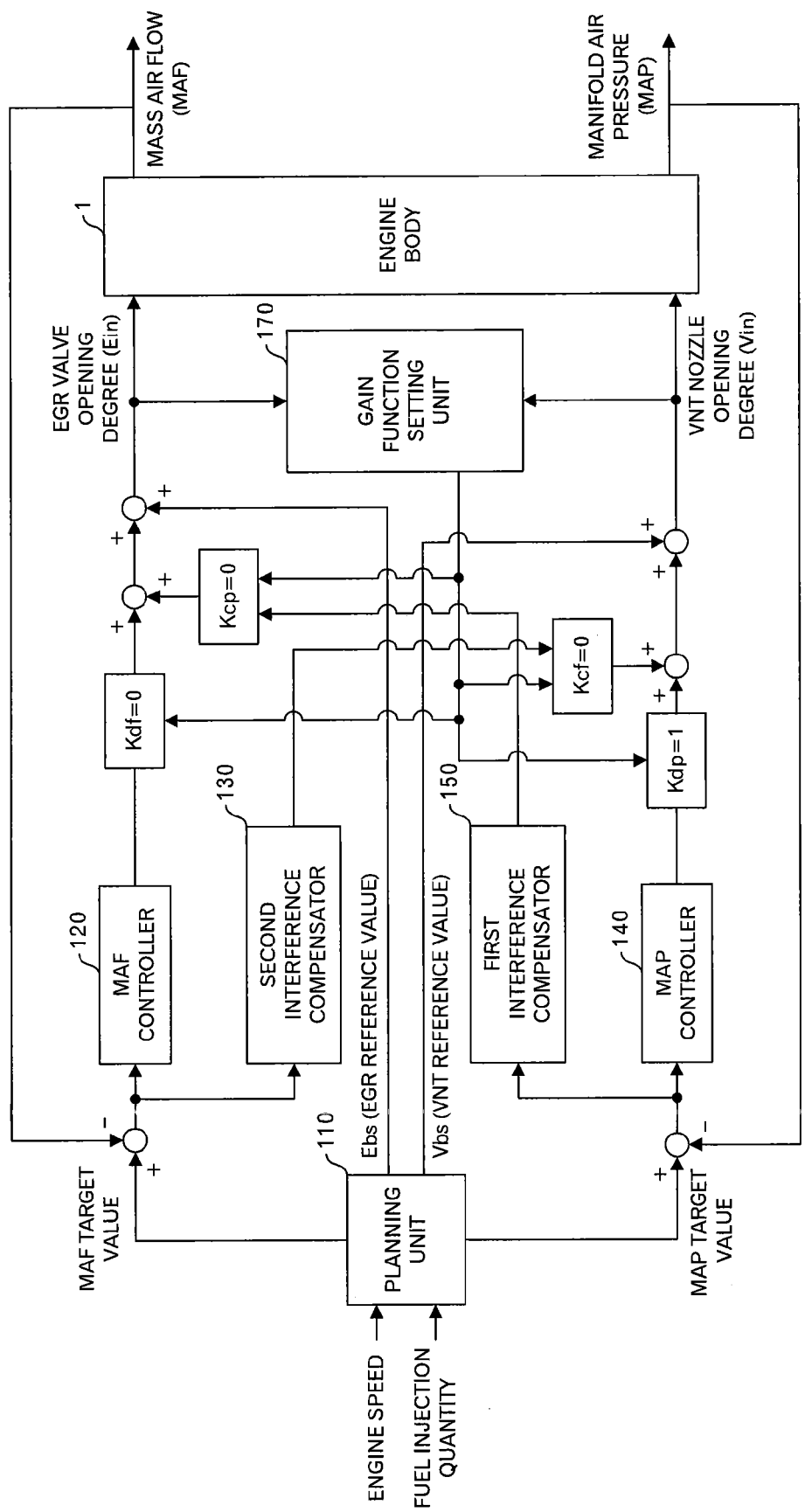
FIG. 20 is a diagram depicting a setting example of the gain elements in the region B.

FIG. 20 illustrates settings of the gain elements in the SISO control mode of the EGR completely closing region B or EGR completely opening region E in FIG. 6. Namely, when the gain function setting unit 170 determines, from the EGR valve opening degree Ein and VNT nozzle opening degree Vin, that the EGR valve is completely closed or completely opened, however, the VNT nozzle is not completely closed or completely opened, the gain function setting unit 170 sets Kdf=0, Kcp=0, Kcf=0 and Kdp=1 as illustrated in FIG. 20. By doing so, the block diagram as illustrated in FIG. 8 is substantially obtained. Thus, by multiplying the outputs of the MAF controller 120, second interference compensator 130 and first interference compensator 150 by "0", they are disabled, however, the MAP controller 140 is enabled.

Figure 21:
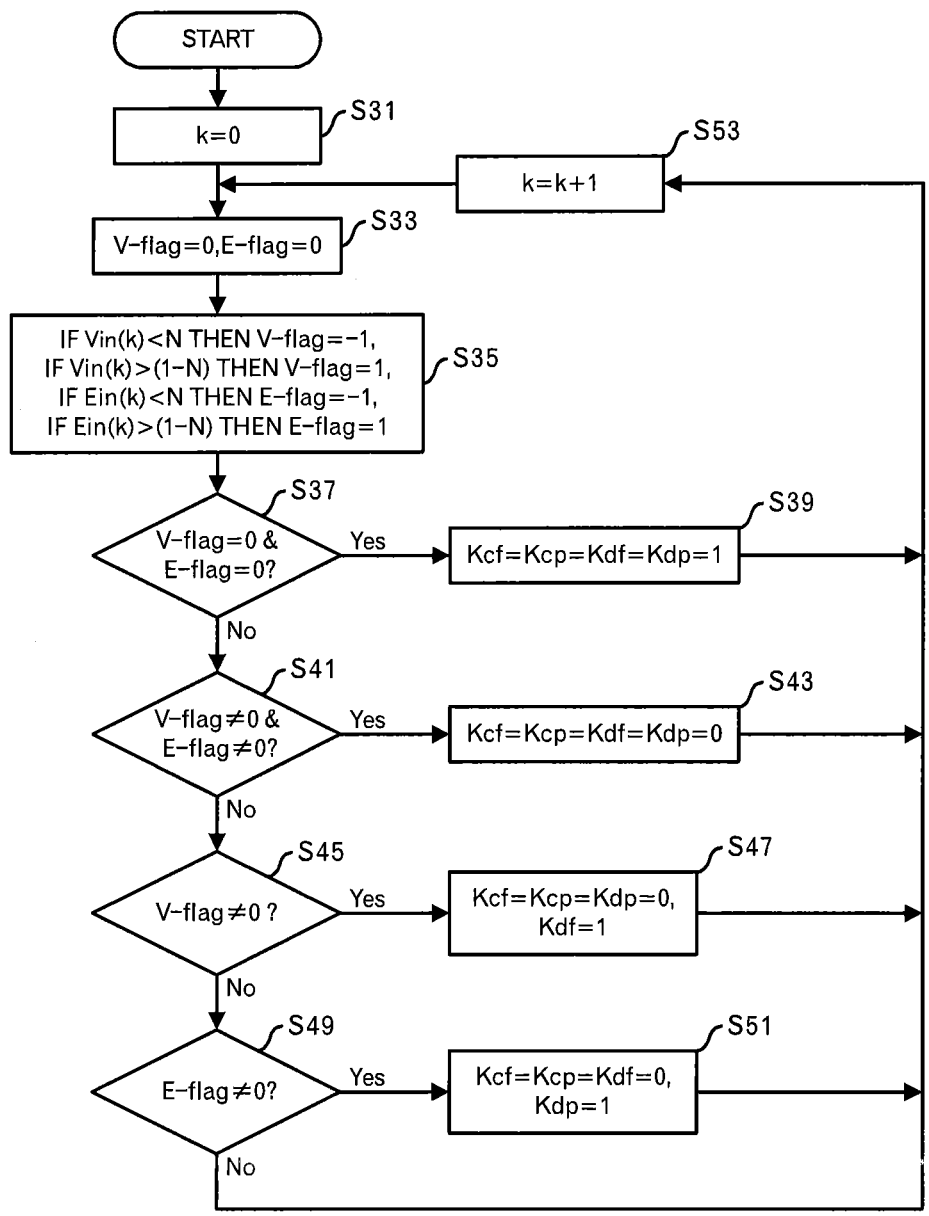
FIG. 21 is a diagram depicting a processing flow in a specific example 2 of the embodiment 1.

Next, a processing of the gain function setting unit 170 and the like is explained by using FIG. 21. First, time k is initialized to "0" (step S31). Time k is the common time in the engine control apparatus 100.

Moreover, the gain function setting unit 170 sets "0" to V-flag representing a state of the opening or closing of the VNT nozzle, and sets "0" to E-flag representing a state of the opening or closing of the EGR valve (step S33). Then, when the VNT nozzle opening degree Vin(k) at time k is less than N (i.e. N is a constant having a value from about 0.1 to about 0.15, and defining a range considered as being completely opened or completely closed.) (namely, in a completely-closed state), the gain function setting unit 170 sets "−1" to V-flag. On the other hand, when the VNT nozzle opening degree Vin(k) is greater than (1−N) (namely, in a completely-opened state), the gain function setting unit 170 sets "1" to V-flag. In addition, when the EGR valve opening degree Ein(k) is less than N (i.e. in a completely-closed state), the gain function setting unit 170 sets "−1" to E-flag. On the other hand, when Ein(k) is greater than (1−N) (i.e. in a completely-opened state), the gain function setting unit 170 sets "1" to E-flag (step S35). Thus, when Vin(k) is equal to or greater than N and equal to or less than (1−N), V-flag remains "0", and when Ein(k) is equal to or greater than N and equal to or less than (1−N), E-flag remains "0". Incidentally, Ein(k) and Vin(k) are values normalized from 0 to 1 ("0" represents a completely-closed state, and "1" represents a completely-opened state.).

After that, the gain function setting unit 170 determines whether or not the state is a state that V-flag is "0" and E-flag is "0" (step S37). When such a condition is satisfied, the control mode is the MIMO control mode. Therefore, the gain function setting unit 170 sets Kcf=Kcp=Kdf=Kdp=1 as illustrated in FIG. 17 (step S39).

On the other hand, when at least either of V-flag and E-flag is not "0", the gain function setting unit 170 determines whether or not the state is a state that V-flag is not "0" and E-flag also is not "0" (step S41). When such a condition is satisfied, the control mode is the SISO control mode of the VNT and EGR completely closing region D (in case where the state is a state that both of them are completely opened or completely closed). Therefore, the gain function setting unit 170 sets Kcf=Kcp=Kdf=Kdp=0 as illustrated in FIG. 18 (step S43).

Moreover, when either of V-flag and E-flag is not "0", the gain function setting unit 170 determines whether or not the state is a state that only V-flag is not "0" (step S45). When such a condition is satisfied, the control mode is the SISO control mode of the VNT completely closing region C or VNT completely opening region F. Therefore, the gain function setting unit 170 sets Kcf=Kcp=Kdp=0 and Kdf=1 as illustrated in FIG. 19 (step S47).

Furthermore, when only V-flag is not "0", the gain function setting unit 170 determines whether or not the state is a state that only E-flag is not "0" (step S49). When such a condition is satisfied, the control mode is the SISO control mode of the EGR completely closing region B or EGR completely opening region E. Therefore, the gain function setting unit 170 sets Kcf=Kcp=Kdf=0 and Kdp=1 as illustrated in FIG. 20 (step S51).

Incidentally, in addition to the aforementioned processing flow, when the setting values of the engine speed and fuel injection quantity at time k are inputted, the planning unit 110 outputs the reference value Vbs(k) of the VNT nozzle opening degree and reference value Ebs(k) of the EGR valve opening degree, which correspond to the setting values of the engine speed and fuel inject ion quantity at time k. Furthermore, the planning unit 110 similarly outputs the MAF target value to the MAF control system including the MAF controller 120, and outputs the MAP target value to the MAP control system including the MAP controller 140.

Then, after the step S39, the MAF controller 120 calculates a control value according to the difference between the MAF target value and the measurement value of the MAF, and the first interference compensator 150 calculates a compensation value according to the difference between the MAP target value and the measurement value of the MAP. Then, the sum of the control value from the MAF controller 120, the compensation value from the first interference compensator 150 and Ebs(k) is calculated as the EGR valve opening degree Ein (k+1), and the EGR valve of the engine body 1 is controlled according to the Ein(k+1). In addition, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the control value from the MAP controller 140, the compensation value from the second interference compensator 130 and Vbs(k) is calculated as the VNT nozzle opening degree Vin(k+1), and the VNT nozzle of the engine body 1 is controlled according to the Vin(k+1).

In addition, after the step S43, Ebs(k) is adopted as the EGR valve opening degree Ein(k+1), and the EGR valve of the engine body 1 is controlled according to the Ein (k+1). Moreover, Vbs(k) is adopted as the VNT nozzle opening degree Vin(k+1), and the VNT nozzle of the engine body 1 is controlled according to the Vin(k+1).

Furthermore, after the step S47, the MAF controller 120 calculates a control value according to the difference between the MAF target value and the measurement value of the MAF. Then, the sum of the control value from the MAF controller 120 and Ebs(k) is calculated as the EGR valve opening degree Ein(k+1), and the EGR valve of the engine body 1 is controlled according to the Ein(k+1). On the other hand, Vbs(k) is adopted as the VNT nozzle opening degree Vin(k+1), and the VNT nozzle of the engine body 1 is controlled according to the Vin(k+1).

Moreover, after the step S51, the MAP controller 140 calculates a control value according to the difference between the MAP target value and the measurement value of the MAP. Then, the sum of the control value from the MAP controller 140 and Vbs(k) is calculated as the VNT nozzle opening degree Vin(k+1), and the VNT nozzle of the engine body 1 is controlled according to the Vin(k+1). On the other hand, Ebs(k) is adopted as the EGR valve opening degree Ein (k+1), and the EGR valve of the engine body 1 is controlled according to the Ein(k+1).

When it is determined that the condition of the step S49 is not satisfied, k is incremented by "1" after the steps S39, S43, S47 and S51 (step S53), and the processing returns to the step S33. Such a processing is carried out until the engine body 1 is stopped.

Thus, the processing may be carried out while directly referring to the EGR valve opening degree Ein and VNT nozzle opening degree Vin.

Embodiment 2

Figure 22:
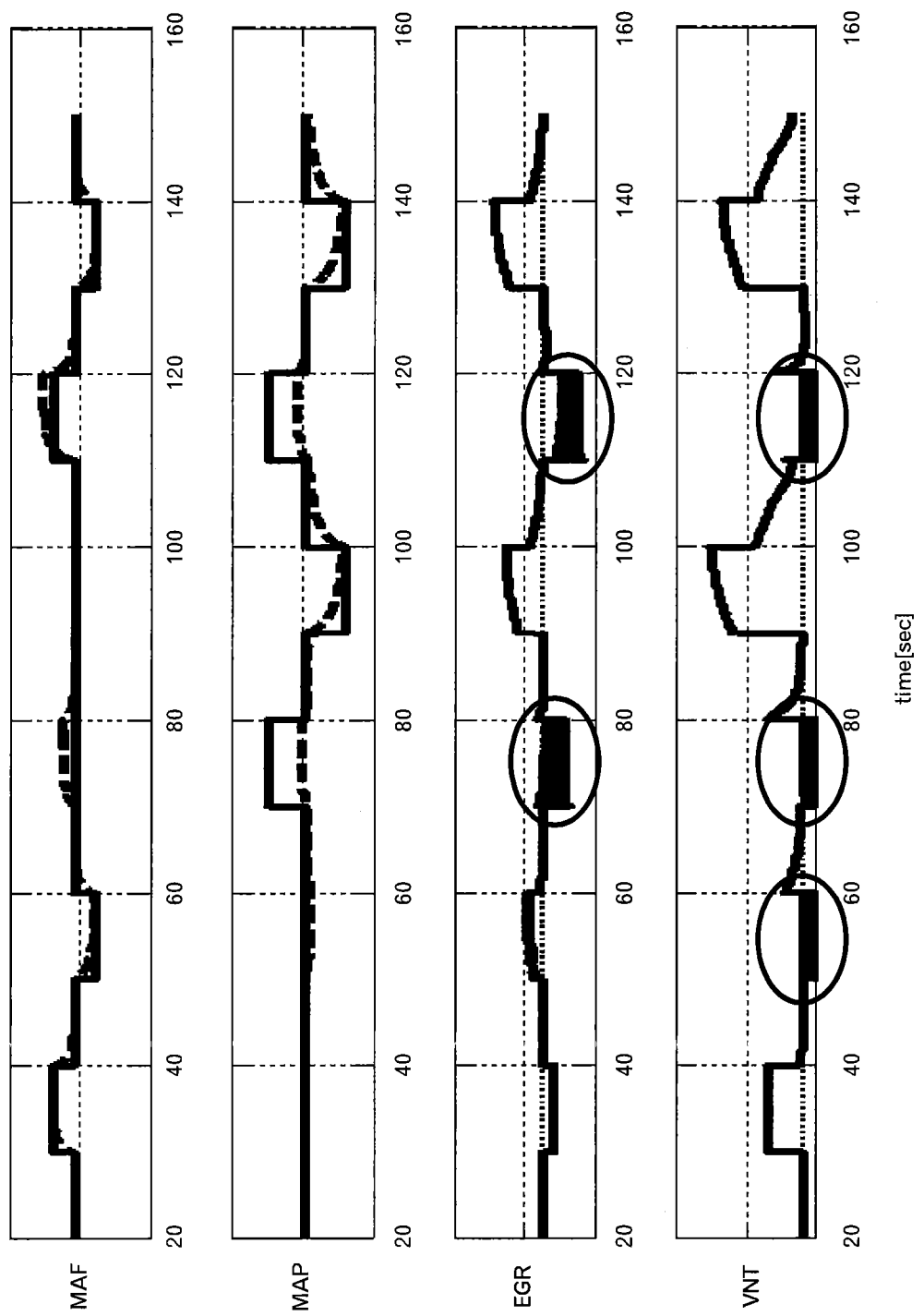
FIG. 22 is a diagram representing temporal changes of MAF, MAP, EGR valve opening degree and VNT nozzle opening degree.

By dynamically switching the MIMO control mode and the SISO control mode according to the first embodiment, PM and NOx are reduced as illustrated in FIG. 5. However, a fact has been understood that a phenomena that the interference compensation path in the MIMO control mode is added or is not added depending on the state of the VNT and EGR, when the state is a transient state (when accelerated or decelerated) around the boundaries of the regions in the control mode distribution illustrated, for example, in FIG. 6. In other words, because the control modes are frequently switched from the MIMO control mode to the SISO control mode, and from the SISO control mode to the MIMO control mode, the control system may unstable because of the chattering as illustrated in FIG. 22. FIG. 22 illustrates temporal changes of the MAF, MAP, EGR valve opening degree and VNT nozzle opening degree, and as for the MAF and MAP, the solid lines represent the target values, and the dotted lines represent the actual values. Moreover, as for the EGR valve opening degree and VNT nozzle opening degree, the actual values are represented. In FIG. 22, the chattering occurs in a portion surrounded by the ellipses.

Then, instead of rapidly conducting the switching of the control modes, by gradually carrying out the mode switching by adjusting the values of the gain elements when the VNT nozzle and EGR valve are in vicinity of a completely-opened state or in vicinity of a completely-closed state, the reaction that the presence or absence of the interference compensation path is frequently switched is relaxed.

Specific Example 1 of Embodiment 2

Figure 23:
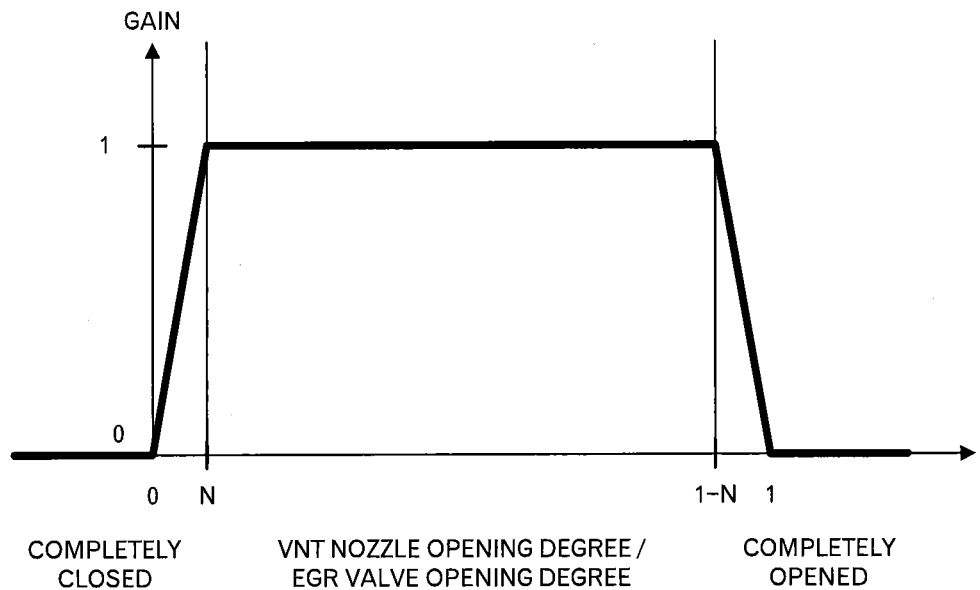
FIG. 23 is a diagram representing an example of a gain function.

For example, as illustrated in FIG. 23, a function whose argument is the VNT nozzle opening degree or EGR valve opening degree is adopted as the gain function. In FIG. 23, the vertical axis represents the value (equal to or greater than 0 and equal to or less than 1) of the gain function, and the horizontal axis represents the reference value Vbs of the VNT nozzle opening degree or reference value Ebs of the EGR valve opening degree or VNT nozzle opening degree Vin or EGR valve opening degree Ein. In an example of FIG. 23, in a range considered as being completely closed from the opening degree "0" (i.e. completely closed) to the opening degree N, the gain function becomes a linear function of the opening degree of the valve or nozzle, which has the inclination 1/N. In addition, the opening degree is the constant "1" in a range from N to (1−N). Furthermore, in a range whose value is equal to or greater than (1−N), the linear function of the opening degree of the valve or nozzle, which has the inclination "−1/N" is adopted.

Figure 24:
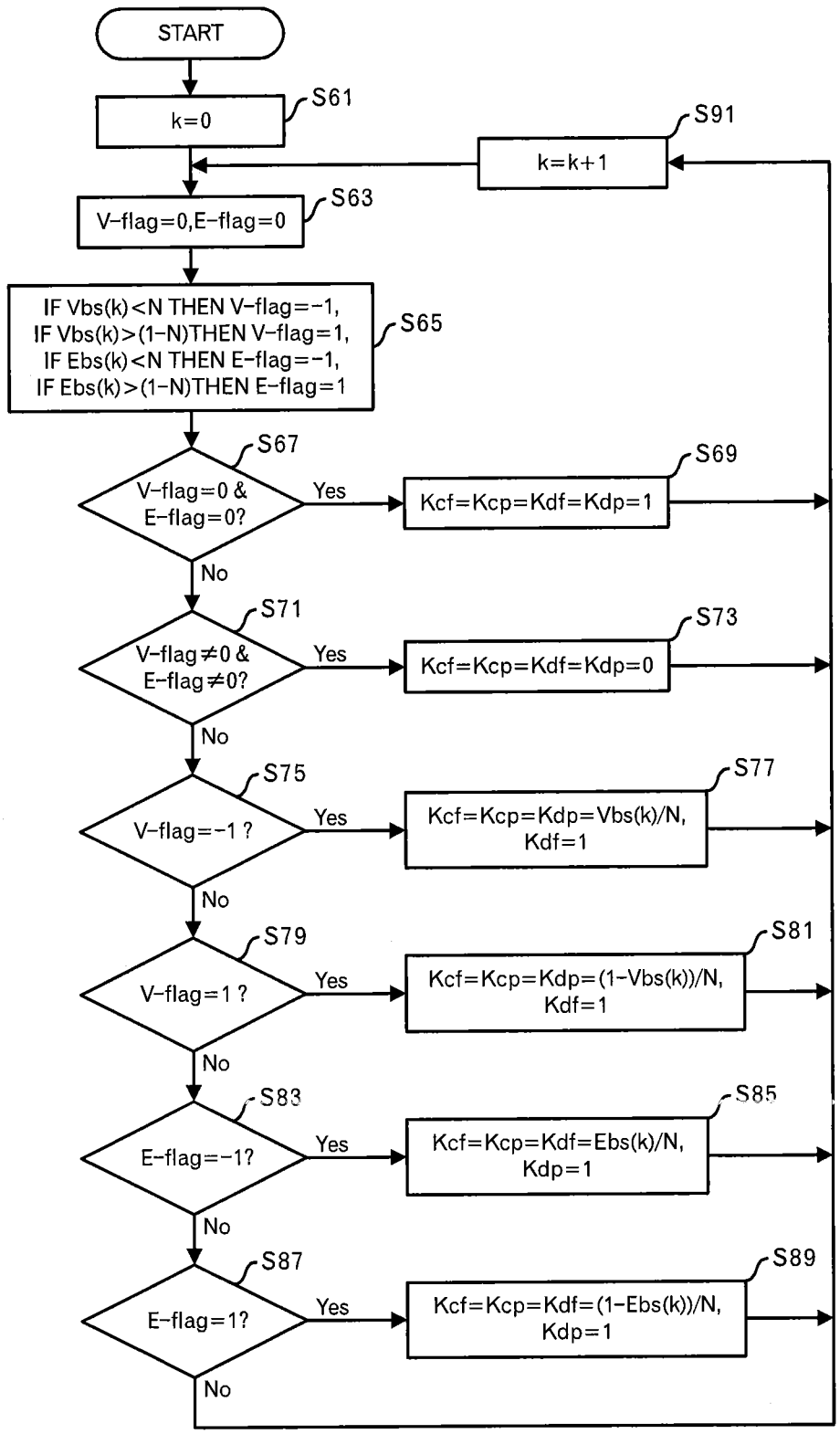
FIG. 24 is a diagram depicting a processing flow in a specific example 1 of an embodiment 2.

In order to realize such a function, the gain function setting unit 160 and the like in the block diagram illustrated in FIG. 10 carry out a processing as illustrated in FIG. 24 in this specific example. First, time k is initialized to "0" (step S61). Time k is the common time in the engine control apparatus 100. Then, when the setting values of the engine speed and fuel injection quantity at time k are inputted, the planning unit 110 outputs the reference Vbs(k) of the VNT nozzle opening degree and the reference Ebs(k) of the EGR valve opening degree, which correspond to the setting values of the engine speed and fuel injection quantity at time k Vbs(k) and Ebs(k) are values from 0 to 1. Furthermore, the planning unit 110 similarly outputs the MAF target value to the MAF control system including the MAF controller 120, and outputs the MAP target value to the MAP control system including the MAP controller 140.

Next, the gain function setting unit 160 sets "0" to V-flag representing a state of the opening or closing of the VNT nozzle, and sets "0" to E-flag representing a state of the opening or closing of the EGR valve (step S63). Then, when the reference value Vbs(k) of the opening degree of the VNT nozzle is less than N (e.g. N is a constant value from about 0.1 to about 0.15, and defines a range considered as being completely opened or completely closed) (i.e. a completely-closed state), the gain function setting unit 160 sets "−1" to V-flag. On the other hand, when Vbs(k) is greater than (1−N) (i.e. a completely-opened state), the gain function setting unit 160 "1" to V-flag. Moreover, when the reference value Ebs(k) of the opening degree of the EGR valve is less than N (i.e. a completely-closed state), the gain function setting unit 160 sets "−1" to E-flag. On the other hand, when Ebs(k) is greater than (1−N) (i.e. a completely-opened state), the gain function setting unit 160 sets "1" to E-flag (step S65). Thus, when Vbs(k) is equal to or greater than N and equal to or less than (1−N), V-flag remains "0", and similarly, when Ebs(k) is equal to or greater than N and equal to or less than (1−N), E-flag remains "0".

After that, the gain function setting unit 160 determines whether or not the state is a state that V-flag is "0" and E-flag also is "0" (step S67). When such a condition is satisfied, the control mode is the MIMO control mode. Therefore, the gain function setting unit 160 sets Kcf=Kcp=Kdf=Kdp=1 as illustrated in FIG. 11 (step S69).

On the other hand, when at least either of V-flag and E-flag is not "0", the gain function setting unit 160 determines whether or not the state is a state that V-flag is not "0" and E-flag also is not "0" (step S71). When such a condition is satisfied, the control mode is the SISO control mode of the VNT and EGR completely closing region D (in case where both of them are completely closed or completely opened). Therefore, the gain function setting unit 160 sets Kcf=Kcp=Kdf=Kdp=0 as illustrated in FIG. 12 (step S73).

Moreover, when either of V-flag and E-flag is not "0", the gain function setting unit 160 determines whether or not V-flag is "−1" (i.e. a state that VNT nozzle is completely closed) (step S75). When such a condition is satisfied, the control system operates like in the MIMO control mode in which the output adjustment is carried out in this specific example. Namely, according to the gain function in FIG. 23, the gain function setting unit 160 sets Kcf=Kcp=Kdp=Vbs(k)/N and Kdf=1 (step S77). Thus, along the straight line with the inclination 1/N in the left side of FIG. 23, the value Vbs(k)/N is calculated according to the target value Vbs(k) of the opening degree of the VNT nozzle. Incidentally, when Vbs(k) is "0", the control mode is the SISO control mode of the VNT completely closing region C.

Furthermore, when V-flag is not "−1", the gain function setting unit 160 determines whether or not V-flag is "1" (i.e. a state where the VNT nozzle is completely opened) (step S79). When such a condition is satisfied, the control system operates like in the MIMO control mode in which the output adjustment is carried out in this specific example. Namely, according to the gain function of FIG. 23, the gain function setting unit 160 sets Kcf=Kcp=Kdp=(1−Vbs(k))/N and Kdf=1 (step S81). Thus, along the straight line with the inclination −1/N in the right side of FIG. 23, the value (1−Vbs(k))/N is calculated according to the target value Vbs(k) of the VNT nozzle opening degree. Incidentally, in case where Vbs(k)=1, the control mode is the SISO control mode of the VNT completely opening region F and Kcf=Kcp=Kdp=0.

In addition, when V-flag is not "1", the gain function setting unit 160 determines whether or not E-flag is "−1" (step S83). When such a condition is satisfied, the control system operates like in the MIMO control mode in which the output adjustment is carried out in this specific example. In other words, according to the gain function of FIG. 23, the gain function setting unit 160 sets Kcf=Kcp=Kdf=Ebs(k)/N and Kdp=1 (step S85). Thus, along the straight line with the inclination 1/N in the left side of FIG. 23, the value Ebs(k)/N is calculated according to the target value Ebs(k) of the EGR valve opening degree. Incidentally, in case of Ebs(k)=0, the control mode is the SISO control mode of the EGR completely closing region B.

Furthermore, when E-flag is not "−1", the gain function setting unit 160 determines whether or not E-flag is "1" (i.e. the EGR valve is completely opened.) (step S87). When such a condition is satisfied, the control system operates like in the MIMO control mode in which the output adjustment is carried out in this specific example. In other words, according to the gain function of FIG. 23, the gain function setting unit 160 sets Kcf=Kcp=Kdf=(1−Ebs(k))/N and Kdp=1 (step S89). Thus, along the straight line with the inclination −1/N in the right side of FIG. 23 the value (1−Ebs(k))/N is calculated according to the target value Ebs(k) of the EGR valve opening degree. Incidentally, in case of Ebs(k)=1, the control mode is the SISO control mode of the EGR completely opening region E and Kcf=Kcp=Kdf=0.

After the step S69, the MAF controller 120 calculates a control value according to the difference between the target value of the MAF and the measurement value of the MAF, and the first interference compensator 150 calculates a compensation value according to the difference between the target value of the MAP and the measurement value of the MAP. Then, the sum of the control value from the MAF controller 120, the compensation value from the first interference compensator 150 and Ebs(k) is calculated as the EGR valve opening degree Ein, the EGR valve of the engine body 1 is controlled according to the Ein. Moreover, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the control value from the MAP controller 140, the compensation value from the second interference compensator 130 and Vbs(k) is calculated as the VNT nozzle opening degree Vin, and the VNT nozzle of the engine body 1 is controlled according to the Vin.

Moreover, after the step S73, Ebs(k) is adopted as the EGR valve opening degree Ein, and the EGR valve of the engine body 1 is controlled according to the Ein. Moreover, Vbs(k) is adopted as the VNT nozzle opening degree Vin, and the VNT nozzle of the engine body 1 is controlled according to the Vin.

Furthermore, after the steps S77, S81, S85 and S89, the MAF controller 120 calculates a control value according to the difference between the MAF target value and the measurement value of the MAF, and the first interference compensator 150 calculates a compensation value according to the difference between the MAP target value and the measurement value of the MAP. Then, the sum of the product of the control value from the MAF controller 120 and Kdf, the product of the compensation value from the first interference compensator 150 and Kcp, and Ebs(k) is calculated as the EGR valve opening degree Ein, and the EGR valve of the engine body 1 is controlled according to the Ein. Moreover, the MAP controller 140 calculates a control value according to the difference between the MAP target value and the measurement value of the MAP, and the second interference compensator 130 calculates a compensation value according to the difference between the MAF target value and measurement value of the MAF. Then, the sum of the product of the control value from the MAP controller 140 and Kdp, the product of the compensation value from the second interference compensator 130 and Kcf, and Vbs(k) is calculated as the VNT nozzle opening degree Vin, and the VNT nozzle of the engine body 1 is controlled according to the Vin.

When the condition of the step S87 is not satisfied, or after the step S69, S73, S77, S81, S85 or S89, k is incremented by "1" (step S91), and the processing returns to the step S63. Such a processing is carried out until the engine body 1 is stopped.

By adjusting the gain elements in this way, the chattering is effectively prevented when the control system operates at a boundary portion of the control modes.

Specific Example 2 of Embodiment 2

Figure 25:
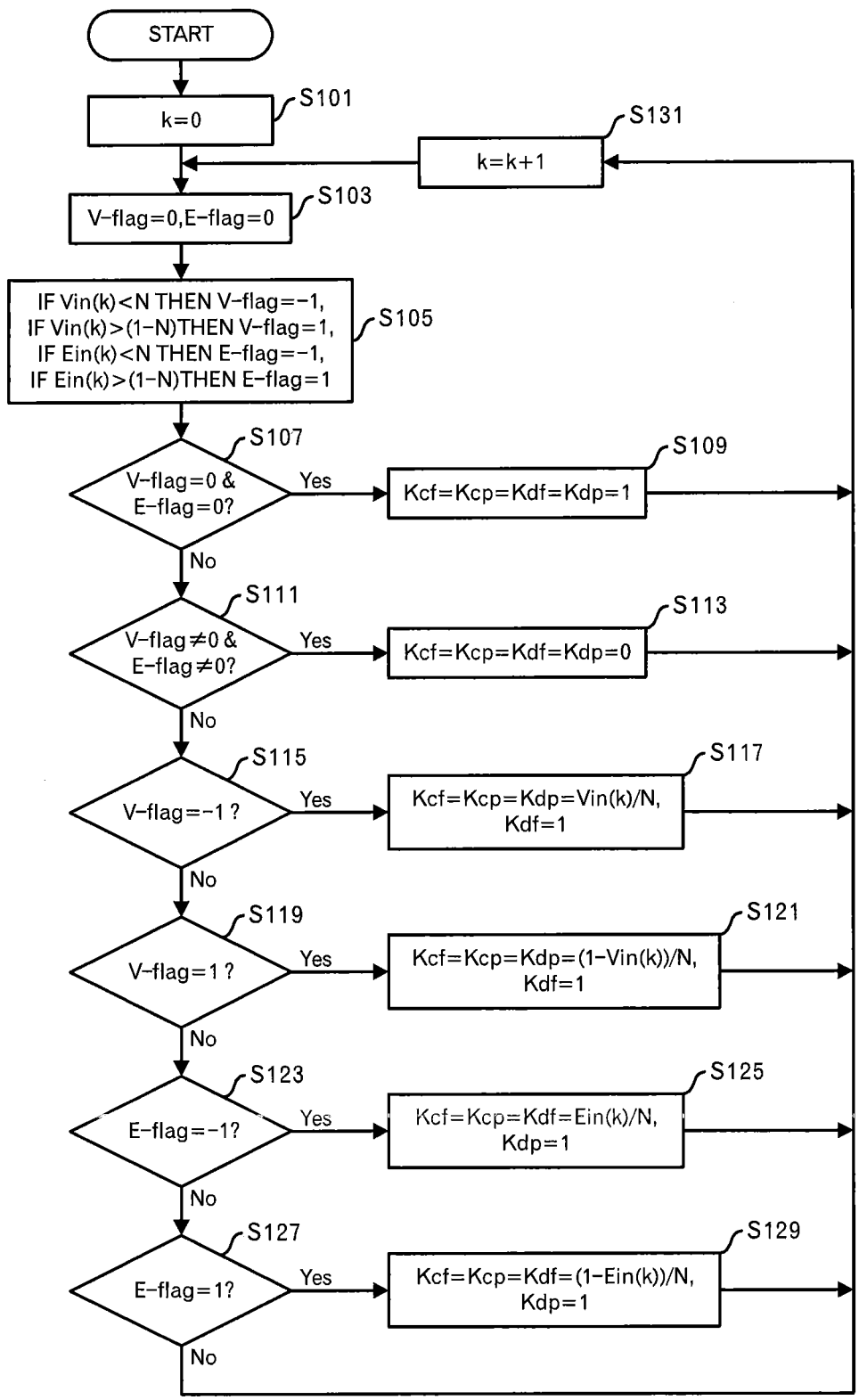
FIG. 25 is a diagram depicting a processing flow in a specific example 2 of the embodiment 2.

In this specific example, the gain function as illustrated in FIG. 23 is adopted, similarly to the first specific example. By realizing such a function, the gain function setting unit 170 and the like in the block diagram as illustrated in FIG. 16 carries out the processing as illustrated in FIG. 25. First, time k is initialized to "0" (step S101).

Moreover, the gain function setting unit 170 sets "0" to V-flag representing a state of the opening or closing of the VNT nozzle, and sets "0" to E-flag representing a state of the opening or closing of the EGR valve (step S103). Then, when the VNT nozzle opening degree Vin(k) at time k is less than N (e.g. N is a value from about 0.1 to about 0.15, and is a constant defining a range considered as being completely opened or completely closed.) (i.e. in a completely-closed state.), the gain function setting unit 170 sets "−1" to V-flag. On the other hand, when the VNT nozzle opening degree Vin(k) is greater than (1−N) (i.e. in a completely-opened state), the gain function setting unit 170 sets "1" to V-flag. In addition, when the EGR valve opening degree Ein(k) is less than N (i.e. in a completely-closed state), the gain function setting unit 170 sets "−1" to E-flag. On the other hand, when Ein(k) is greater than (1−N) (i.e. in a completely-opened state), the gain function setting unit 170 sets "1" to E-flag (step S105). Thus, when Vin(k) is equal to or greater than N and equal to or less than (1−N), V-flag remains "0", and similarly, when Ein (k) is equal to or greater than N and equal to or less than (1−N), E-flag remains "0". Incidentally, Ein(k) and Vin(k) are values from 0 to 1.

After that, the gain function setting unit 170 determines whether or not the state is a state that V-flag is "0" and E-flag also is "0" (step S107). When such a condition is satisfied, the control mode is the MIMO control mode. Therefore, the gain function setting unit 170 sets Kcf=Kcp=Kdf=Kdp=1 as illustrated in FIG. 17 (step S109).

On the other hand, when at least either of V-flag and E-flag is not "0" the gain function setting unit 170 determines whether or not the state is a state that V-flag is not "0" and E-flag also is not "0" (step S111). When such a condition is satisfied, the control mode is the SISO control mode of the VNT and EGR completely closing region D (in case where both of them are either of "completely closed" and "completely opened"). Therefore, the gain function setting unit 170 sets Kcf=Kcp=Kdf=Kdp=0 as illustrated in FIG. 18 (step S113).

Moreover, when either of V-flag and E-flag is not "0", the gain function setting unit 170 determines whether or not V-flag is "−1" (i.e. the VNT nozzle is completely closed.) (step S115). When such a condition is satisfied, the control system operates like in the MIMO control mode in which the output adjustment is carried out in this specific example. In other words, according to the gain function of FIG. 23, the gain function setting unit 170 sets Kcf=Kcp=Kdp=Vin(k)/N and Kdf=1 (step S117). Thus, along the straight line with the inclination 1/N in the left side of FIG. 23, the value Vin(k)/N is calculated according to the VNT nozzle opening degree Vin(k). Incidentally, in case of Vin(k)=0, the control mode becomes the SISO control mode of the VNT completely closing region C.

Furthermore, when V-flag is not "−1", the gain function setting unit 170 determines whether or not V-flag is "1" (i.e. the VNT nozzle is completely opened.) (step S119). When such a condition is satisfied, the control system operates like in the MIMO control mode in which the output adjustment is carried out in this specific example. Namely, according to the gain function of FIG. 23, the gain function setting unit 170 sets Kcf=Kcp=Kdp=(1−Vin(k))/N and Kdf=1 (step S121). Thus, along the straight line with the inclination −1/N in the right side of FIG. 23, the value (1−Vin(k))/N is calculated according to the VNT nozzle opening degree Vin(k). Incidentally, in case of Vin(k)=1, the control mode is the SISO control mode of the VNT completely opening region F. Therefore, Kcf=Kcp=Kdp=0.

In addition, when V-flag is not "1", the gain function setting unit 170 determines whether or not E-flag is "−1" (step S123). When such a condition is satisfied, the control system operates like in the MIMO control mode in which the output adjustment is carried out, in this specific example. Namely, according to the gain function of FIG. 23, the gain function setting unit 170 sets Kcf=Kcp=Kdf=Ein(k)/N and Kdp=1 (step S125). Thus, along the straight line with the inclination 1/N in the left side of FIG. 23, the value Ein(k)/N is calculated according to the EGR valve opening degree Ein(k). Incidentally, in case of Ein (k)=0, the control mode is the SISO control mode of the EGR completely closing region B.

Furthermore when F-flag is not "−1" the gain function setting unit 170 determines whether or not E-flag is "1" (i.e. the EGR valve is completely opened.) (step S127). When such a condition is satisfied, the control system operates like in the MIMO control mode in which the output adjustment is carried out, in this specific example. Namely, according to the gain function of FIG. 23, the gain function setting unit 170 sets Kcf=Kcp=Kdf=(1−Ein(k))/N and Kdp=1 (step S129). Thus, along the straight line with the inclination −1/N in the right side of FIG. 23, the value (1−Ein(k))/N is calculated according to the EGR valve opening degree Ein(k). Incidentally, in case of Ein(k)=1, the control mode is the SISO control mode of the EGR completely opening region E, and Kcf=Kcp=Kdf=0.

Incidentally, in addition to the aforementioned processing flow, when the setting values of the engine speed and fuel injection quantity at time k are inputted, the planning unit 110 outputs the reference value Vbs(k) of the VNT nozzle opening degree and the reference value Ebs(k) of the EGR valve opening degree, which correspond to the setting values of the engine speed and the fuel injection quantity at time k. Furthermore, the planning unit 110 similarly outputs the MAF target value to the MAF control system including the MAF controller 120, and the MAP target value to the MAP control system including the MAP controller.

Then, after the step S109, the MAF controller 120 calculates a control value according to the difference between the MAF target value and the measurement value of the MAF, and the first interference compensator 150 calculates a compensation value according to the difference between the MAP target value and the measurement value of the MAP. Then, the sum of the control value from the MAF controller 120, the compensation value from the first interference compensator 150 and Ebs(k) is calculated as the EGR valve opening degree Ein (k+1), and the EGR valve of the engine body 1 is controlled according to the Ein(k+1). Moreover, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the control value from the MAP controller 140, the compensation value from the second interference compensator 130 and Vbs(k) is calculated as the VNT nozzle opening degree Vin(k+1), and the VNT nozzle of the engine body 1 is controlled according to the Vin(k+1).

Moreover, after the step S113, Ebs(k) is adopted as the EGR valve opening degree Ein(k+1), and the EGR valve of the engine body 1 is controlled according to the Ein(k+1). In addition, Vbs(k) is adopted as the VNT nozzle opening degree Vin(k+1), and the VNT nozzle of the engine body 1 is controlled according to the Vin(k+1).

Furthermore, after the steps S117, S121, S125 and S129, the MAF controller 120 calculates a control value according to the difference between the MAF target value and the measurement value of the MAF, and the first interference compensator 150 calculates a compensation value according to the difference between the MAP target value and the measurement value of the MAP. Then, the sum of the product of the control value from the MAF controller 120 and Kdf, the product of the compensation value from the first interference compensator 150 and Kcp, and Ebs(k) is calculated as the EGR valve opening degree Ein, and the EGR valve of the engine body 1 is controlled according to the Ein. Moreover, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the product of the control value from the MAP controller 140 and Kdp, the product of the compensation value from the second interference compensator 130 and Kcf, and Vbs(k) is calculated as the VNT nozzle opening degree Vin, and the VNT nozzle of the engine body 1 is controlled according to the Vin.

When the condition of the step S127 is not satisfied, or after the step S109, S113, S117, S121, S125 or S129, k is incremented by "1" (step S131), and the processing returns to the step S103. Such a processing is carried out until the engine body 1 is stopped.

By adjusting the gain elements in this way, the chattering is effectively, prevented when the control system operates at a boundary portion of the control modes.

Specific Example 3 of Embodiment 2

Figure 26:
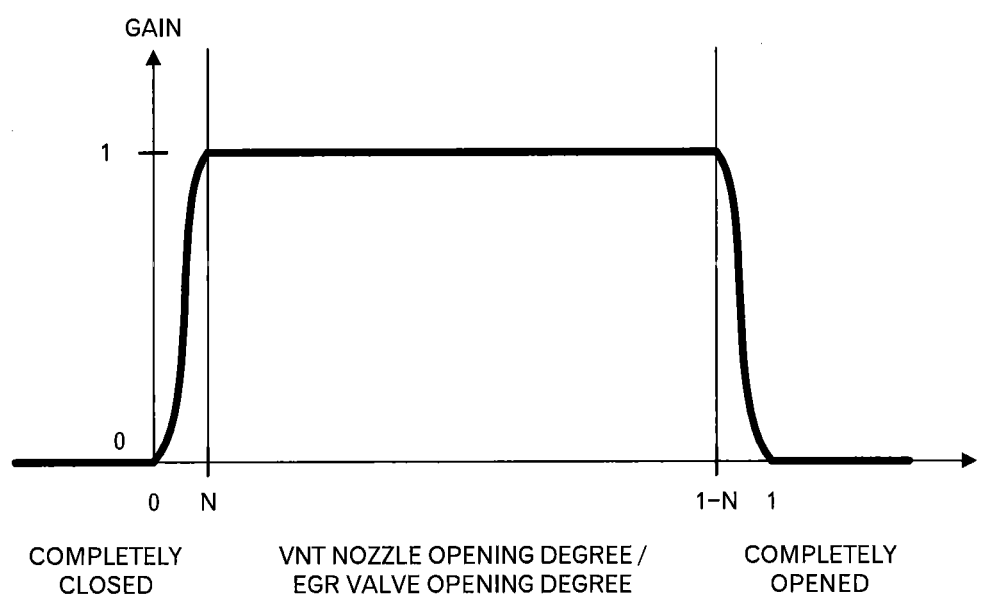
FIG. 26 is a diagram depicting an example using a sigmoid function as the gain function.
Figure 27:
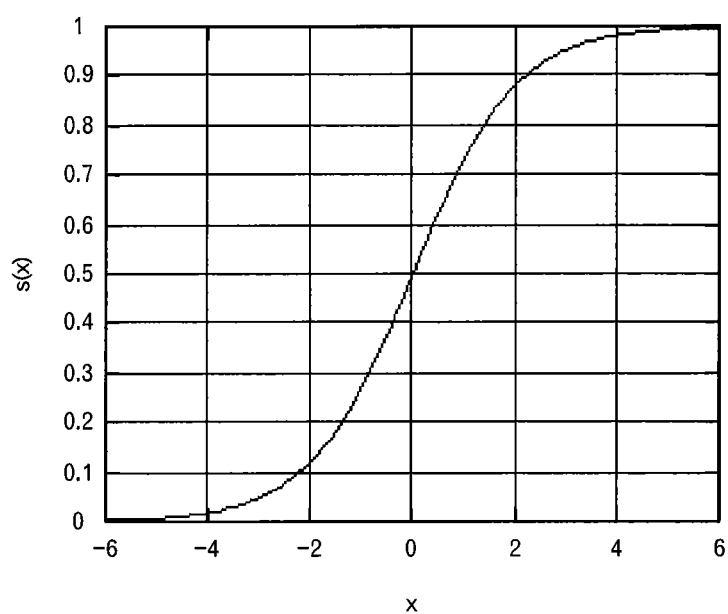
FIG. 27 is a diagram depicting an example of the sigmoid function.

The gain function as illustrated in FIG. 23 is adopted in the specific examples 1 and 2 of the embodiment 2. However, this embodiment is not limited to the gain function illustrated in FIG. 23. For example, it is possible to adopt a gain function as illustrated in FIG. 26. In FIG. 26, the vertical axis represents the values (from 0 to 1) of the gain function, and the horizontal axis represents the reference value Vbs of the VNT nozzle opening degree or reference value Ebs of the EGR valve opening degree, or the VNT nozzle opening degree Vin or EGR valve opening degree Ein. In an example of FIG. 26, a sigmoid function is adopted for a range considered as being completely closed, namely from the opening degree 0 (i.e. completely closed) to the opening degree N. The sigmoid function s(x) is defined as follows, and is one of monotonic increasing continuous functions, and has one point of inflection as illustrated in FIG. 27. FIG. 27 represents a reference sigmoid function having a gain "1".

$$s(x) = \frac{1}{1+e^{-x}} \qquad (1)$$

Because the entirely smoother function can be obtained by using the sigmoid function, it is effective to prevent from chattering.

Figure 28:
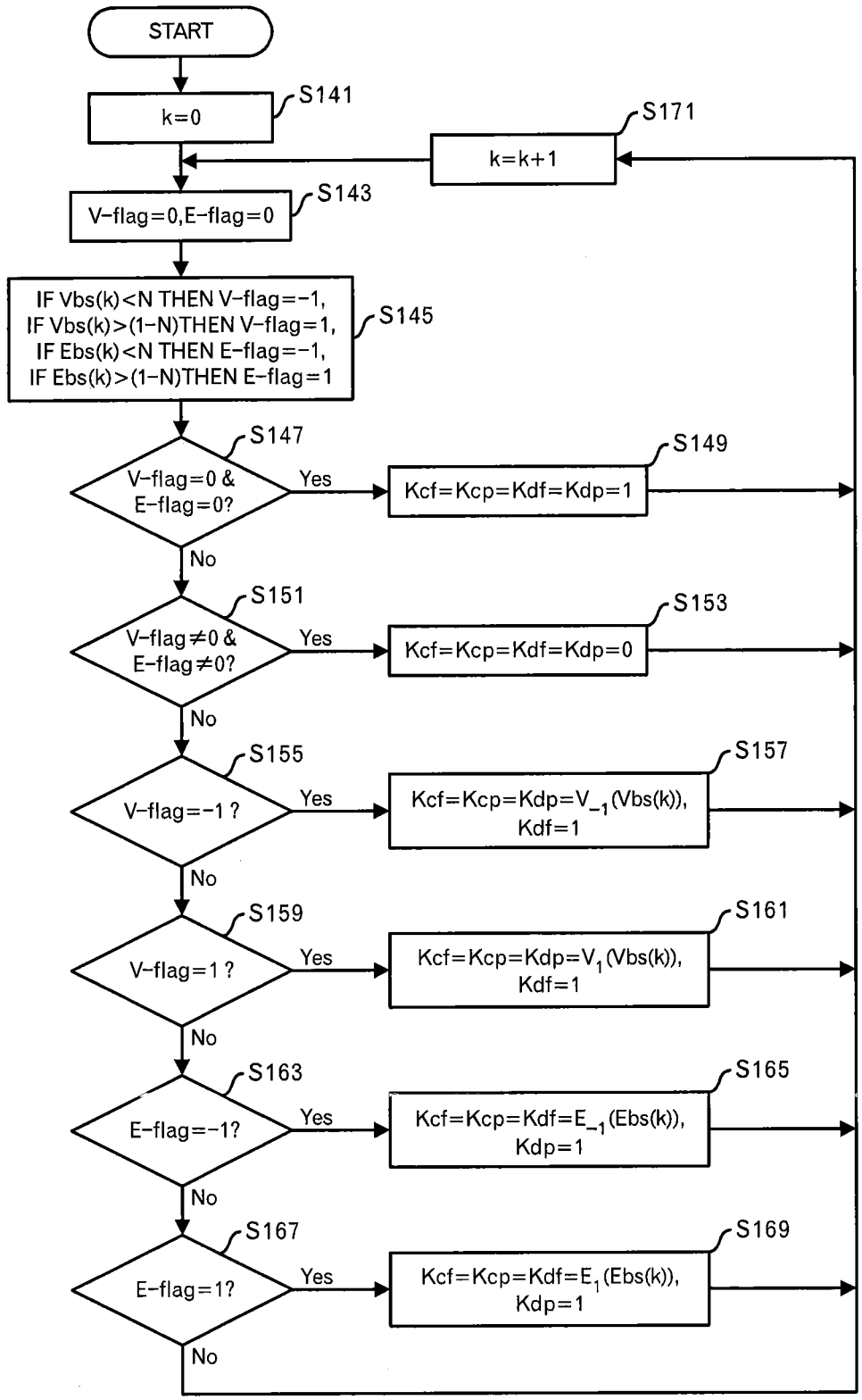
FIG. 28 is a diagram depicting a processing flow in a specific example 3 of the embodiment 2.

In order to realize such a function, the gain function setting unit 160 and the like in the block diagram illustrated in FIG. 10 carryout a processing as illustrated in FIG. 28.

First, time k is initialized to "0" (step S141). Time k is the common time in the engine control apparatus 100. Then, when the setting values of the engine speed and fuel injection quantity at time k are inputted, the planning unit 110 outputs the reference value Vbs(k) of the VNT nozzle opening degree and the reference value Ebs(k) of the EGR valve opening degree, which correspond to the setting values of the engine speed and fuel injection quantity at time k. Vbs(k) and Ebs(k) are values from 0 to 1. Furthermore, the planning unit 110 similarly outputs the MAF target value to the MAF control system including the MAF controller 120, and outputs the MAP target value to the MAP control system including the MAP controller 140.

Next, the gain function setting unit 160 sets "0" to V-flag representing a state of the opening or closing of the VNT nozzle, and sets "0" to E-flag representing a state of the opening or closing of the EGR valve (step S143). Then, when the reference value Vbs(k) of the VNT nozzle opening degree is less than N (e.g. N is a value from about 0.1 to about 0.15, and is a constant defining a range considered as being completely opened or completely closed.) (i.e. a completely-closed state), the gain function setting unit 160 sets "−1" to V-flag. On the other hand, when Vbs(k) is greater than (1−N) (i.e. a completely-opened state), the gain function setting unit 160 sets "1" to V-flag. In addition, when the reference value Ebs(k) of the EGR valve opening degree is less than N (i.e. a completely-closed state), the gain function setting unit 160 sets "−1" to E-flag. On the other hand, when Ebs(k) is greater than (1−N) (i.e. a completely-opened state), the gain function setting unit 160 sets "1" to E-flag (step S145). Thus, when Vbs(k) is equal to greater than N and equal to or less than (1−N), V-flag remains "0", and similarly, when Ebs(k) is equal to or greater than N and equal to or less than (1−N), E-flag remains "0".

After that, the gain function setting unit 160 determines whether or not the state is a state that V-flag is "0" and E-flag also is "0" (step S147). When such a condition is satisfied, the control mode is the MIMO control mode. Therefore, the gain function setting unit 160 sets Kcf=Kcp=Kdf=Kdp=1 as illustrated in FIG. 11 (step S149).

On the other hand, when at least either of V-flag and E-flag is not "0", the gain function setting unit 160 determines whether or not the state is a state that V-flag is not "0" and E-flag also is not "0" (step S151). When such a condition is satisfied, the control mode is the SISO control mode of the VNT and EGR completely closing region D (i.e. when both of them are completely closed or completely opened). Therefore, the gain function setting unit 160 sets Kcf=Kcp=Kdf=Kdp=0 as illustrated in FIG. 12 (step S153).

In addition, when either of V-flag and E-flag is not "0", the gain function setting unit 160 determines whether or not V-flag is "−1" (i.e. the VNT nozzle is completely closed.) (step S155). When such a condition is satisfied, the control system operates like in the MIMO control mode in which the output adjustment is carried out, in this example. Namely, according to the gain function as illustrated in FIG. 26, the gain function setting unit 160 sets Kcf=Kcp=Kdp=V$_{-1}$(Vbs (k)) and Kdf=1 (step S157).

V$_{-1}$(Vbs(k)) is a function defined as follows:

$$V_{-1}(Vbs(k)) = \frac{1}{1+e^{-\left(\frac{2S}{N}Vbs(k)-S\right)}} \qquad (2)$$

In this expression, N is a value to determine a range considered as being completely closed or completely opened as described above, and S is a constant equal to or greater than 10, for example. This expression represents an example of the sigmoid function which outputs "0" in case of Vbs(k)=0, ½ in case of Vbs(k)=N/2, and 1 in case of Vbs(k)=N. Greater than 10 S is, nearer to this condition the output is. For example, in case of N=0.2 and S=10, the output is 0.00045 in case of Vbs(k)=0, and the output is 0.5 in case of Vbs(k)=N/2=0.1, and the output is 0.99996 in case of Vbs(k)=N=0.2.

Thus, along the curve of the $V_{-1}$ function in the left side of FIG. 26, a value is calculated according to the reference Vbs(k) of the VNT nozzle opening degree. Incidentally, in case of Vbs(k)=0, the control mode is almost the SISO control mode of the VNT completely closing region C.

Furthermore, when V-flag is not "−1", the gain function setting unit 160 determines whether or not V-flag is "1" (i.e. the VNT nozzle is completely opened.) (step S159). When such a condition is satisfied, the control system operates like in the MIMO control mode in which the output adjustment is carried out, in this specific example. Namely, according to the gain function illustrated in FIG. 26, the gain function setting unit 160 sets Kcf=Kcp=Kdp=$V_1$(Vbs(k)) and Kdf=1 (step S161)

$V_1$(Vbs(k)) is a function as defined as follows:

$$V_1(Vbs(k)) = \frac{1}{1 + e^{-\left(-\frac{2S}{N}Vbs(k) + \frac{2-N}{N}S\right)}} \quad (3)$$

The definitions of N and S are the same as those of the function $V_{-1}$. This expression represents an example of the sigmoid functions that, in case of Vbs(k)=(1−N), the output is 1, in case of Vbs(k)=1−N/2, the output is ½, in case of Vbs(k)=1, the output is 0. When S is greater than 10, the output becomes nearer to this condition. For example, in case of N=0.2 and S=10, Vbs(k)=(1−0.2)=0.8, the output is 0.9996, in case of Vbs(k)=1−0.2/2=0.9, the output is 0.5, and in case of Vbs(k)=1, the output is 0.00045.

Thus, along the function $V_1$ in the right side of FIG. 26, a value is calculated according to the reference value Vbs(k) of the VNT nozzle opening degree. Incidentally, in case of Vbs(k)=1, the control mode is the SISO control mode of the VNT completely opening region F, and almost Kcf=Kcp=Kdp=0.

Moreover, when V-flag is not "1", the gain function setting unit 160 determines whether or not E-flag is "−1" (step S163). When such a condition is satisfied, the control system operates like in the MIMO control mode in which the output adjustment is carried out, in this specific example. Namely, according to the gain function of FIG. 26, the gain function setting unit 160 sets Kcf=Kcp=Kdf=$E_{-1}$(Ebs(k)) and Kdp=1 (step S165).

$E_{-1}$(Ebs(k)) is a function as defined as follows:

$$E_{-1}(Ebs(k)) = \frac{1}{1 + e^{-\left(\frac{2S}{N}Ebs(k) - S\right)}} \quad (4)$$

This function basically has the same form as that in the expression (2). Thus, along the function $E_{-1}$ in the left side of FIG. 26, a value is calculated according to the reference value Ebs(k) of the EGR valve opening degree. Incidentally, in case of Ebs(k)=0, the control mode is almost the SISO control mode of the EGR completely closing region B.

Furthermore, when E-flag is not "−1", the gain function setting unit 160 determines whether or not E-flag is "1" (i.e. the EGR valve is completely opened.) (step S167). When such a condition is satisfied, the control system operates like in the MIMO control mode in which the output adjustment is carried out, in this specific example. Namely, according to the gain function of FIG. 26, the gain function setting unit 160 sets Kcf=Kcp=Kdf=$E_1$(Ebs(k)) and Kdp=1 (step S169).

$E_1$(Ebs(k)) is a function defined as follows:

$$E_1(Ebs(k)) = \frac{1}{1 + e^{-\left(-\frac{2S}{N}Ebs(k) + \frac{2-N}{N}S\right)}} \quad (5)$$

Basically, this function has the same form as that of the expression (3). Thus, according to the curve of the function $E_1$ in the right side of FIG. 26, a value is calculated according to the reference value Ebs(k) of the EGR valve opening degree. Incidentally, in case of Ebs(k)=1, the control mode is the SISO control mode of the EGR completely opening region E, and almost Kcf=Kcp=Kdf=0.

After the step S149, the MAF controller 120 calculates a control value according to the difference between the MAF target value and the measurement value of the MAF, and the first interference compensator 150 calculates a compensation value according to the difference between the MAP target value and the measurement value of the MAP. Then, the sum of the control value from the MAF controller 120, the compensation value from the first interference compensator 150 and Ebs(k) is calculated as the EGR valve opening degree Ein, and the EGR valve of the engine body 1 is controlled according to the Ein. Moreover, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the control value from the MAP controller 140, the compensation value from the second interference compensator 130 and Vbs(k) is calculated as the VNT nozzle opening degree Vin, and the VNT nozzle of the engine body 1 is controlled according to the Vin.

Moreover, after the step S153, Ebs(k) is adopted as the EGR valve opening degree Ein, and the EGR valve of the engine body 1 is controlled according to the Ein. In addition, Vbs(k) is adopted as the VNT nozzle opening degree Vin, and the VNT nozzle of the engine body 1 is controlled according to the Vin.

Furthermore, after the steps S157, S161, S165 and S169, the MAF controller 120 calculates a control value according to the difference between the MAF target value and the measurement value of the MAF, and the first interference compensator 150 calculates a compensation value according to the MAP target value and the measurement value of the MAP. Then, the sum of the product of the control value from the MAF controller 120 and Kdf, the product of the compensation value from the first interference compensator 150 and Kcp, and Ebs(k) is calculated as the EGR valve opening degree Ein, and the EGR valve of the engine body 1 is controlled according to the Ein. Moreover the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the product of the control value from the MAP controller 140 and Kdp, the product of the compensation value from the second interference compensator 130 and Kcf, and Vbs(k) is calculated as the VNT nozzle opening degree Vin, and the VNT nozzle of the engine body 1 is controlled according to the Vin.

When it is determined that the condition of the step S167 is not satisfied, or after the step S149, S153, S157, S161, S165 or S169, k is incremented by "1" (step S171), and the processing returns to the step S143. Such a processing is carried out until the engine body 1 is stopped.

By adjusting the gain elements in this way, the chattering can be effectively prevented, when the control system operates in a boundary portion of the control modes.

Specific Example 4 of Embodiment 2

Figure 29:
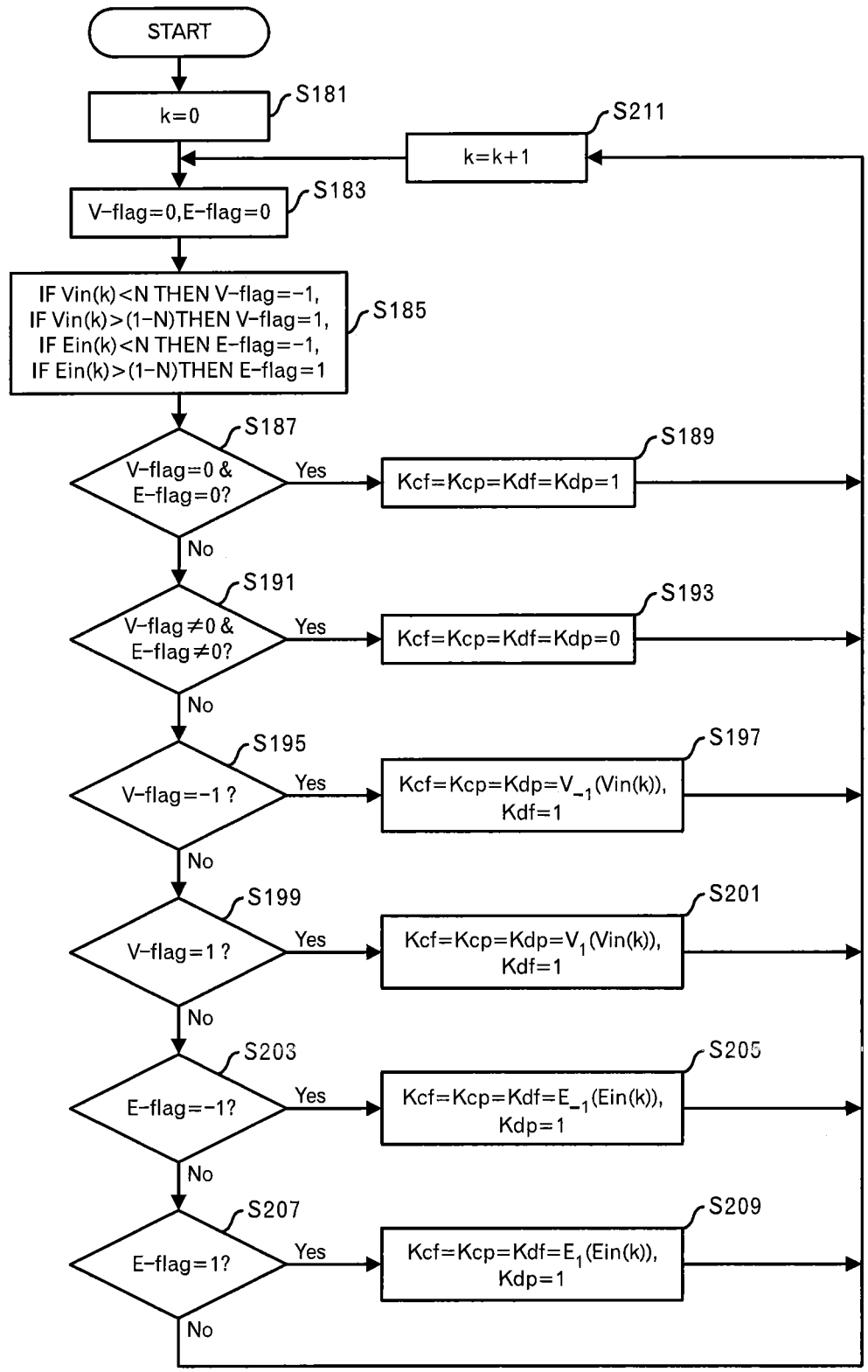
FIG. 29 is a diagram depicting a processing flow in a specific example 4 of the embodiment 2.

Also in this specific example, a gain function as illustrated in FIG. 26 is adopted similarly to the third specific example. In order to realize such a function, the gain function setting unit 170 and the like in the block diagram illustrated in FIG. 16 conducts a processing as illustrated in FIG. 29. First, time k is initialized to "0" (step S181).

Furthermore, the gain function setting unit 170 sets "0" to V-flag representing a state of the closing or opening of the VNT nozzle, and sets "0" to E-flag representing a state of the closing or opening of the EGR valve (step S183). Then, when the VNT nozzle opening degree Vin(k) at time k is less than N (e.g. N is a value from about 0.1 to about 0.15, and is a constant defining a range considered as being completely closed or completely opened.) (i.e. a completely-closed state), the gain function setting unit 170 sets "−1" to V-flag. On the other hand, when the VNT nozzle opening degree Vin(k) is greater than (1−N) (i.e. a completely-opened state), the gain function setting unit 170 sets "1" to V-flag. Moreover, when the EGR valve opening degree Ein(k) is less than N (i.e. a completely-closed state), the gain function setting unit 170 sets "−1" to E-flag. On the other hand, when Ein(k) is greater than (1−N) (i.e. a completely-opened state), the gain function setting unit 170 sets "1" to E-flag (step S185). Thus, when Vin(k) is equal to or greater than N and equal to or less than (1−N), V-flag remains "0", and similarly when Ein(k) is equal to or greater than N and equal to or less than (1−N), E-flag remains "0". Incidentally, Ein(k) and Vin(k) are values from 0 to 1

After that, the gain function setting unit 170 determines whether or not the state is a state that V-flag is "0" and E-flag also is "0" (step S187). When such a condition is satisfied, the control mode is the MIMO control mode. Therefore, the gain function setting unit 170 sets Kcf=Kcp=Kdf=Kdp=1 as illustrated in FIG. 17 (step S189).

On the other hand, when at least either of V-flag and E-flag is not "0", the gain function setting unit 170 whether or not the state is a state that V-flag is not "0" and E-flag also is not "0" (step S191). When such a condition is satisfied, the control mode is the SISO control mode of the VNT and EGR completely closing region D (i.e. both of them are either completely opened or completely closed), the gain function setting unit 170 sets Kcf=Kcp=Kdf=Kdp=0 as illustrated in FIG. 18 (step S193).

Moreover, when either of V-flag and E-flag is not "0", the gain function setting unit 170 determines whether or not V-flag is "−1" (i.e. the VNT nozzle is completely-closed.) (step S195). When such a condition is satisfied, the control system operates like in the MIMO control mode in which the output adjustment is carried out, in this specific example. In other words, according to the gain function of FIG. 26, the gain function setting unit 170 sets Kcf=Kcp=Kdp=V$_{-1}$(Vin(k)) and Kdf=1 (step S197).

V$_{-1}$(Vin(k)) is a function defined as follows:

$$V_{-1}(Vin(k)) = \frac{1}{1 + e^{-\left(\frac{2S}{N}Vin(k) - S\right)}} \quad (6)$$

Basically, this function has the same form as that of the expression (2). Thus, according to the curve of the function V$_{-1}$ in the left side of FIG. 26, a value is calculated according to the VNT nozzle opening degree Vin(k). Incidentally, in case of Vin(k)=0, the control mode is the SISO control mode of almost the VNT completely closing region C.

Furthermore, when V-flag is not "−1", the gain function setting unit 170 determines whether or not V-flag is "1" (i.e. the VNT nozzle is completely-opened.) (step S199). When such a condition is satisfied, the control system operates like in the MIMO control mode in which the output adjustment is carried out, in this specific example. Namely, according to the gain function of FIG. 26, the gain function setting unit 170 sets Kcf=Kcp=Kdp=V$_1$(Vin(k)) and Kdf=1 (step S201).

V$_1$(Vin(k)) is a function defined as follows:

$$V_1(Vin(k)) = \frac{1}{1 + e^{-\left(-\frac{2S}{N}Vin(k) + \frac{2-N}{N}S\right)}} \quad (7)$$

Basically, this function has the same form as that of the expression (3). Thus, according to the curve of the function V$_1$ in the right side of FIG. 26, a value is calculated according to the VNT nozzle opening degree Vin(k). Incidentally, in case of Vin(k)=1, the control mode is the SISO control mode of the VNT completely opening region F, and Kcf=Kcp=Kdp=0.

Moreover, when V-flag is not "1", the gain function setting unit 170 determines whether or not E-flag is "−1" (step S203). When such a condition is satisfied, the control system operates like in the MIMO control mode in which the output adjustment is carried out, in this specific example. Namely, according to the gain function of FIG. 26, the gain function setting unit 170 sets Kcf=Kcp=Kdf=E$_{-1}$(Ein(k)) and Kdp=1 (step S205).

E$_{-1}$(Ein(k)) is a function defined as follows:

$$E_{-1}(Ein(k)) = \frac{1}{1 + e^{-\left(\frac{2S}{N}Ein(k) - S\right)}} \quad (8)$$

Basically, this function has the same form as that of the expression (4). Thus, along the curve of the function E$_{-1}$ in the left side of FIG. 26, a value is calculated according to the EGR valve opening degree Ein(k). Incidentally, in case of Ein(k)=0, the control mode is the SISO control mode of almost the EGR completely closing region B.

Furthermore, when E-flag is not "−1", the gain function setting unit 170 determines whether or not E-flag is "1" (i.e. the EGR valve is completely-opened.) (step S207). When such a condition is satisfied, the control system operates like in the MIMO control mode in which the output adjustment is carried out, in this specific example. In other words, according to the gain function of FIG. 26, the gain function setting unit 170 sets Kcf=Kcp=Kdf=E$_1$(Ein(k)) and Kdp=1 (step S209).

$E_1(Ein(k))$ is a function defined as follows:

$$E_1(Ein(k)) = \frac{1}{1 + e^{-\left(-\frac{2S}{N}Ein(k) + \frac{2-N}{N}S\right)}} \quad (9)$$

Basically, this function has the same form as that of the expression (5). Thus, along the curve of the function $E_1$ in the right side of FIG. 26, a value is calculated according to the EGR valve opening degree Ein(k). Incidentally, in case of Ein(k)=1, the control mode is the SISO control mode of the EGR completely opening region E, and almost Kcf=Kcp=Kdf=0.

Incidentally, in addition to the aforementioned processing, when the setting values of the engine speed and fuel injection quantity at time k are inputted, the planning unit 110 outputs the reference value Vbs(k) of the VNT nozzle opening degree and the reference value Ebs(k) of the EGR valve opening degree, which correspond to the setting values of the engine speed and fuel injection quantity at time k. Furthermore, the planning unit 110 similarly outputs the MAF target value to the MAF control system including the MAF controller 120, and outputs the MAP target value to the MAP control system including the MAP controller 140.

Then, after the step S189, the MAF controller 120 calculates a control value according to the difference between the MAF target value and the measurement value of the MAF, and the first interference compensator 150 calculates a compensation value according to the difference between the MAP target value and the measurement value of the MAP. Then, the sum of the control value from the MAF controller 120, the compensation value from the first interference compensator 150, and Ebs(k) is calculated as the EGR valve opening degree Ein(k+1), and the EGR valve of the engine body 1 is controlled according to the Ein(k+1). Moreover, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the control value from the MAP controller 140, the compensation value from the second interference compensator 130 and Vbs(k) is calculated as the VNT nozzle opening degree Vin(k+1), and the VNT nozzle of the engine body 1 is controlled according to the Vin(k+1).

Moreover, after the step S193, Ebs(k) is adopted as the EGR valve opening degree Ein(k+1), and the EGR valve of the engine body 1 is controlled according to the Ein(k+1). In addition, Vbs(k) is adopted as the VNT nozzle opening degree Vin(k+1), and the VNT nozzle of the engine body 1 is controlled according to the Vin(k+1).

Furthermore, after the steps S197, S201, S205 and S209, the MAF controller 120 calculates a control value according to the difference between the MAF target value and the measurement value of the MAF, and the first interference compensator 150 calculates a compensation value according to the difference between the MAP target value and the measurement value of the MAP. Then, the sum of the product of the control value from the MAF controller 120 and Kdf, the product of the compensation value from the first interference compensator 150 and Kcp, and Ebs(k) is calculated as the EGR valve opening degree Ein, and the EGR valve of the engine body 1 is controlled according to the Ein. Moreover, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the product of the control value from the MAP controller 140 and Kdp, the product of the compensation value from the second interference compensator 130 and Kcf, and Vbs(k) is calculated as the VNT nozzle opening degree Vin, and the VNT nozzle of the engine body 1 is controlled according to the Vin.

When it is determined that the condition of the step S207 is not satisfied, or after the step S189, S193, S197, S201, S205 or S209, k is incremented by "1" (step S211), the processing returns to the step S183. Such a processing is carried out until the engine body 1 is stopped.

By adjusting the gain elements in this way, the chattering can be effectively prevented, when the control system operates in a boundary portion of the control modes.

Specific Example 5 of Embodiment 2

Figure 30:
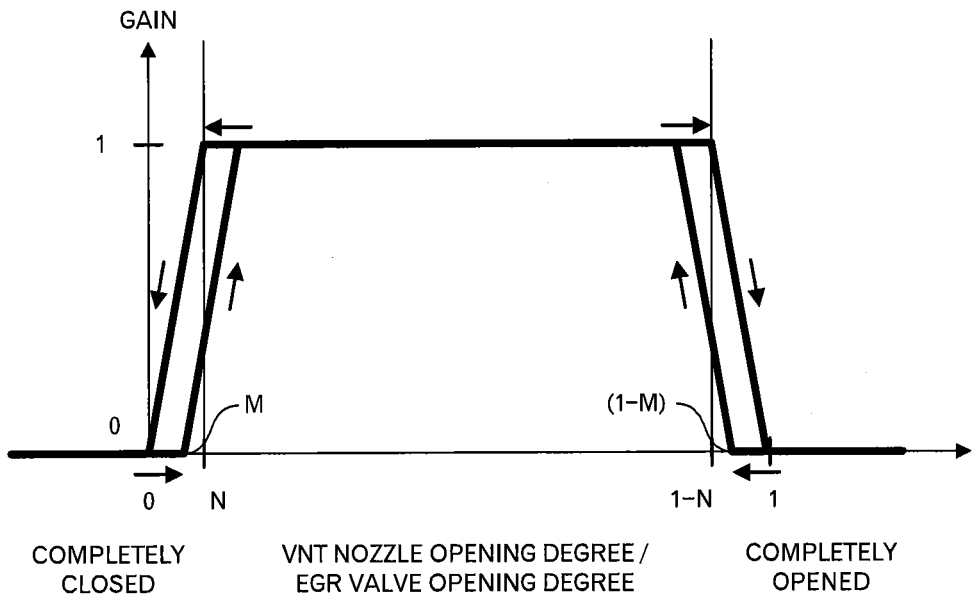
FIG. 30 is a diagram depicting an example when a linear function with the hysteresis characteristic is adopted as the gain function.

In this specific example, a function whose argument is the VNT nozzle opening degree or EGR valve opening degree as illustrated in FIG. 30 is adopted as the gain function. In FIG. 30, the vertical axis represents values (from 0 to 1) of the gain function, and the horizontal axis represents the reference value Vbs of the VNT nozzle opening degree or reference value Ebs of the EGR valve opening degree or VNT nozzle opening degree Vin or EGR valve opening degree Ein. In an example of FIG. 30, a linear function having a hysteresis characteristic is adopted. In other words, when the VNT nozzle opening degree or EGR valve opening degree changes from a completely-opened state toward a completely-closed state, the same linear function as FIG. 23 is adopted in a range from the nozzle opening degree or valve opening degree "0" to "N". Namely, in the range considered as being completely closed from the opening degree "0" (i.e. in a completely-closed state) to the opening degree N, the linear function of the valve opening degree or nozzle opening degree with the inclination 1/N is used. On the other hand, when the opening degree changes from a completely-closed state to a completely-opened state, the linear function that is shifted toward the right by the width M of the hysteresis is adopted. In other words, the gain is "0" in a range from the nozzle opening degree or valve opening degree "0" to M, and the linear function having the inclination 1/N is used in a range from M to N+M.

Moreover, when the opening degree changes from a completely-opened state toward a completely-closed state, the constant "1" is outputted in a range from N to (1−N−M). Reversely, when the opening degree changes from a completely-closed state toward a completely-opened state, the constant "1" is outputted in a range from (N+M) to (1−N).

On the other hand, when the VNT nozzle opening degree or EGR valve opening degree changes from a completely-closed state toward a completely-opened state, the linear function of the nozzle opening degree or valve opening degree with the inclination (−1/N) is used in a range from the nozzle opening degree or valve opening degree (1−N) to 1 (i.e. range considered as being completely opened). On the other hand, when the opening degree changes from a completely-opened state to a completely-closed state, the function that is shifted toward the left by the width M of the hysteresis is adopted. M is a value from about 0.05 to about 0.1. Namely, the gain is "0" in a range from the nozzle opening degree or valve opening degree "1" to (1−M), and the linear function with the inclination (−1/N) is used in a range from (1−M) to (1−N−M).

Figure 31:
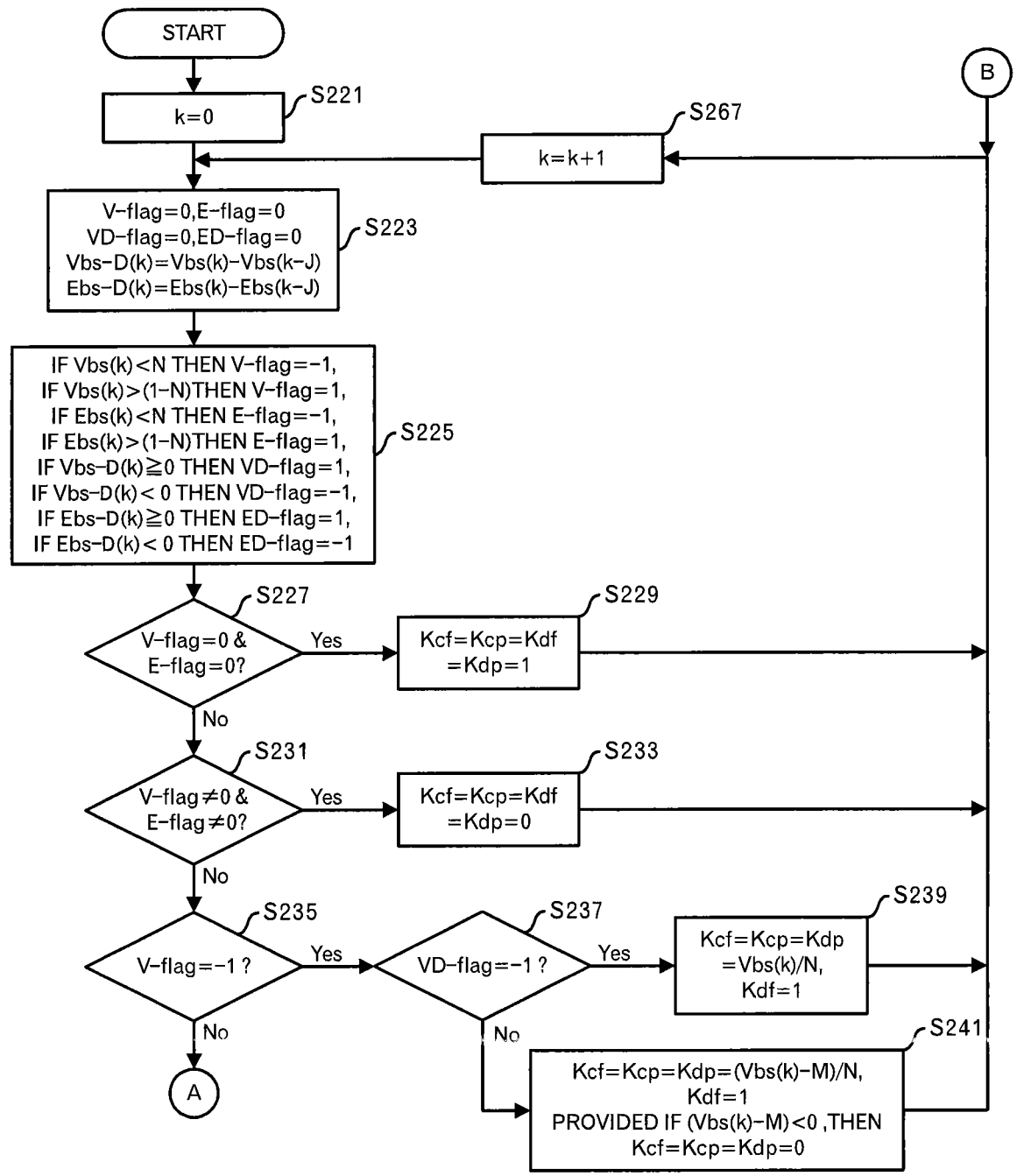
FIG. 31 is a diagram depicting a processing flow in a specific example 5 of the embodiment 2.
Figure 32:
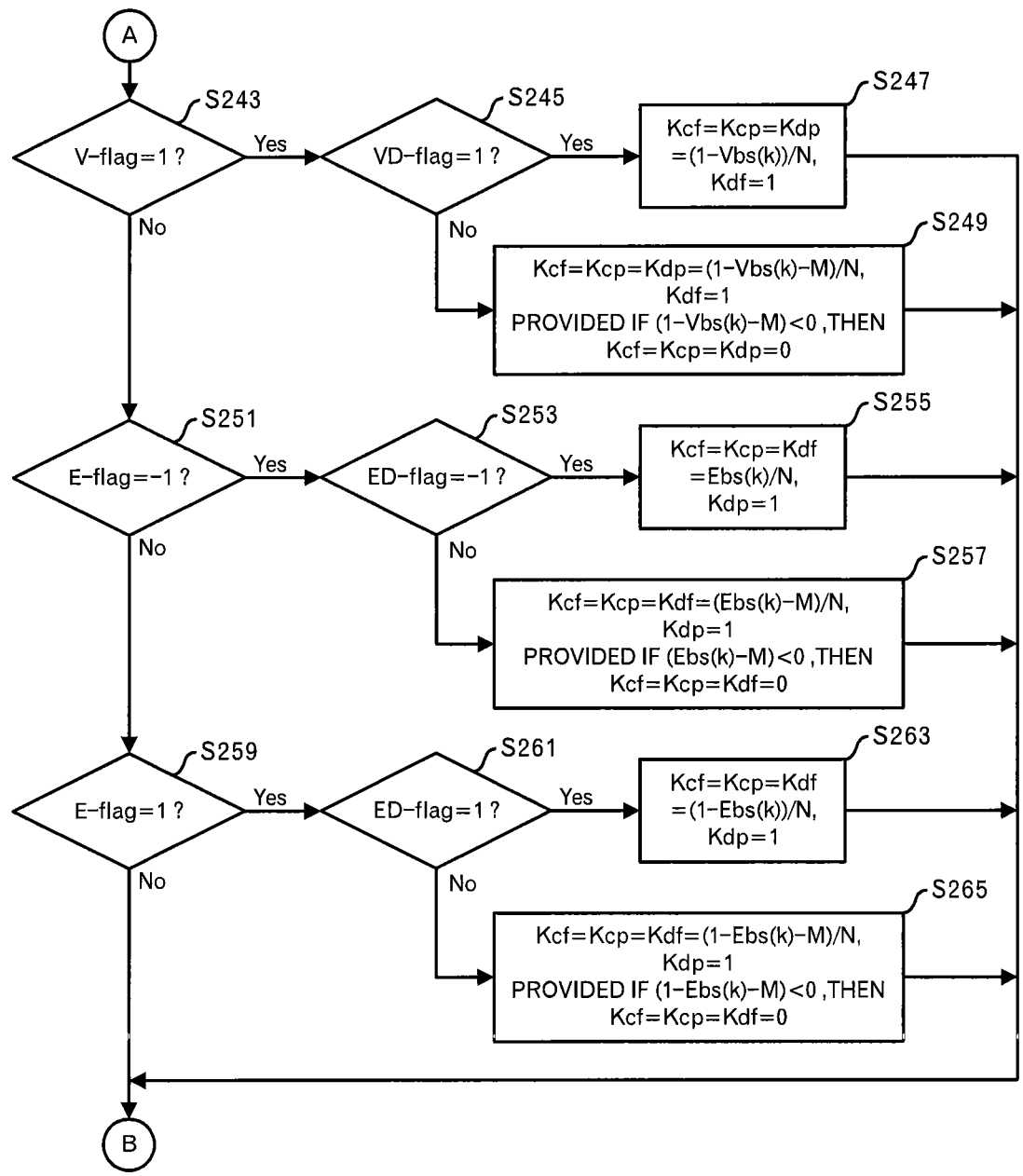
FIG. 32 is a diagram depicting a processing flow in the specific example 5 of the embodiment 2.

In order to realize such a function, the gain function setting unit 160 and the like in the block diagram illustrated in FIG. 10 carry out a processing illustrated in FIGS. 31 and 32 in this specific example. First, time k is initialized to "0" (step S221). Time k is the common time in the engine control apparatus 100. Then, when the setting values of the engine speed and fuel injection quantity at time k are inputted, the planning unit 110 outputs the reference value Vbs(k) of the VNT nozzle opening degree and the reference value Ebs(k) of the EGR valve opening degree, which correspond to the setting values of the engine speed and fuel injection quantity at time k. Vbs(k) and Ebs(k) are values from 0 to 1. Furthermore, the planning unit 110 similarly outputs the MAF target value to the MAF control system including the MAF controller 120, and outputs the MAP target value to the MAP control system including the MAP controller 140.

Next, the gain function setting unit 160 sets "0" to V-flag representing a state of the closing or opening of the VNT nozzle, sets "0" to E-flag representing a state of the closing or opening of the EGR valve, sets "0" to VD-flag representing whether the state is a state that the VNT nozzle is controlled in the opening direction or a state that the VNT nozzle is controlled in the closing direction, and sets "0" to ED-flag representing whether the state is a state that the EGR valve is controlled in the opening direction or a state that the EGR valve is controlled in the closing direction. Furthermore, the gain function setting unit 160 sets (Vbs(k)−Vbs(k−J)) to Vbs−D(k), and sets (Ebs(k)−Ebs(k−J)) to Ebs−D(k) (step S223). Vbs(k−J) is Vbs value before J samples (e.g. about from 1 to 10). Similarly, Ebs(k−J) is Ebs value before J samples. In other words, Vbs−D(k) represents a state of the VNT nozzle, is a difference between the current Vbs value and Vbs value before the J samples, and represents the closing direction in case of the negative value and the opening direction in case of the positive value Similarly Ebs−D(k) represents a state of the EGR valve is a difference between the current Ebs value and Ebs value before the J samples, and represents the closing direction in case of the negative value and the opening direction in case of the positive value.

Then, when the reference value Vbs(k) of the VNT nozzle opening degree is less than N (e.g. N is a value from about 0.1 to about 0.15, and a constant defining a range considered as being completely opened or completely closed) (i.e. in a completely-closed state), the gain function setting unit 160 sets "−1" to V-flag. On the other hand, when Vbs(k) is greater than (1−N) (i.e. in a completely-opened state), the gain function setting unit 160 sets "1" to V-flag. Moreover, the gain function setting unit 160 sets "−1" to E-flag, when the reference value Ebs(k) of the EGR valve opening degree is less than N (i.e. a completely-closed state). On the other hand, when Ebs(k) is greater than (1−N) (i.e. a completely-opened state), the gain function setting unit 160 sets "1" to E-flag. Furthermore, the gain function setting unit 160 sets "1" to VD-flag, when Vbs−D(k) is equal to or greater than 0 (i.e. in the opening direction), and sets "−1" to VD-flag, when Vbs−D(k) is less than 0 (i.e. in the closing direction). Moreover, the gain function setting unit 160 sets "1" to ED-flag, when Ebs−D(k) is equal to or greater than 0 (i.e. in the opening direction), and sets "−1" to ED-flag (step S225), when Ebs−D(k) is less than 0 (i.e. in the closing direction). Thus, when Vns(k) is equal to or greater than N and equal to or less than (1−N), V-flag remains 0, and similarly, when Ebs(k) is equal to or greater than N and equal to or less than (1−N), E-flag remains 0.

After that, the gain function setting unit 160 determines whether or not the state is a state that V-flag is "0" and E-flag also is "0" (step S227). When such a condition is satisfied, the control mode is the MIMO control mode. Therefore, the gain function setting unit 160 sets Kcf=Kcp=Kdf=Kdp=1 as illustrated in FIG. 11 (step S229).

On the other hand, when at least either of V-flag and E-flag is not "0", the gain function setting unit 160 determines whether or not the state is a state that V-flag is not "0", and E-flag is not "0" (step S231). When such a condition is satisfied, the control mode is the SISO control mode of the VNT and EGR completely closing region D (i.e. both of them are completely opened or completely closed.). Therefore, the gain function setting unit 160 sets Kcf=Kcp=Kdf=Kdp=0 as illustrated in FIG. 12 (step S233).

In addition, when either V-flag or E-flag is not "0", the gain function setting unit 160 determines whether or not V-flag is "−1" (i.e. the VNT nozzle is completely-closed.) (step S235). When V-flag is "−1", the gain function setting unit 160 further determines whether or not VD-flag is "−1" (i.e. the VNT nozzle is controlled in the closing direction) (step S237). When such a condition is satisfied, the control system operates like in the MIMO control mode in which the output adjustment is carried out. Namely, according to the gain function of FIG. 30, the gain function setting unit 160 sets Kcf=Kcp=Kdp=Vbs(k)/N and Kdf=1 (step S239). Thus, along the straight line of the inclination 1/N in the left side of FIG. 30, a value Vbs(k)/N is calculated according to the reference value Vbs(k) of the VNT nozzle opening degree. Incidentally, incase of Vbs(k)=0, the control mode is the SISO control mode of the VNT completely closing region C.

On the other hand, when VD-flag is not "−1", VD-flag is "1" (i.e. the VNT nozzle is controlled in the opening direction). Therefore, gain function setting unit 160 sets Kcf=Kcp=Kdp=(Vbs(k)/N and Kdf=1 (step S241). In the left side of FIG. 30, along the straight line with the inclination 1/N, which is shifted toward the right by the width M of the hysteresis, the value (Vbs(k)−M)/N is calculated according to the reference value Vbs(k) of the VNT nozzle opening degree. Thus, the control system operates like in the MIMO control mode in which the output adjustment is carried out. However, because it is impossible to set a negative value as the nozzle opening degree or valve opening degree, Kcf=Kcp=Kdp=0 is set when (Vbs(k)−M) becomes negative.

When V-flag is not "−1", the processing shifts to a processing of FIG. 32 through a terminal A.

Shifting to the explanation of the processing of FIG. 32, when V-flag is not "−1", the gain function setting unit 160 determines whether or not V-flag is "1" (i.e. the VNT nozzle is completely-opened.) (step S243). When V-flag is "1", the gain function setting unit 160 determines whether or not VD-flag is "1", namely, the VNT nozzle is controlled in the opening direction (step S245). When such a condition is satisfied, the control system operates like in the MIMO control mode in which the output adjustment is carried out. In other words, according to the gain function of FIG. 30, the gain function setting unit 160 sets Kcf=Kcp=Kdp=(1−Vbs (k))/N and Kdf=1 (step S247). Thus, along the straight line with the inclination −1/N in the right side of FIG. 30, a value (1−Vbs(k))/N is calculated according to the reference value Vbs(k) of the VNT nozzle opening degree. Incidentally, in case of Vbs(k)=1, the control mode is the SISO control mode of the VNT completely opening region F, and Kcf=Kcp=Kdp=0.

On the other hand, when VD-flag is not "1", namely, when the VNT nozzle is controlled in the closing direction, the gain function setting unit 160 sets Kcf=Kcp=Kdp=(1−Vbs(k)−M)/N and Kdf=1 (step S249). Thus, along the straight line with the inclination −1/N, which is shifted toward the left by the width M of the hysteresis in the right side of FIG. 30, a value $(1-Vbs(k)-M)/N$ is calculated according to the reference value $Vbs(k)$ of the VNT nozzle opening degree. Thus, the control system operates like in the MIMO control mode in which the output adjustment is carried out. However, because a negative value cannot be set as the nozzle or valve opening degree, $Kcf=Kcp=Kdp=0$ is set when $(1-Vbs(k)-M)$ becomes negative.

Moreover, when V-flag is not "1", the gain function setting unit 160 determines whether or not E-flag is "−1" (step S251). When E-flag is "−1", the gain function setting unit 160 determines whether or not ED-flag is "−1", namely, the EGR valve is controlled in the closing direction (step S253). When such a condition is satisfied, the control system operates like in the MIMO control mode in which the output adjustment is carried out. In other words, according to the gain function in the left side of FIG. 30, the gain function setting unit 160 sets $Kcf=Kcp=Kdf=Ebs(k)/N$ and $Kdp=1$ (step S255). Thus, along the straight line with the inclination $1/N$ in the left side of FIG. 30, a value $Ebs(k)/N$ is calculated according to the reference value $Ebs(k)$ of the EGR valve opening degree. Incidentally, in case of $Ebs(k)=0$, the control mode is the SISO control mode of the EGR completely closing region B.

On the other hand, when ED-flag is not "−1", in other words, ED-flag=1 and the EGR valve opening degree changes in the opening direction, the gain function setting unit 160 sets $Kcf=Kcp=Kdf=(Ebs(k)-M)/N$ and $Kdp=1$ (step S257). Thus, along the straight line with the inclination $-1/N$, which is shifted toward the right by the width M of the hysteresis in the left side of FIG. 30, a value $(Ebs(k)-M)/N$ is calculated according to the reference value $Ebs(k)$ of the EGR valve opening degree. Thus, the control system operates like in the MIMO control mode in which the output adjustment is carried out. However, because it is impossible set a negative value as the nozzle or valve opening degree, $Kcf=Kcp=Kdf=0$ is set when $(Ebs(k)-M)$ becomes negative.

Furthermore, when E-flag is not "−1", the gain function setting unit 160 determines whether or not E-flag is "1" (i.e. the EGR valve is completely-opened.) (step S259). When E-flag is "1", the gain function setting unit 160 determines whether or not ED-flag is "1", in other words, EGR valve is controlled in the opening direction (step S261). When such a condition is satisfied, the control system operates like in the MIMO control mode in which the output adjustment is carried out. Namely, according to the gain function of FIG. 30, the gain function setting unit 160 sets $Kcf=Kcp=Kdf=(1-Ebs(k))/N$ and $Kdp=1$ (step S263). Thus, along the straight line with the inclination $-1/N$ in the right side of FIG. 30, a value $(1-Ebs(k))/N$ is calculated according to the reference value $Ebs(k)$ of the EGR valve opening degree. Incidentally, in case of $Ebs(k)=1$, the control mode is the SISO control mode of the EGR completely opening region E, and $Kcf=Kcp=Kdf=0$ is set.

On the other hand, when ED-flag is not "1", namely, the EGR valve opening degree changes in the closing direction, the gain function setting unit 160 sets $Kcf=Kcp=Kdf=(1-Ebs(k)-M)/N$ and $Kdp=1$ (step S265). Thus, in the right side of FIG. 30, along the straight line of the inclination $-1/N$, which is shifted toward the left by the width M of the hysteresis, a value $(1-Ebs(k)-M)/N$ is calculated according to the reference value $Ebs(k)$ of the EGR valve opening degree. Thus, the control system operates like in the MIMO control mode in which the output adjustment is carried out. However, because it is impossible to set a negative value as the nozzle or valve opening degree, $Kcf=Kcp=Kdf=0$ is set when $(1-Ebs(k)-M)$ becomes negative.

After the step S229, the MAF controller 120 calculates a control value according to the difference between the MAF target value and the measurement value of the MAF, and the first interference compensator 150 calculates a compensation value according to the difference between the MAP target value and the measurement value of the MAP. Then, the sum of the control value from the MAF controller 120, the compensation value from the first interference compensator 150 and $Ebs(k)$ is calculated as the EGR valve opening degree Ein, and the EGR valve of the engine body 1 is controlled according to the Ein. Moreover, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the control value from the MAP controller 140, the compensation value from the second interference compensator 130, and $Vbs(k)$ is calculated as the VNT nozzle opening degree Vin, and the VNT nozzle of the engine body 1 is controlled according to the Vin.

Moreover, after the step S233, $Ebs(k)$ is adopted as the EGR valve opening degree Ein, and the EGR valve of the engine body 1 is controlled according to the Ein. In addition, $Vbs(k)$ is adopted as the VNT nozzle opening degree Vin, the VNT nozzle of the engine body 1 is controlled according to the Vin.

Furthermore, after the steps S239, S241, S247, S249, S255, S257, S263 and S265, the MAF controller 120 calculates a control value according to the difference between the MAF target value and the measurement value of the MAF, and the first interference compensator 150 calculates a compensation value according to the difference between the MAP target value and the measurement value of the MAP. Then, the sum of the product of the control value from the MAF controller 120 and Kdf, the product of the compensation value from the first interference compensator 150 and Kcp and $Ebs(k)$ is calculated as the EGR valve opening degree Ein, and the EGR valve of the engine body 1 is controlled according to the Ein. In addition, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the product of the control value from the MAP controller 140 and Kdp, the product of the compensation value from the second interference compensator 130 and Kcf, and $Vbs(k)$ is calculated as the VNT nozzle opening degree Vin, and the VNT nozzle of the engine body 1 is controlled according to the Vin.

When it is determined that the condition of the step S259 is not satisfied, the processing returns to the processing of FIG. 31 through a terminal B, after the steps S249, S255, S257, S263 and S265.

After shifting via the terminal B in FIG. 31, or after the step S229, S233, S239 or S241, k is incremented by "1" (step S267), and the processing returns to the step S223. Such a processing is carried out until the engine body 1 is stopped.

Thus, by adjusting the gain elements in this way, the chattering can be effectively prevented when the control system operates in a boundary portion of the control modes. Especially, because the hysteresis characteristic is introduced, the stable control can be made.

Specific Example 6 of Embodiment 2

Figure 33:
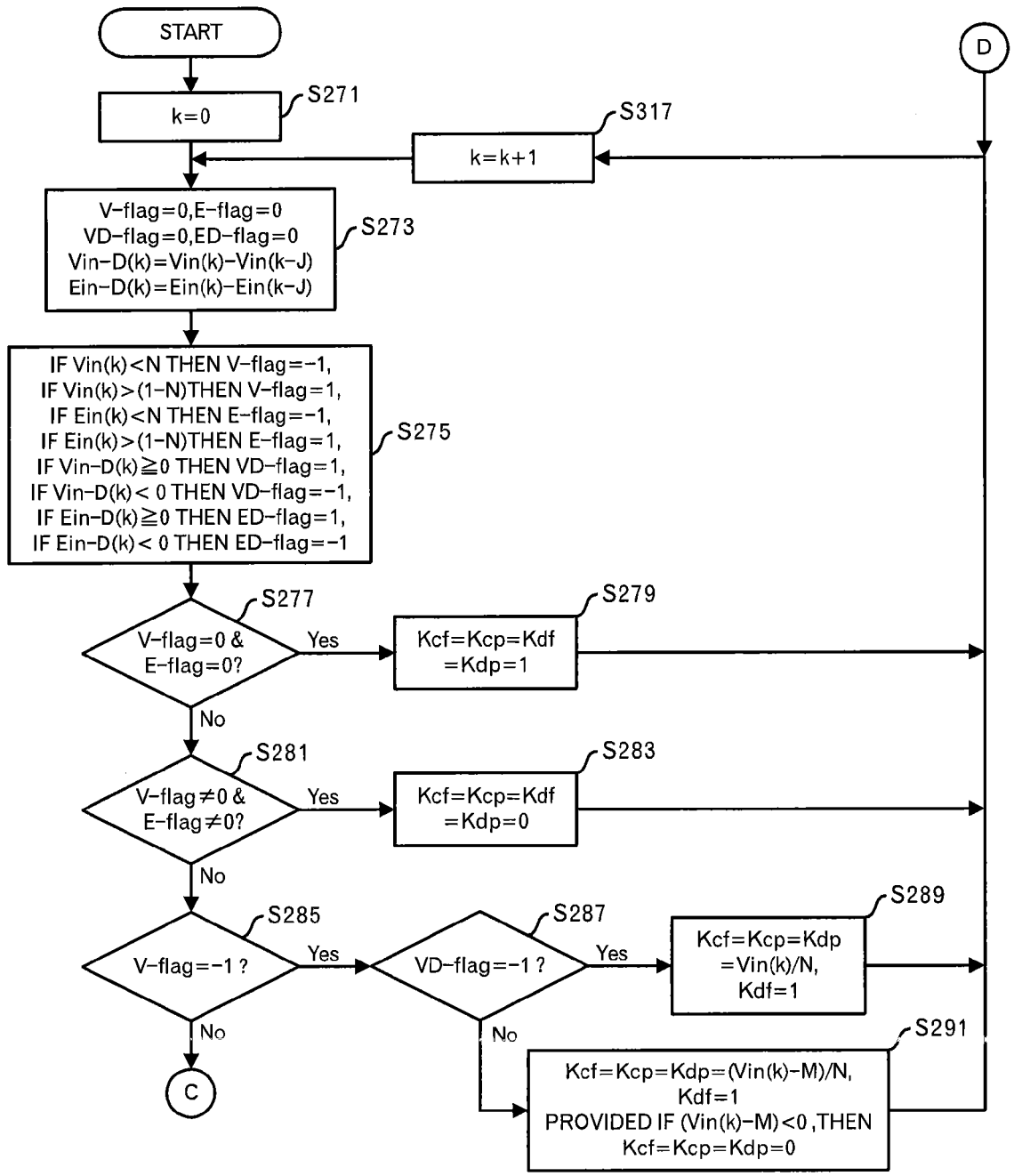
FIG. 33 is a diagram depicting a processing flow in a specific example 6 of the embodiment 2.
Figure 34:
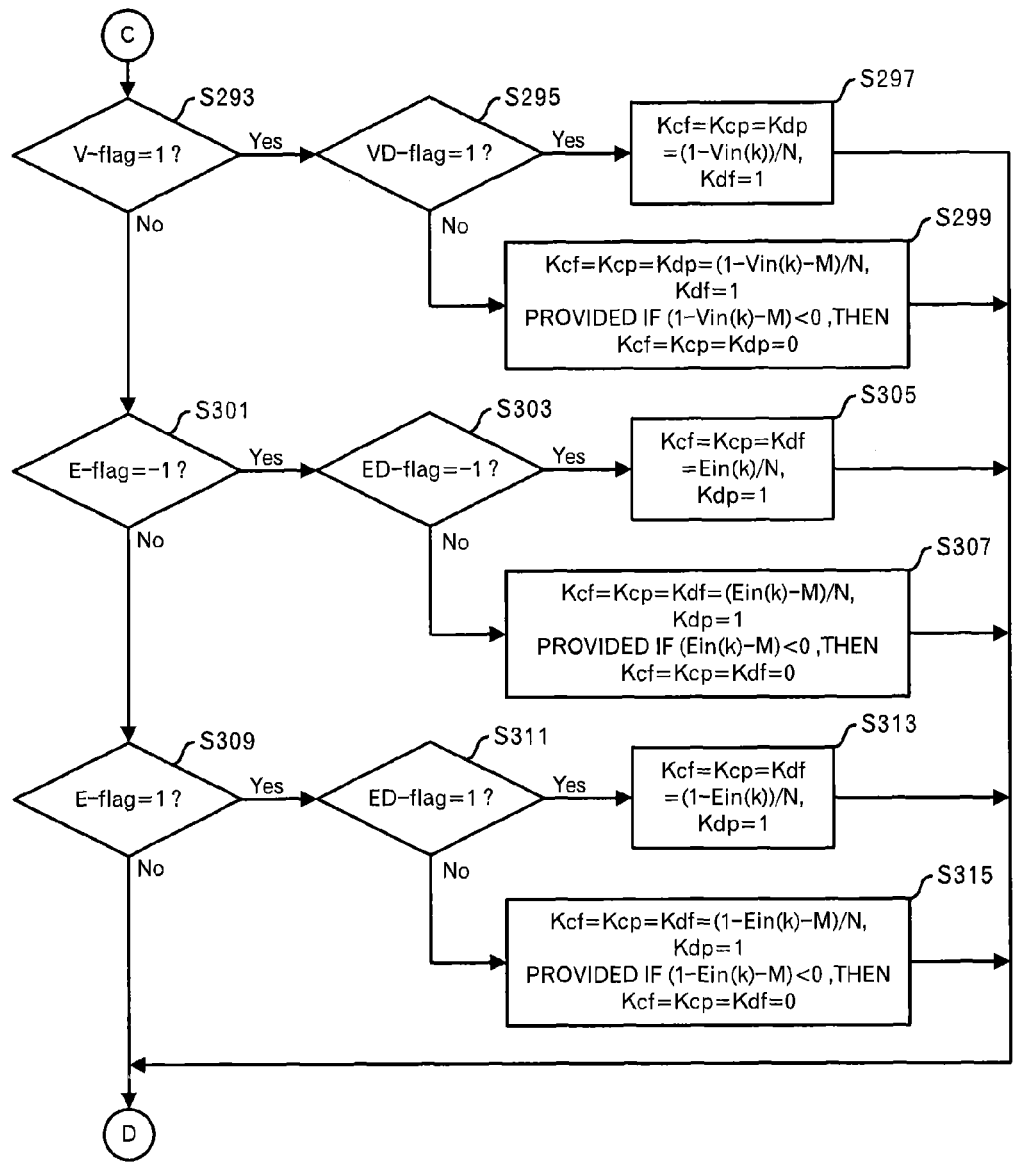
FIG. 34 is a diagram depicting a processing flow in the specific example 6 of the embodiment 2.

In this specific example, the gain function as illustrated in FIG. 30 is adopted, similarly to the fifth specific example. In order to realize the function, the gain function setting unit 170 and the like carryout a processing as illustrated in FIGS. 33 and 34 in this specific example. First, time k is initialized to "0" (step S271). Time k is the common time in the engine control apparatus 100.

Next, the gain function setting unit 170 sets "0" to V-flag representing a state of the opening or closing of the VNT nozzle, and sets "0" to E-flag representing a state of the opening or closing of the EGR valve, sets "0" to VD-flag representing whether the state is a state that the VNT nozzle is controlled in the opening direction, or a state that the VNT nozzle is controlled in the closing direction, and sets "0" to ED-flag representing whether the state is a state that the EGR valve is controlled in the opening direction or a state that the EGR valve is controlled in the closing direction. Furthermore, the gain function setting unit 170 sets (Vin(k)−Vin(k−J)) to Vin−D(k), and sets (Ein(k)−Ein(k−J)) to Ein−D(k) (step S273). Vin(k−J) is a Vin value of the VNT nozzle opening degree before J (e.g. from 1 to 10) samples. Similarly, Ein(k−J) is an Ein value of the EGR valve opening degree before the J samples. Namely, Vin−D(k) represents a state of the VNT nozzle, is a difference with Vin value before J samples, and represents the closing direction when Vin−D(k) is negative, and represents the opening direction when Vin−D(k) is positive. Similarly, Ein−D(k) represents a state of the EGR valve, is a difference with Ein value of the EGR valve opening degree before J samples, and represents the closing direction when Ein−D(k) is negative, and represents the opening direction when Ein−D(k) is positive.

Then, when the VNT nozzle opening degree Vin(k) is less than N (e.g. N is a value from about 0.1 to about 0.15, and is a constant defining a range considered as being completely opened or completely closed.) (i.e. a completely-closed state), the gain function setting unit 170 sets "−1" to V-flag. On the other hand, when Vin(k) is greater than (1−N) (i.e. a completely-opened state), the gain function setting unit 170 sets "1" to V-flag. Moreover, when the EGR valve opening degree Ein(k) is less than N (i.e. a completely-closed state.), the gain function setting unit 170 sets "−1" to E-flag. On the other hand, when Ein(k) is greater than (1−N) (i.e. a completely-opened state), the gain function setting unit 170 sets "1" to E-flag. Furthermore, when Vin−D(k) is equal to or greater than 0 (i.e. in the opening direction), the gain function setting unit 170 sets "1" to VD-flag, and when Vin−D(k) is less than 0 (i.e. in the closing direction), the gain function setting unit 170 sets "−1" to VD-flag. Moreover, when Ein−D(k) is equal to or greater than 0 (i.e. in the opening direction), the gain function setting unit 170 sets "1" to ED-flag, and when Ein−D(k) is less than 0, the gain function setting unit 170 sets "−1" to ED-flag (step S275). Thus, when Vin(k) is equal to or greater than N and equal to or less than (1−N), V-flag remains "0", and similarly, when Ein(k) is equal to or greater than N and equal to or less than (1−N), E-flag remains "0".

After that, the gain function setting unit 170 determines whether or not the state is a state that V-flag is "0", and E-flag also is "0" (step S277). When such a condition is satisfied, the control mode is the MIMO control mode. Therefore, the gain function setting unit 170 sets Kcf=Kcp=Kdf=Kdp=1 as illustrated in FIG. 17 (step S279).

On the other hand, when at least either of V-flag and E-flag is not "0", the gain function setting unit 170 determines whether or not the state is a state that V-flag is not "0" and E-flag also is not "0" (step S281). When such a condition is satisfied, the control mode is the SISO control mode of the VNT and EGR completely closing region D (i.e. both of them are completely opened or completely closed.). Therefore, the gain function setting unit 170 sets Kcf=Kcp=Kdf=Kdp=0 as illustrated in FIG. 18 (step S283).

In addition, when either of V-flag and E-flag is not "0", the gain function setting unit 170 determines whether or not V-flag is "−1" (i.e. VNT nozzle is completely-closed.) (step S235). When V-flag is "−1", the gain function setting unit 170 determines whether or not VD-flag is "−1" (i.e. the VNT nozzle is controlled in the closing direction) (step S287). When such a condition is satisfied, the control system operates like in the MIMO control mode in which the output adjustment is carried out. Namely, according to the gain function of FIG. 30, the gain function setting unit 170 sets Kcf=Kcp=Kdp=Vin(k)/N and Kdf=1 (step S289). Thus, along the straight line with the inclination 1/N in the left side of FIG. 30, a value Vin/N is calculated according to the VNT nozzle opening degree Vin(k). Incidentally, in case of Vin (k)=0, the control mode is the SISO control mode of the VNT completely closing region C.

On the other hand, when VD-flag is not "−1", VD-flag is "1" (i.e. the VNT nozzle is controlled in the opening direction). Therefore, the gain function setting unit 170 sets Kcf=Kcp=Kdp=(Vin(k)−M)/N and Kdf=1 (step S291). In the left side of FIG. 30, along the straight line with the inclination 1/N, which is shifted toward the right by the width M of the hysteresis, the gain function setting unit 170 calculates a value (Vbs(k)−M)/N according to the reference value Vbs(k) of the VNT nozzle opening degree. Thus, the control system operates like in the MIMO control mode in which the output adjustment is carried out. However, because it is impossible to set a negative value as the nozzle or valve opening degree, the gain function setting unit 170 sets Kcf=Kcp=Kdp=0, when (Vin(k)−M) becomes negative.

When V-flag is not "−1", the processing shifts to a processing of FIG. 34 through a terminal C.

Shifting to the explanation of the processing of FIG. 34, when V-flag is not "−1", the gain function setting unit 170 determines whether or not V-flag is "1" (i.e. the VNT nozzle is completely-opened.) (step S293). When V-flag is "1", the gain function setting unit 170 determines whether or not VD-flag is "1", in other words, the VNT nozzle is controlled in the opening direction (step S295). When such a condition is satisfied, the control system operates like in the MIMO control mode in which the output adjustment is carried out. Namely, according to the gain function illustrated in FIG. 30, the gain function setting unit 170 sets Kcf=Kcp=Kdp=(1−Vin (k))/N and Kdf=1 (step S297). Thus, along the straight line with the inclination −1/N in the right side of FIG. 30, a value (1−Vin(k))/N is calculated according to the VNT nozzle opening degree Vin(k). Incidentally, in case of Vin(k)=1, the control mode is the SISO control mode of the VNT completely opening region F, and Kcf=Kcp=Kdp=0

On the other hand, when VD-flag is not "1", namely, when the VNT nozzle is controlled in the closing direction, the gain function setting unit 170 sets Kcf=Kcp=Kdp=(1−Vin(k)− M)/N and Kdf=1 (step S299). Thus, in the right side of FIG. 30, along the straight line with the inclination −1/N, which is shifted toward the left by the width M of the hysteresis, a value (1−Vin(k)−M)/N is calculated according to the VNT nozzle opening degree Vin(k). Thus, the control system operates like in the MIMO control mode in which the output adjustment is carried out. However, because it is impossible to set a negative value as the nozzle or valve opening degree, the gain function setting unit 170 sets Kcf=Kcp=Kdp=0, when (1−Vin(k)−M) becomes negative.

Moreover, when V-flag is not "1", the gain function setting unit 170 determines whether or not E-flag is "−1" (step S301). When E-flag is "−1", the gain function setting unit 170 determine whether or not ED-flag is "−1", in other words, the EGR valve is controlled in the closing direction (step S303). When such a condition is satisfied, the control system operates like in the MIMO control system in which the output adjustment is carried out. In other words, according to the gain function in the left side of FIG. 30, the gain function setting unit 170 sets Kcf=Kcp=Kdf=Ein(k)/N and Kdp=1 (step S305). Thus, along the straight line with the inclination 1/N in the left side of FIG. 30 a value Ein(k)/N is calculated according to the Ein(k) of the EGR valve opening degree. Incidentally, in case of Ein(k)=0, the control mode is the SISO control mode of the EGR completely closing region B.

On the other hand, when ED-flag is not "−1", in other words, when ED-flag is "1", and the EGR valve is controlled in the opening direction, the gain function setting unit 170 sets Kcf=Kcp=Kdf=(Ein(k)−M)/N and Kdp=1 (step S307). Thus, in the left side of FIG. 30, along the straight line with the inclination −1/N, which is shifted to the right by the width M of the hysteresis, a value (Ein(k)−M)/N is calculated according to the EGR valve opening degree Ein(k). Thus, the control system operates like in the MIMO control mode in which the output adjustment is carried out. However, because it is impossible to set a negative value as the nozzle or valve opening degree, the gain function setting unit 170 sets Kcf=Kcp=Kdf=0, when (Ein(k)−M) becomes negative.

Furthermore, when E-flag is not "−1", the gain function setting unit 170 determines whether or not E-flag is "1" (i.e. the EGR valve is completely-opened.) (step S309). When E-flag is "1", the gain function setting unit 170 determines whether or not ED-flag is "1", namely, the EGR valve is controlled in the opening direction (step S311). When such a condition is satisfied, the control system operates like in the MIMO control mode in which the output adjustment is carried out. In other words, according to the gain function of FIG. 30, the gain function setting unit 170 sets Kcf=Kcp=Kdf=(1− Ein(k))/N and Kdp=1 (step S313). Thus, along the straight line with the inclination −1/N in the right side of FIG. 30, a value (1−Ein(k))/N is calculated according to the EGR valve opening degree Ein(k). Incidentally, in case of Ein(k)=1, the control mode is the SISO control mode of the EGR completely opening region E, and Kcf=Kcp=Kdf=0.

On the other hand, when ED-flag is not "1", namely, when the EGR valve is controlled in the closing direction, the gain function setting unit 170 sets Kcf=Kcp=Kdf=(1−Ein(k)− M)/N and Kdp=1 (step S315). Thus, along the straight line with the inclination −1/N, which is shifted to the left by the width M of the hysteresis, in the right side of FIG. 30, a value (1−Ein(k)−M)/N is calculated according to the EGR valve opening degree Ein(k). Thus, the control system operates like in the MIMO control mode in which the output adjustment is carried out. However, because it is impossible to set a negative value as the nozzle or valve opening degree, the gain function setting unit 170 sets Kcf=Kcp=Kdf=0, when (1−Ein(k)−M) becomes negative.

Incidentally, in addition to the aforementioned processing flow, when the setting values of the engine speed and fuel injection quantity at time k are inputted, the planning unit 110 outputs the reference value Vbs(k) of the VNT nozzle opening degree and the reference value Ebs(k) of the EGR valve opening degree, which correspond to the setting values of the engine speed and fuel injection quantity at time k. Furthermore, the planning unit 110 similarly outputs the MAF target value to the MAF control system including the MAF controller 120, and outputs the MAP target value to the MAP control system including the MAP controller 140.

Then, after the step S279, the MAF controller 120 calculates a control value according to the difference between the MAF target value and the measurement value of the MAF, and the first interference compensator 150 calculates a compensation value according to the difference between the MAP target value and the measurement value of the MAP. Then, the sum of the control value from the MAF controller 120, the compensation value from the first interference compensator 150 and Ebs(k) is calculated as the EGR valve opening degree Ein (k+1), and the EGR valve of the engine body 1 is controlled according to the Ein(k+1). Moreover, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the control value from the MAP controller 140 the compensation value from the second interference compensator 130 and Vbs(k) is calculated as the VNT nozzle opening degree Vin(k+1), and the VNT nozzle of the engine body 1 is controlled according to the Vin(k+1).

Moreover, after the step S283, Ebs(k) is adopted as the EGR valve opening degree Ein(k+1), and the EGR valve of the engine body 1 is controlled according to the Ein(k+1). In addition, Vbs(k) is adopted as the VNT nozzle opening degree Vin(k+1), and the VNT nozzle of the engine body 1 is controlled according to the Vin(k+1).

Furthermore, after the steps S289, S291, S297, S299, S305, S307, S313 and S315, the MAF controller 120 calculates a control value according to the difference between the MAF target value and the measurement value of the MAF, and the first interference compensator 150 calculates a compensation value between the difference between the MAP target value and the measurement value of the MAP. Then, the sum of the product of the control value from the MAF controller 120 and Kdf, the product of the compensation value from the first interference compensator 150 and Kcp, and Ebs(k) is calculated as the EGR valve opening degree Ein, and the EGR valve of the engine body 1 is controlled according to the Ein. In addition, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the product of the control value from the MAP controller 140 and Kdp, the product of the compensation value from the second interference compensator 130 and Kcf, and Vbs(k) is calculated as the VNT nozzle opening degree Vin, and the VNT nozzle of the engine body 1 is controlled according to the Vin.

When it is determined that the condition of the step S309 is not satisfied, or after the steps S297, S299, S305, S307, S313 or S315, the processing returns to the processing of FIG. 33 through a terminal D.

After shifting through the terminal D in FIG. 33, or after the step S279, S283, S289 or S291, k is incremented by "1" (step S317), and the processing returns to the step S273. Such a processing is carried out until the engine body 1 is stopped.

By adjusting the gain elements in this way, the chattering can be effectively prevented, when the control system operates in a boundary portion of the control modes. Especially, because the hysteresis characteristic is introduced, the stable control becomes possible.

Specific Example 7 of Embodiment 2

Figure 35:
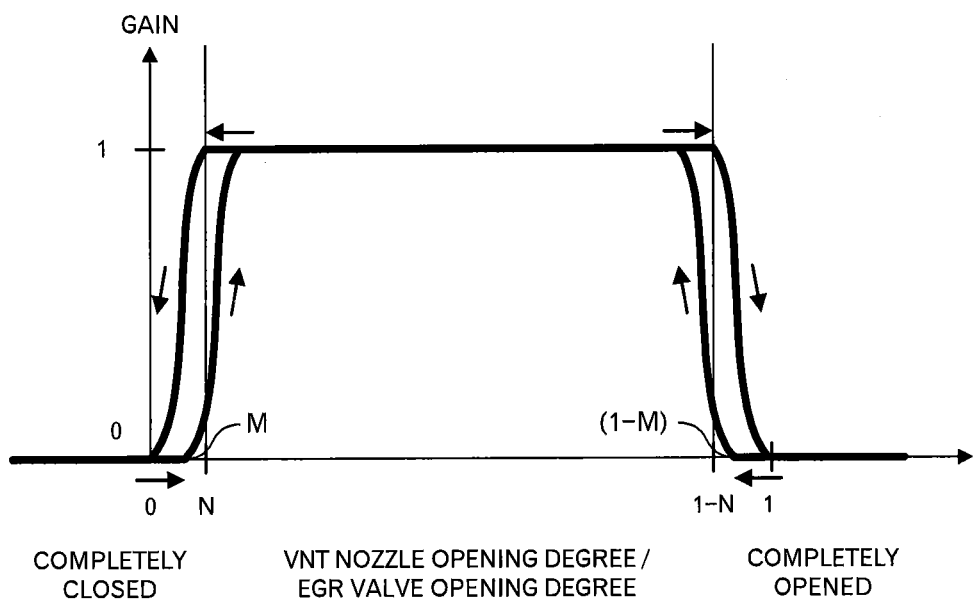
FIG. 35 is a diagram depicting an example when a sigmoid function with the hysteresis characteristic is adopted as the gain function.

For example, a function whose argument is the VNT nozzle opening degree or EGR valve opening degree as illustrated in FIG. 35 is adopted as the gain function. In FIG. 35, the vertical axis represents values (from 0 to 1) of the gain function, and the horizontal axis represents the reference value Vbs of the VNT nozzle opening degree or reference value Ebs of the EGR valve opening degree, or VNT nozzle opening degree Vin or EGR valve opening degree Ein. In an example of FIG. 35, a sigmoid function having a hysteresis characteristic is adopted. Namely, when the VNT nozzle opening degree or EGR valve opening degree changes toward "completely closed" from "completely opened", the same sigmoid function as FIG. 26 is adopted in a range from the nozzle or valve opening degree "0" to "N". On the other hand, when the opening degree changes toward "completely opened" from "completely closed", the sigmoid function, which is shifted toward the right by the width M of the hysteresis is adopted.

Moreover, when the opening degree changes from "completely opened" to "completely closed", the output is a constant "1" in a range from N to (1−N−M). Moreover, when the opening degree changes from "completely closed" to "completely opened", the output is a constant "1" in a range from (N+M) to (1−N).

On the other hand, when the VNT nozzle opening degree or EGR valve opening degree changes from "completely closed" to "completely opened", the function is the same as the sigmoid function illustrated in FIG. 26 in a range (i.e. range considered as being "completely opened") from (1−N) to 1. On the other hand, when the opening degree changes from "completely opened" to "completely closed", the sigmoid function, which is shifted toward the left by the width M of the hysteresis is adopted. M is a value from about 0.05 to about 0.1, for example.

Figure 36:
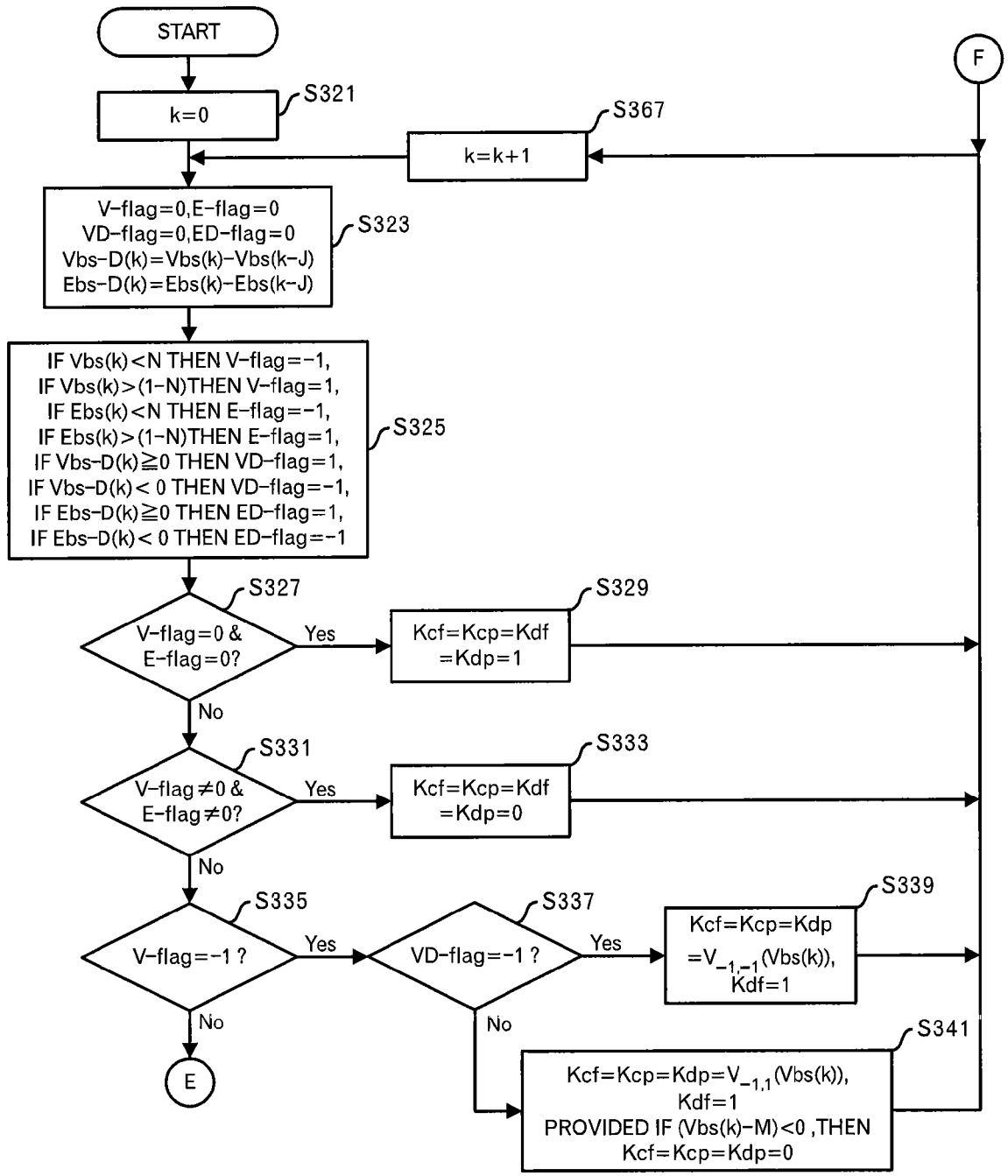
FIG. 36 is a diagram depicting a processing flow in a specific example 7 of the embodiment 2.
Figure 37:
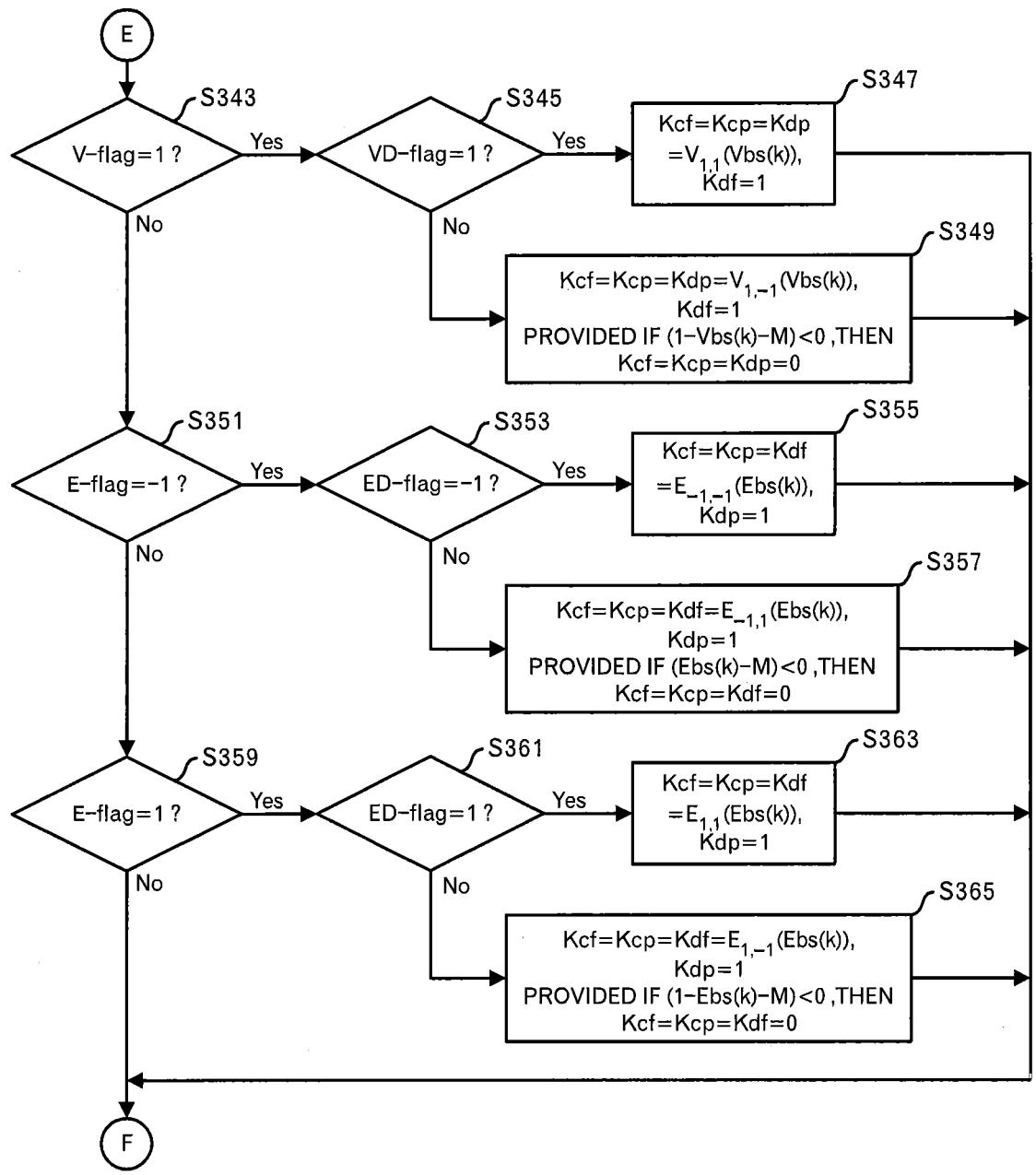
FIG. 37 is a diagram depicting a processing flow in the specific example 7 of the embodiment 2.

In order to realize such a function, the gain function setting unit 160 and the like in the block diagram illustrated in FIG. 10 carry out a processing as illustrated in FIGS. 36 and 37 in this specific example. First, time k is initialized to "0" (step S321). Time k is the common time in the engine control apparatus 100. Then, when setting values of the engine speed and fuel injection quantity are inputted, the planning unit 110 outputs the reference value Vbs(k) of the VNT nozzle opening degree and the reference value Ebs(k) of the EGR valve opening degree, which correspond to the setting values of the engine speed and fuel injection quantity at time k. Vbs(k) and Ebs(k) are values from 0 to 1. Furthermore, the planning unit 110 similarly outputs the MAF target value to the MAF control system including the MAF controller 120, and outputs the MAP target value to the MAP control system including the MAP controller 140.

Next, the gain function setting unit 160 sets "0" to V-flag representing a state of the closing or opening of the VNT nozzle, sets "0" to E-flag representing the opening or closing of the EGR valve, sets "0" to VD-flag representing a state in which the VNT nozzle is controlled in the opening direction or a state in which the VNT nozzle is controlled in the closing direction, and sets "0" to ED-flag representing a state in which the EGR valve is controlled in the opening direction or a state in which the EGR valve is controlled in the closing direction. Furthermore, the gain function setting unit 160 sets (Vbs(k)-Vbs(k−J)) to Vbs−D (k), and sets (Ebs(k)−Ebs(k−J)) to Ebs−D(k) (step S323). Vbs(k−J) is a Vbs value before J (e.g. from about 1 to about 10) samples. Similarly, Ebs(k−J) is an Ebs value before the J samples. Namely, Vbs−D(k) represents a state of the VNT nozzle, is a difference with the Vbs value before the J samples, and represents the closing direction when Vbs−D(k) is negative, and the opening direction when Vbs−D(k) is positive. Similarly, Ebs−D(k) represents a state of the EGR valve, is a difference with the Ebs value before the J samples, and represents the closing direction when Ebs−D(k) is negative, and the opening direction when Ebs−D(k) is positive.

Then, when the reference value Vbs(k) of the VNT nozzle opening degree is less than N (e.g. N is a value from about 0.1 to about 0.15, and is a constant defining a range considered as being completely closed or completely opened.) (i.e. in a completely-closed state), the gain function setting unit 160 sets "−1" to V-flag. On the other hand, when Vbs(k) is greater than (1−N) (i.e. in a completely-opened state), the gain function setting unit 160 sets "1" to V-flag. Moreover, when the reference value Ebs(k) of the EGR valve opening degree is less than N (i.e. in a completely-closed state), the gain function setting unit 160 sets "−1" to E-flag. On the other hand, when Ebs(k) is greater than (1−N) (i.e. in a completely-opened state), the gain function setting unit 160 sets "1" to E-flag. Furthermore, when Vbs−D(k) is equal to or greater than 0 (i.e. in the opening direction), the gain function setting unit 160 sets "1" to VD-flag, and when Vbs−D (k) is less than 0 (i.e. in the closing direction), the gain function setting unit 160 sets "−1" to VD-flag. Moreover, when Ebs−D(k) is equal to or greater than 0 (i.e. in the opening direction), the gain function setting unit 160 sets "1" to ED-flag, and when Ebs−D(k) is less than 0 (i.e. in the closing direction), the gain function setting unit 160 sets "−1" to ED-flag (step S325). Thus, when Vbs(k) is equal to or greater than N and equal to or less than (1−N), V-flag remains "0", and similarly, Ebs(k) is equal to or greater than N and equal to or less than (1−N), E-flag remains "0".

After that, the gain function setting unit 160 determines whether or not the state is a state that V-flag is "0" and E-flag also is "0" (step S327). When such a condition is satisfied, the control mode is the MIMO control mode. Therefore, the gain function setting unit 160 sets Kcf=Kcp=Kdf=Kdp=1 as illustrated in FIG. 11 (step S329).

On the other hand, when at least either of V-flag and F-flag is not "0", the gain function setting unit 160 determines whether or not the state is a state that V-flag is not "0" and E-flag also is not "0" (step S331). When such a condition is satisfied, the control mode is the SISO control mode of the VNT and EGR completely closing region D (i.e. when both of them are either completely opened or completely closed). Therefore, the gain function setting unit 160 sets Kcf=Kcp=Kdf=Kdp=0 as illustrated in FIG. 12 (step S333).

In addition, when either of V-flag and E-flag is not "0", the gain function setting unit 160 determines whether or not V-flag is "−1" (i.e. the VNT nozzle is completely-closed.) (step S335). When V-flag is "−1", the gain function setting unit 160 further determines whether or not VD-flag is "−1" (i.e. the VNT nozzle is controlled in the closing direction.) (step S337). When such a condition is satisfied, the control system operates like in the MIMO control mode in which the output adjustment is carried out. Namely, according to the gain function of FIG. 35, the gain function setting unit 160 sets Kcf=Kcp=Kdp=V$_{-1,1}$(Vbs(k)) and Kdf=1 (step S339).

V$_{-1,1}$(Vbs(k)) is a function defined as follows:

$$V_{-1,-1}(Vbs(k)) = \frac{1}{1+e^{-\left(\frac{2S}{N}Vbs(k)-S\right)}} \quad (10)$$

Thus, along the sigmoid function in the left side of FIG. 35, a value is calculated according to the reference value Vbs(k) of the VNT nozzle opening degree. Incidentally, in case of Vbs(k)=0, the control mode is the SISO control mode of the VNT completely closing region C.

On the other hand, when VD-flag is not "−1", VD-flag is "1" (i.e. the VNT nozzle is controlled in the opening direction.). Therefore, the gain function setting unit 160 sets Kcf=Kcp=Kdp=$V_{-1,1}$(Vbs(k)) and Kdf=1 (step S341).

$V_{-1,1}$(Vbs(k)) is a function defined as follows:

$$V_{-1,1}(Vbs(k)) = \frac{1}{1 + e^{-\left(\frac{2S}{N}(Vbs(k)-M)-S\right)}} \tag{11}$$

Thus, in the left side of FIG. 35, along the sigmoid function, which is shifted toward the right by the width M of the hysteresis, a value is calculated according to the reference value Vbs(k) of the VNT nozzle opening degree. Moreover, even when such a condition is satisfied, the control system operates like in the MIMO control mode in which the output adjustment is carried out. However, because a negative value cannot be set as the nozzle or valve opening degree, Kcf=Kcp=Kdp=0 is set when (Vbs(k)−M) becomes negative.

When V-flag is not "−1", the processing shifts to a processing of FIG. 37 through a terminal E.

Shifting to the explanation of the processing in FIG. 37, when V-flag is not "−1", the gain function setting unit 160 determines whether or not V-flag is "1" (i.e. the VNT nozzle is completely opened.) (step S343). When V-flag is "1", the gain function setting unit 160 determines whether or not VD-flag is "1", in other words, the VNT nozzle is controlled in the opening direction (step S345). When such a condition is satisfied, the control system operates like in the MIMO control mode in which the output adjustment is carried out. Namely, along the gain function of FIG. 35, the gain function setting unit 160 sets Kcf=Kcp=Kdp=$V_{1,1}$(Vbs(k)) and Kdf=1 (step S347).

$V_{1,1}$(Vbs(k)) is a function defined as follows:

$$V_{1,1}(Vbs(k)) = \frac{1}{1 + e^{-\left(-\frac{2S}{N}Vbs(k)+\frac{2-N}{N}S\right)}} \tag{12}$$

Thus, along the sigmoid function in the right side of FIG. 35, a value is calculated according to the reference value Vbs(k) of the VNT nozzle opening degree. Incidentally, in case of Vbs(k)=1, the control mode is the SISO control mode of the VNT completely opening region F, and Kcf=Kcp=Kdp=0.

On the other hand, when VD-flag is not "1", in other words, the VNT nozzle is controlled in the closing direction, the gain function setting unit 160 sets Kcf=Kcp=Kdp=$V_{1,-1}$(Vbs(k)) and Kdf=1 (step S349).

$V_{1,-1}$(Vbs(k)) is a function defined as follows:

$$V_{1,-1}(Vbs(k)) = \frac{1}{1 + e^{-\left(-\frac{2S}{N}(Vbs(k)-M)+\frac{2-N}{N}S\right)}} \tag{13}$$

Thus, in the right side of FIG. 35, along the sigmoid function that is shifted toward the left by the width M of the hysteresis, a value is calculated according to the reference value Vbs(k) of the VNT nozzle opening degree. Thus, the control system operates like in the MIMO control mode in which the output adjustment is carried out. However, because a negative value cannot be set as the nozzle or valve opening degree, the gain function setting unit 160 sets Kcf=Kcp=Kdp=0, when (1−Vbs(k)−M) becomes negative.

Moreover, when V-flag is not "1", the gain function setting unit 160 determines whether or not E-flag is "−1" (step S351). When E-flag is "−1", the gain function setting unit 160 determines whether or not ED-flag is "−1", in other words, the EGR valve is controlled in the closing direction (step S353). When such a condition is satisfied, the control system operates like in the MIMO control mode in which the output adjustment is carried out. Namely, along the gain function in the left side of the FIG. 35, the gain function setting unit 160 sets Kcf=Kcp=Kdf=$E_{-1,-1}$(Ebs(k)) and Kdp=1 (step S355).

$E_{-1,-1}$(Ebs(k)) is a function defined as follows:

$$E_{-1,-1}(Ebs(k)) = \frac{1}{1 + e^{-\left(\frac{2S}{N}Ebs(k)-S\right)}} \tag{14}$$

Thus, along the sigmoid function in the left side of the FIG. 35, a value is calculated according to the reference value Ebs(k) of the EGR valve opening degree. Incidentally, in case of Ebs(k)=0, the control mode is the SISO control mode of the EGR completely closing region B.

On the other hand, when ED-flag is not "−1", namely, ED-flag is "1" and the EGR valve is controlled in the opening direction, the gain function setting unit 160 sets Kcf=Kcp=Kdf=$E_{-1,1}$(Ebs(k)) and Kdp=1 (step S357).

$E_{-1,1}$(Ebs(k)) is a function defined as follows:

$$E_{-1,1}(Ebs(k)) = \frac{1}{1 + e^{-\left(\frac{2S}{N}(Ebs(k)-M)-S\right)}} \tag{15}$$

Thus, in the left of FIG. 35, along the sigmoid function that is shifted toward the right by the width M of the hysteresis, a value is calculated according to the reference value Ebs(k) of the EGR valve opening degree. By doing so, the control system operates like in the MIMO control mode in which the output adjustment is carried out. However, because a negative value cannot be set as the nozzle or valve opening degree, the gain function setting unit 160 sets Kcf=Kcp=Kdf=0, when (Ebs(k)−M) becomes negative.

Furthermore, when E-flag is not "−1", the gain function setting unit 160 determines whether or not E-flag is "1" (i.e. the EGR valve is completely opened.) (step S359). When E-flag is "1", the gain function setting unit 160 determines whether or not ED-flag is "1", namely, the EGR valve is controlled in the opening direction (step S361). When such a condition is satisfied, the control system operates like in the MIMO control mode in which the output adjustment is carried out. Namely, along the gain function of FIG. 35, the gain function setting unit 160 sets Kcf=Kcp=Kdf=$E_{1,1}$(Ebs(k)) and Kdp=1 (step S363).

$E_{1,1}$(Ebs(k)) is a function defined as follows:

$$E_{1,1}(Ebs(k)) = \frac{1}{1 + e^{-\left(-\frac{2S}{N}Ebs(k)+\frac{2-N}{N}S\right)}} \tag{16}$$

Thus, along the sigmoid function in the right side of FIG. 35, a value is calculated according to the reference value Ebs(k) of the EGR valve opening degree. Incidentally, in case of Ebs(k)=1, the control mode is the SISO control mode of the EGR completely opening region E, and Kcf=Kcp=Kdf=0

On the other hand, when ED-flag is not "1", in other words, the EGR valve opening degree is controlled in the closing direction, the gain function setting unit 160 sets Kcf=Kcp=Kdf=$E_{1,-1}$(Ebs(k)) and Kdp=1 (step S365).

$E_{1,-1}$(Ebs(k)) is a function defined as follows:

$$E_{1,-1}(Ebs(k)) = \frac{1}{1 + e^{-\left(-\frac{2S}{N}(Ebs(k)-M) + \frac{2-N}{N}S\right)}} \quad (17)$$

Thus, in the right side of FIG. 35, along the sigmoid function that is shifted toward the left by the width M of the hysteresis, a value is calculated according to the reference value Ebs(k) of the EGR valve opening degree. By doing so, the control system operates like in the MIMO control mode in which the output adjustment is carried out. However, because a negative value cannot be set as the nozzle or valve opening degree, the gain function setting unit 160 sets Kcf=Kcp=Kdf=0, when (1–Ebs(k)–M) becomes negative.

After the step S329, the MAF controller 120 calculates a control value according to the difference between the MAF target value and the measurement value of the MAF, and the first interference compensator 150 calculates a compensation value according to the difference between the MAP target value and the measurement value of the MAP. Then, the sum of the control value from the MAF controller 120, the compensation value from the first interference compensator 150 and Ebs(k) is calculated as the EGR valve opening degree Ein, and the EGR valve of the engine body 1 is controlled according to the Ein. Moreover, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the control value from the MAP controller 140, the compensation value from the second interference compensator 130 and Vbs(k) is calculated as the VNT nozzle opening degree Vin, and the VNT nozzle of the engine body 1 is controlled according to the Vin.

Moreover, after the step S333, Ebs(k) is adopted as the EGR valve opening degree Ein, and the EGR valve of the engine body 1 is controlled according to the Ein. In addition, Vbs(k) is adopted as the VNT nozzle opening degree Vin, and the VNT nozzle of the engine body 1 is controlled according to the Vin.

Furthermore, after the steps S339, S341, S347, S349, S355, S357, S363 and S365, the MAF controller 120 calculates a control value according to the difference between the MAF target value and the measurement value of the MAF, and the first interference compensator 150 calculates a compensation value according to the difference between the MAP target value and the measurement value of the MAP. Then, the sum of the product of the control value from the MAF controller 120 and Kdf, the product of the compensation value from the first interference compensator 150 and Kcp, and Ebs(k) is calculated as the EGR valve opening degree Ein, and the EGR valve of the engine body 1 is controlled according to the Ein. Moreover, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the product of the control value from the MAP controller 140 and Kdp, the product of the compensation value from the second interference compensator 130 and Kcf, and Vbs(k) is calculated as the VNT nozzle opening degree Vin, and the VNT nozzle of the engine body 1 is controlled according to the Vin.

When it is determined that the condition of the step S359 is not satisfied, or after the step S347, S349, S355, S357, S363 or S365, the processing returns to the processing of FIG. 36 through a terminal F.

After shifting through the terminal F in FIG. 36, or after the step S329, S333, S339 or S341, k is incremented by "1" (step S367), and the processing returns to the step S323. Such a processing is carried out until the engine body 1 is stopped.

By adjusting the gain elements in this way, the chattering can effectively be prevented when the control system operates in a boundary portion of the control modes. Especially, because the hysteresis characteristic is introduced, the stable control can be realized.

Specific Example 8 of Embodiment 2

Figure 38:
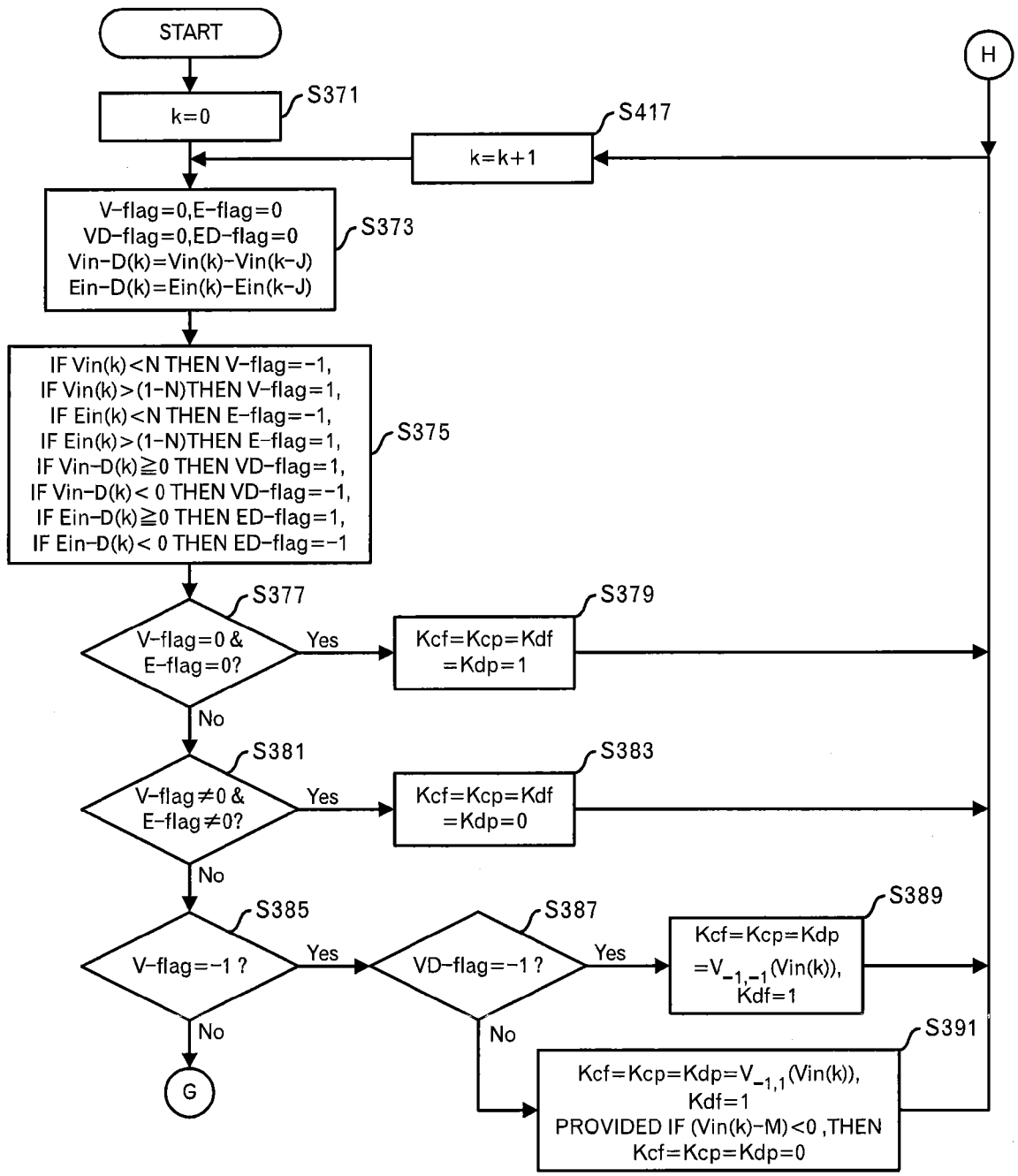
FIG. 38 is a diagram depicting a processing flow in a specific example 8 of the embodiment 2.
Figure 39:
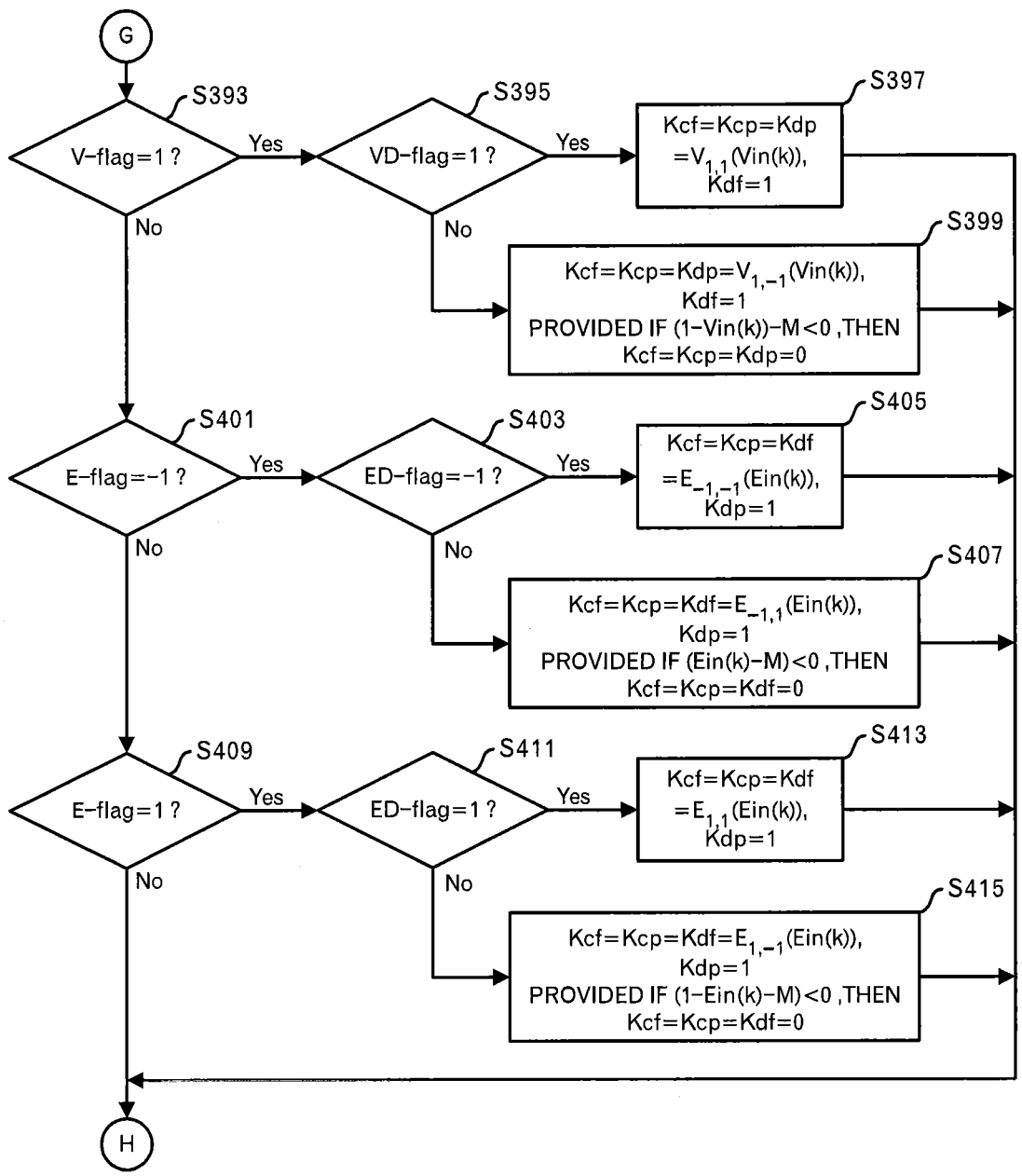
FIG. 39 is a diagram depicting a processing flow in the specific example 8 of the embodiment 2.

This specific example also adopts the gain function as illustrated in FIG. 35 similarly to the seventh specific example. In order to realize this function, in this specific example, the gain function setting unit 170 and the like in the block diagram illustrated in FIG. 16 carry out a processing as illustrated in FIGS. 38 and 39. First, time k is initialized to "0" (step S371). Time k is the common time in the engine control apparatus 100.

Next, the gain function setting unit 170 sets "0" to V-flag representing a state of the opening or closing of the VNT nozzle, sets "0" to E-flag representing a state of the opening or closing of the EGR valve, sets "0" to VD-flag representing whether the state is a state that the VNT nozzle is controlled in the opening direction or a state that the VNT nozzle is controlled in the closing direction, and sets "0" to ED-flag representing the state is a state that the EGR valve is controlled in the opening direction or a state that the EGR valve is controlled in the closing direction. Furthermore, the gain function setting unit 170 sets (Vin(k)–Vin(k–J)) to Vin–D(k), and sets (Ein(k)–Ein(k–J)) to Ein–D(k) (step S373). Vin(k–J) is a VNT nozzle opening degree Vin before J (e.g. from about 1 to about 10) samples. Similarly, Ein(k–J) is an Ein value before the J samples. Namely, Vin–D(k) represents a state of the VNT nozzle, is a difference with Vin value before the J samples, and represents the closing direction when Vin–D(k) is a negative value and represents the opening direction when Vin–D(k) is a positive value. Namely, Ein–D(k) represents a state of the EGR valve, is a difference with Ein value before the J samples, and represents the closing direction when Ein–D (k) is a negative value and represents the opening direction when Ein–D(k) is a positive value.

Then, when the VNT nozzle opening degree Vin(k) is less than N (e.g. N is a value from about 0.1 to about 0.15, and is a constant defining a range considered as being completely closed or completely opened.) (i.e. in a state of "completely closed".), the gain function setting unit 170 sets "–1" to V-flag. On the other hand, when Vin(k) is greater than (1–N) (i.e. in a completely-opened state.), the gain function setting unit 170 sets "1" to V-flag. In addition, the gain function setting unit 170 sets "–1" to E-flag, when the EGR valve opening degree Ein(k) is less than N (i.e. in a completely-closed state.). On the other hand, when Ein(k) is greater than (1–N) (i.e. in a completely opened state.) the gain function setting unit 170 sets "1" to E-flag. Furthermore, when Vin–D(k) is equal to or greater than 0 (i.e. in the opening direction), the gain function setting unit 170 sets "1" to VD-flag, and when Vin–D(k) is less than 0 (i.e. in the closing direction), the gain function setting unit 170 sets "–1" to VD-flag.

Moreover, when Ein–D(k) is equal to or greater than 0 (i.e. in the opening direction), the gain function setting unit 170 sets "1" to ED-flag, and when Ein–D(k) is less than 0 (i.e. in the closing direction), the gain function setting unit 170 sets "–1" to ED-flag (step S375). Thus, when Vin(k) is equal to or greater than N and equal to or less than (1–N), V-flag remains "0", and similarly when Ein(k) is equal to or greater than N and equal to or less than (1–N), E-flag remains "0".

After that, the gain function setting unit 170 determines whether or not the state is a state that V-flag is "0" and E-flag also is "0" (step S377). When such a condition is satisfied, the control mode is the MIMO control mode. Therefore, the gain function setting unit 170 sets Kcf=Kcp=Kdf=Kdp=1 as illustrated in FIG. 17 (step S379).

On the other hand, when at least either of V-flag and E-flag is not "0", the gain function setting unit 170 determines whether or not the state is a state that V-flag is not "0" and E-flag also is not "0" (step S381). When such a condition is satisfied, the control mode is the SISO control mode of the VNT and EGR completely closing region D (i.e. a state that both of them are either completely opened or completely closed.), the gain function setting unit 170 sets Kcf=Kcp=Kdf=Kdp=0 as illustrated in FIG. 18 (step S383).

In addition, when either of V-flag and E-flag is not "0", the gain function setting unit 170 determines whether or not V-flag is "–1" (i.e. the VNT nozzle is completely-closed.) (step S385). When V-flag is "–1", the gain function setting unit 170 further determines whether or not VD-flag is "–1" (i.e. the VNT nozzle is controlled in the closing direction) (step S387). When such a condition is satisfied, the control system operates like in the MIMO control mode in which the output adjustment is carried out. Namely, according to the gain function of FIG. 35, the gain function setting unit 170 sets Kcf=Kcp=Kdp=V$_{-1,-1}$(Vin(k)) and Kdf=1 (step S389).

V$_{-1,-1}$(Vin(k)) is a function defined as follows:

$$V_{-1,-1}(Vin(k)) = \frac{1}{1 + e^{-\left(\frac{2S}{N} Vin(k) - S\right)}} \quad (18)$$

Thus, along the sigmoid function in the left side of FIG. 35, a value is calculated according to the VNT nozzle opening degree Vin(k). Incidentally, in case of Vin(k)=0, the control mode is the SISO control mode of the VNT completely closing region C.

On the other hand, when VD-flag is not "–1", VD-flag is "1" (i.e. the VNT nozzle is controlled in the opening direction). Therefore, the gain function setting unit 170 sets Kcf=Kcp=Kdp=V$_{-1,1}$(Vin(k)) and Kdf=1 (step S391).

V$_{-1,1}$(Vin(k)) is a function defined as follows:

$$V_{-1,1}(Vin(k)) = \frac{1}{1 + e^{-\left(\frac{2S}{N}(Vin(k)-M)-S\right)}} \quad (19)$$

Thus, in the left side of FIG. 35, along the sigmoid function that is shifted toward the right by the width M of the hysteresis, a value is calculated according to the VNT nozzle opening degree Vin(k). In addition, when such a condition is satisfied, the control system operates like in the MIMO control mode in which the output adjustment is carried out. However, because a negative value cannot set as the nozzle or valve opening degree, the gain function setting unit 170 sets Kcf=Kcp=Kdp=0, when (Vin(k)–M) becomes negative.

When V-flag is not "–1", the processing shifts to a processing of FIG. 39 through a terminal G.

Shifting to the explanation of the processing of FIG. 39, when V-flag is not "–1", the gain function setting unit 170 determines whether or not V-flag is "1" (i.e. VNT nozzle is completely-opened.) (step S393). When V-flag is "1", the gain function setting unit 170 determines whether or not VD-flag is "1", in other words, the VNT nozzle is controlled in the opening direction (step S395). When such a condition is satisfied, the control system operates like in the MIMO control mode in which the output adjustment is carried out. Namely, along the gain function of FIG. 35, the gain function setting unit 170 sets Kcf=Kcp=Kdp=V$_{1,1}$(Vin(k)) and Kdf=1 (step S397).

V$_{1,1}$(Vin(k)) is a function defined as follows:

$$V_{1,1}(Vin(k)) = \frac{1}{1 + e^{-\left(-\frac{2S}{N} Vin(k) + \left(\frac{2-N}{N}\right)S\right)}} \quad (20)$$

Thus, along the sigmoid function in the right side of FIG. 35, a value is calculated according to the VNT nozzle opening degree Vin(k). Incidentally, in case of Vin(k)=1, the control mode is the SISO control mode of the VNT completely opening region F, and Kcf=Kcp=Kdp=0.

On the other hand, when VD-flag is not "1", in other words, the VNT nozzle is controlled in the closing direction, the gain function setting unit 170 sets Kcf=Kcp=Kdp=V$_{1,-1}$(Vin(k)) and Kdf=1 (step S399).

V$_{1,-1}$(Vin(k)) is a function defined as follows:

$$V_{1,-1}(Vin(k)) = \frac{1}{1 + e^{-\left(-\frac{2S}{N} Vin(k) - M\right) + \left(\frac{2-N}{N}\right)S}} \quad (21)$$

Thus, in the right side of FIG. 35, along the sigmoid function that is shifted toward the left by the width M of the hysteresis, a value is calculated according to the VNT nozzle opening degree Vin(k). By doing so, the control system operates like in the MIMO control mode in which the output adjustment is carried out. However, because a negative value cannot be set as the nozzle or valve opening degree, the gain function setting unit 170 sets Kcf=Kcp=Kdp=0, when (1–Vin(k)–M) becomes negative.

In addition, when V-flag is not "1", the gain function setting unit 170 determines whether or not E-flag is "–1" (step S401). When E-flag is "–1", the gain function setting unit 170 determines whether or not ED-flag is "–1", in other words, the EGR valve is controlled in the closing direction (step S403). When such a condition is satisfied, the control system operates like in the MIMO control mode in which the output adjustment is carried out. Namely, along the gain function in the left side of FIG. 35, the gain function setting unit 170 sets Kcf=Kcp=Kdf=E$_{-1,-1}$(Ein(K)) and Kdp=1 (step S405).

E$_{-1,-1}$(Ein(k)) is a function defined as follows:

$$E_{-1,-1}(Ein(k)) = \frac{1}{1 + e^{-\left(\frac{2S}{N} Ein(k) - S\right)}} \quad (22)$$

Thus, along the sigmoid function in the left side of FIG. 35, a value is calculated according to the EGR valve opening degree Ein(k). Incidentally, in case of Ein(k)=0, the control mode is the SISO control mode of the EGR completely closing region B.

On the other hand, when ED-flag is not "−1", in other words, ED-flag is "1" and the EGR valve opening degree is controlled in the opening direction, the gain function setting unit 170 sets Kcf=Kcp=Kdp=$E_{-1,1}$(Ein(k)) and Kdf=1 (step S407).

$E_{-1,1}$(Ein(k)) is a function defined as follows:

$$E_{-1,1}(Ein(k)) = \frac{1}{1+e^{-\left(\frac{2S}{N}(Ein(k)-M)-S\right)}} \quad (23)$$

Thus, in the left side of FIG. 35, along the sigmoid function that is shifted toward the right by the width M of the hysteresis, a value is calculated according to the EGR valve opening degree Ein(k). By doing so, the control system operates like in the MIMO control mode in which the output adjustment is carried out. However, because a negative value cannot be set as the nozzle or valve opening degree, the gain function setting unit 170 sets Kcf=Kcp=Kdf=0, when (Ein(k)−M) becomes negative.

Furthermore, when E-flag is not "−1", the gain function setting unit 170 determines whether or not E-flag is "1" (i.e. the EGR valve is completely-opened.) (step S409). When E-flag is "1", the gain function setting unit 170 determines whether or not ED-flag is "1", in other words, the EGR valve is controlled in the opening direction (step S411). When such a condition is satisfied, the control system operates like in the MIMO control mode in which the output adjustment is carried out. Namely, along the gain function of FIG. 35, the gain function setting unit 170 sets Kcf=Kcp=Kdf=$E_{1,1}$(Ein(k)) and Kcp=1 (step S413).

$E_{1,1}$(Ein(k)) is a function defined as follows:

$$E_{1,1}(Ein(k)) = \frac{1}{1+e^{-\left(-\frac{2S}{N}Ein(k)+\frac{2-N}{N}S\right)}} \quad (24)$$

Thus, along the sigmoid function in the right side of FIG. 35, a value is calculated according to the EGR valve opening degree Ein(k). Incidentally, in case of Ein(k)=1, the control mode is the SISO control mode of the EGR completely opening region E, the gain function setting unit 170 sets Kcf=Kcp=Kdf=0.

On the other hand, when ED-flag is not "1", in other words, when the EGR valve opening degree is controlled in the closing direction, the gain function setting unit 170 sets Kcf=Kcp=Kdf=$E_{1,-1}$(Ein(k)) and Kdp=1 (step S415).

$E_{1,-1}$(Ein(k)) is a function defined as follows:

$$E_{1,-1}(Ein(k)) = \frac{1}{1+e^{-\left(-\frac{2S}{N}(Ein(k)-M)+\frac{2-N}{N}S\right)}} \quad (25)$$

Thus, in the right side of FIG. 35, along the sigmoid function that is shifted toward the left by the width M of the hysteresis, a value is calculated according to the EGR valve opening degree Ein(k). Thus, the control system operates like in the MIMO control mode in which the output adjustment is carried out. However, because a negative value cannot be set as the nozzle or valve opening degree, the gain function setting unit 170 sets Kcf=Kcp=Kdf=0, when (1−Ein(k)−M) becomes negative.

Incidentally, in addition to the aforementioned processing, when setting values of the engine speed and fuel injection quantity at time k are inputted, the planning unit 110 outputs the reference value Vbs(k) of the VNT nozzle opening degree and the reference value Ebs(k) of the EGR valve opening degree, which correspond to the setting values of the engine speed and the fuel injection quantity at time k. Furthermore, the planning unit 110 similarly outputs the MAF target value to the MAF control system including the MAF controller 120, and outputs the MAP target value to the MAP control system including the MAP controller 140.

Then, after the step S379, the MAF controller 120 calculates a control value according to the difference between the MAF target value and the measurement value of the MAF, and the first interference compensator 150 calculates a compensation value according to the difference between the MAP target value and the measurement value of the MAP. Then, the sum of the control value from the MAF controller 120, the compensation value from the first interference compensator 150 and Ebs(k) is calculated as the EGR valve opening degree Ein (k+1), and the EGR valve of the engine body 1 is controlled according to the Ein(k+1). In addition, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the control value from the MAP controller 140, the compensation value from the second interference compensator 130 and Vbs(k) is calculated as the VNT nozzle opening degree vin(k+1) and the VNT nozzle of the engine body 1 is controlled according to the Vin(k+1).

Moreover, after the step S383, Ebs(k) is adopted as the EGR valve opening degree Ein(k+1), and the EGR valve of the engine body 1 is controlled according to the Ein(k+1). In addition, Vbs(k) is adopted as the VNT nozzle opening degree Vin(k+1), and the VNT nozzle of the engine body 1 is controlled according to the Vin(k+1).

Furthermore, after the steps S389, S391, S397, S399, S405, S407, S413 and S415, the MAF controller 120 calculates a control value according to the difference MAF target value and the measurement value of the MAF, and the first interference compensator 150 calculates a compensation value according to the difference between the MAP target value and the measurement value of the MAP. Then, the sum of the product of the control value from the MAF controller 120 and Kdf, the product of the compensation value from the first interference compensator 150 and Kcp, and Ebs(k) is calculated as the EGR valve opening degree Ein, and the EGR valve of the engine body 1 is controlled according to the Ein. Moreover, the MAP controller 140 calculates a control value according to the difference between the MAP target value and the measurement value of the MAP, and the second interference compensator 130 calculates a compensation value according to the difference between the MAF target value and the measurement value of the MAF. Then, the sum of the product of the control value from the MAP controller 140 and Kdp, the product of the compensation value from the second interference compensator 130 and Kcf, and Vbs(k) is calculated according to the VNT nozzle opening degree Vin, and the VNT nozzle of the engine body 1 is controlled according to the Vin.

When it is determined that the condition of the step S409 is not satisfied, the processing returns to the processing of FIG. 38 through a terminal H, after the steps S397, S399, S405, S407, S413 and S415.

After shifting through the terminal H in FIG. 38, or after the step S379, S383, S389 or S391, k is incremented by "1" (step S417), and the processing returns to the step S373. Such a processing is carried out until the engine body 1 is stopped.

By adjusting the gain elements in this way, the chattering can effectively be prevented when the control system operates in a boundary portion of the control mode. Especially, because the hysteresis characteristic is introduced, the stable control can be realized.

Although the embodiments of this technique were explained, this technique is not limited to the embodiments. For example, the block diagrams illustrated in FIGS. 10 and 16 are mere examples, and for example, when the control is carried out only to set "1" or "0" as the gain elements, the processing may be switched without introducing the gain elements.

Furthermore, the aforementioned processing flows are mere examples, and an order of the condition determination and corresponding processing may be exchanged, as long as the substantially the same functions are realized.

Incidentally, although the explanation is omitted above, values of Vbs, Ebs, Vin, Ein and the like at respective times is stored and used in the storage device, such as a main memory.

In addition, even when a nozzle turbo of a direct-injection gasoline engine becomes variable, this technique can be applied.

Figure 40:
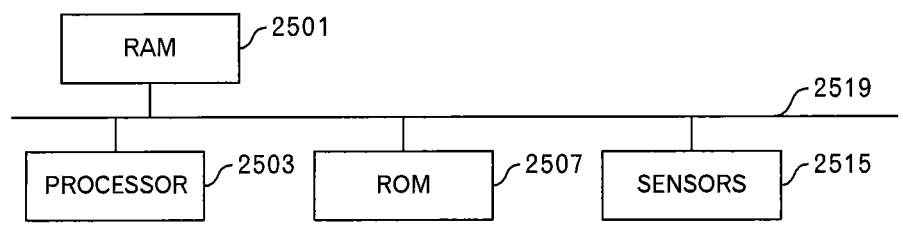
FIG. 40 is a functional block diagram of a computer.

Incidentally, the engine control apparatus 100 as depicted in FIG. 40 is a computer apparatus. That is, a Random Access memory (RAM) 2501, a processor 2503, a Read Only Memory (ROM) 2507 and sensors 2515 are connected through a bus 2519 as shown in FIG. 40. A control program for carrying out the processing in the embodiment (and an Operating System (OS) if it exists) is stored in the ROM 2507, and when executed by the processor 2503, they are read out from the ROM 2507 to the RAM 2501. The processor 2503 controls the sensors (MAP sensor and MAF sensor. According to circumstances, injection quantity measurement unit and engine speed measurement unit), and obtains measurement values. In addition, intermediate processing data is stored in the RAM 2501. Incidentally, the processor 2503 may include the ROM 2507, and may further include the RAM 2501. In this embodiment, the control program for carrying out the aforementioned processing may be distributed by a computer-readable storage removable disk in which the control program is recorded, and the control program may be written into the ROM 2507 by a ROM writer. In the computer apparatus as stated above, the hardware such as the processor 2503 and RAM 2501 and the ROM 2507 and the control program (and OS if it exists) systematically cooperate with each other, so that various functions as described above in details are realized.

The aforementioned embodiments are summarized as follows:

An engine control method according to the embodiments includes: (A) obtaining a setting value of a fuel injection quantity for an engine having an exhaust gas recirculator (EGR) and a variable nozzle turbo (VNT), a setting value of an engine speed, a measurement value of a manifold air pressure (MAP) of the engine and a measurement value of a mass air flow (MAF) of the engine; and (B) controlling a MAF control system of the engine, a MAP control system of the engine, a first interference compensation system from the MAF control system to the MAP control system and a second interference compensation system from the MAP control system to the MAF control system according to a combination of a reference value of an EGR valve opening degree and a reference value of a VNT nozzle opening degree which correspond to the setting value of the fuel injection quantity and the setting value of the engine speed or a combination of a control value of the EGR valve opening degree by the MAF control system, which corresponds to the measurement value of the MAF, and a control value of the VNT nozzle opening degree by the MAP control system, which corresponds to the measurement value of the MAP. Then, the controlling includes (B1) upon detecting that both of a first condition and a second condition are not satisfied, enabling the MAP control system, the MAP control system, the first interference compensation system and the second interference compensation system, wherein the first condition is a condition that the reference value or the control value of the EGR valve opening degree is within a range considered as being completely closed or completely opened, and the second condition is a condition that the reference value or the control value of the VNT nozzle opening degree is within a range considered as being completely closed or completely opened; (B2) upon detecting that the first condition is satisfied and the second condition is not satisfied, disabling the MAF control system, the first interference compensation system and the second interference compensation system or adjusting outputs of the MAF control system, the first interference compensation system and the second interference compensation system, and enabling the MAP control system; and (B3) upon detecting that the second condition is satisfied and the first condition is not satisfied, disabling the MAP control system, the first interference compensation system and the second interference compensation system or adjusting outputs of the MAP control system, the first interference compensation system and the second interference compensation system, and enabling the MAF control system.

By carrying out such switching of operation modes, it becomes possible to reduce the emission.

Moreover, the MAP control system, MAF control system and first and second interference compensation systems may have a gain element. In such a case, in the aforementioned controlling, a value of, the gain element may be respectively set to carry out the enabling, the disabling or the output adjusting.

Thus, it is possible to carry out the switching of the operation modes, easily.

Furthermore, the aforementioned output adjusting may be carried out by using an output value of a function of the reference value or the control value of the EGR valve opening degree or the reference value or the control value of the VNT nozzle opening degree, and the function may output a value greater than 0 and less than 1.

By appropriately carrying out the output adjustment, the stability is improved compared with the simple switching of the operation modes.

In addition, the aforementioned function may be a linear function or a sigmoid function. When such a function is adopted, the values change smoothly. Therefore, the stable control is possible.

Furthermore, the linear function or the sigmoid function may be defined as a hysteresis function that outputs a different value between a direction of opening the VNT nozzle or the EGR valve and a direction of closing the VNT nozzle or the EGR valve. By doing so, it becomes possible to stably control the engine.

In addition, the aforementioned controlling may further include: upon detecting that the first condition and the second condition are satisfied, disabling the MAP control system, the MAF control system, the first interference compensation system and the second interference compensation system. It is possible to cope with a case where such a phenomena occurs.

Figure 41:
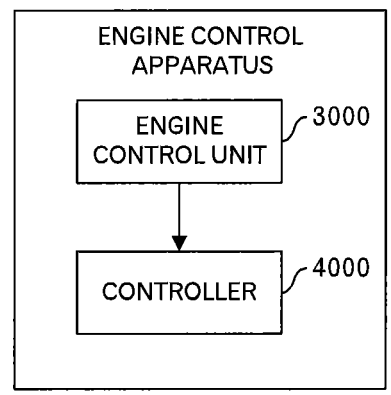
FIG. 41 is a functional block diagram of an engine control apparatus.

This engine control apparatus has (A) a data obtaining unit (FIG. 41: 3000) to obtain a measurement value of a manifold air pressure (MAP) of an engine having an exhaust gas recirculator (EGR) and a variable nozzle turbo (VNT), and a measurement value of a mass air flow (MAF) of the engine; and a controller (FIG. 41: 4000) to control a MAF control system of the engine, a MAP control system of the engine, a first interference compensation system from the MAF control system to the MAP control system and a second interference compensation system from the MAP control system to the MAF control system according to a combination of a reference value of an EGR valve opening degree and a reference value of a VNT nozzle opening degree, which correspond to a setting value of a fuel injection quantity and a setting value of an engine speed or a combination of a control value of the EGR valve opening degree by the MAF control system, which corresponds to the measurement value of the MAF, and a control value of the VNT nozzle opening degree by the MAP control system, which corresponds to the measurement value of the MAP.

Then, (B1) upon detecting that both of a first condition and a second condition are not satisfied, the controller enables the MAP control system, the MAP control system, the first interference compensation system and the second interference compensation system, wherein the first condition is a condition that the reference value or the control value of the EGR valve opening degree is within a range considered as being completely closed or completely opened, and the second condition is a condition that the reference value or the control value of the VNT nozzle opening degree is within a range considered as being completely closed or completely opened. Moreover, (B2) upon detecting that the first condition is satisfied and the second condition is not satisfied, the controller disables the MAF control system, the first interference compensation system and the second interference compensation system or adjusting outputs of the MAF control system, the first interference compensation system and the second interference compensation system, and enabling the MAP control system. Furthermore, (B3) upon detecting that the second condition is satisfied and the first condition is not satisfied, the controller disables the MAP control system, the first interference compensation system and the second interference compensation system or adjusting outputs of the MAP control system, the first interference compensation system and the second interference compensation system, and enabling the MAF control system.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

What is claimed is:

1. An engine control method comprising:
obtaining a setting value of a fuel injection quantity for an engine having an exhaust gas recirculator (EGR) and a variable nozzle turbo (VNT), a setting value of an engine speed, a measurement value of a manifold air pressure (MAP) of the engine and a measurement value of a mass air flow (MAF) of the engine; and
controlling a MAF control system of the engine, a MAP control system of the engine, a first interference compensation system from the MAF control system to the MAP control system and a second interference compensation system from the MAP control system to the MAF control system according to a combination of a reference value of an EGR valve opening degree and a reference value of a VNT nozzle opening degree, which correspond to the setting value of the fuel injection quantity and the setting value of the engine speed or a combination of a control value of the EGR valve opening degree by the MAF control system, which corresponds to the measurement value of the MAF, and a control value of the VNT nozzle opening degree by the MAP control system, which corresponds to the measurement value of the MAP, and
wherein the controlling comprises:
upon detecting that both of a first condition and a second condition are not satisfied, enabling the MAP control system, the MAP control system, the first interference compensation system and the second interference compensation system, wherein the first condition is a condition that the reference value or the control value of the EGR valve opening degree is within a range considered as being completely closed or completely opened, and the second condition is a condition that the reference value or the control value of the VNT nozzle opening degree is within a range considered as being completely closed or completely opened;
upon detecting that the first condition is satisfied and the second condition is not satisfied, disabling the MAF control system, the first interference compensation system and the second interference compensation system or adjusting outputs of the MAF control system, the first interference compensation system and the second interference compensation system, and enabling the MAP control system; and
upon detecting that the second condition is satisfied and the first condition is not satisfied, disabling the MAP control system, the first interference compensation system and the second interference compensation system or adjusting outputs of the MAP control system, the first interference compensation system and the second interference compensation system, and enabling the MAF control system.

2. An engine control apparatus, comprising:
a data obtaining unit to obtain a measurement value of a manifold air pressure (MAP) of an engine having an exhaust gas recirculator (EGR) and a variable nozzle turbo (VNT), and a measurement value of a mass airflow (MAF) of the engine; and
a controller to control a MAF control system of the engine, a MAP control system of the engine, a first interference compensation system from the MAF control system to the MAP control system and a second interference compensation system from the MAP control system to the MAF control system according to a combination of a reference value of an EGR valve opening degree and a reference value of a VNT nozzle opening degree, which correspond to a setting value of a fuel injection quantity and a setting value of an engine speed or a combination of a control value of the EGR valve opening degree by the MAF control system, which corresponds to the measurement value of the MAF, and a control value of the VNT nozzle opening degree by the MAP control system, which corresponds to the measurement value of the MAP, and
wherein, upon detecting that both of a first condition and a second condition are not satisfied, the controller enables the MAP control system, the MAP control system, the first interference compensation system and the second interference compensation system, wherein the first condition is a condition that the reference value or the control value of the EGR valve opening degree is within a range considered as being completely closed or completely opened, and the second condition is a condition that the reference value or the control value of the VNT nozzle opening degree is within a range considered as being completely closed or completely opened;
upon detecting that the first condition is satisfied and the second condition is not satisfied, the controller disables the MAF control system, the first interference compensation system and the second interference compensation system or adjusting outputs of the MAF control system, the first interference compensation system and the second interference compensation system, and enabling the MAP control system; and
upon detecting that the second condition is satisfied and the first condition is not satisfied, the controller disables the MAP control system, the first interference compensation system and the second interference compensation system or adjusting outputs of the MAP control system, the first interference compensation system and the second interference compensation system, and enabling the MAF control system.

3. A computer-readable, non-transitory storage medium storing a program for causing a processor to execute an engine control procedure, the engine control procedure comprising:
obtaining a setting value of a fuel injection quantity for an engine having an exhaust gas recirculator (EGR) and a variable nozzle turbo (VNT), a setting value of an engine speed, a measurement value of a manifold air pressure (MAP) of the engine and a measurement value of a mass air flow (MAF) of the engine; and
controlling a MAF control system of the engine, a MAP control system of the engine, a first interference compensation system from the MAF control system to the MAP control system and a second interference compensation system from the MAP control system to the MAF control system according to a combination of a reference value of an EGR valve opening degree and a reference value of a VNT nozzle opening degree, which correspond to the setting value of the fuel injection quantity and the setting value of the engine speed or a combination of a control value of the EGR valve opening degree by the MAF control system, which corresponds to the measurement value of the MAF, and a control value of the VNT nozzle opening degree by the MAP control system, which corresponds to the measurement value of the MAP, and
wherein the controlling comprises:
upon detecting that both of a first condition and a second condition are not satisfied, enabling the MAP control system, the MAP control system, the first interference compensation system and the second interference compensation system, wherein the first condition is a condition that the reference value or the control value of, the EGR valve opening degree is within a range considered as being completely closed or completely opened, and the second condition is a condition that the reference value or the control value of the VNT nozzle opening degree is within a range considered as being completely closed or completely opened;
upon detecting that the first condition is satisfied and the second condition is not satisfied, disabling the MAF control system, the first interference compensation system and the second interference compensation system or adjusting outputs of the MAF control system, the first interference compensation system and the second interference compensation system, and enabling the MAP control system; and
upon detecting that the second condition is satisfied and the first condition is not satisfied, disabling the MAP control system, the first interference compensation system and the second interference compensation system or adjusting outputs of the MAP control system, the first interference compensation system and the second interference compensation system, and enabling the MAF control system.

4. The computer-readable, non-transitory storage medium as set forth in claim 3, wherein the MAP control system, the MAF control system, the first interference compensation system and the second interference compensation system have a gain element, and
in the controlling, a value of the gain element is respectively set to carry out the enabling, the disabling or the adjusting.

5. The computer-readable, non-transitory storage medium as set forth in claim 3, wherein, the controlling further comprises:
upon detecting that the first condition and the second condition are satisfied, disabling the MAP control system, the MAF control system, the first interference compensation system and the second interference compensation system.

6. The computer-readable, non-transitory storage medium as set forth in claim 3, wherein the adjusting is carried out by using an output value of a function of the reference value or the control value of the EGR valve opening degree or the reference value or the control value of the VNT nozzle opening degree, and the function outputs a value greater than 0 and less than 1.

7. The computer-readable, non-transitory storage medium as set forth in claim 6, wherein the function is a linear function or a sigmoid function.

8. The computer-readable, non-transitory storage medium as set forth in claim 7, wherein the linear function or the sigmoid function is defined as a hysteresis function that outputs a different value between a direction of opening the VNT nozzle or the EGR valve and a direction of closing the VNT nozzle or the EGR valve.

* * * * *

UNITED STATES PATENT AND TRADEMARK OFFICE
CERTIFICATE OF CORRECTION

PATENT NO. : 8,428,849 B2  
APPLICATION NO. : 13/528364  
DATED : April 23, 2013  
INVENTOR(S) : Tsugito Maruyama et al.

Page 1 of 1

It is certified that error appears in the above-identified patent and that said Letters Patent is hereby corrected as shown below:

In the Claims:

Column 48, Line 18, In Claim 1, after "system," delete "the MAP control system,".

Column 48, Line 48, In Claim 2, delete "amass" and insert -- a mass --, therefor.

Column 49, Line 1, In Claim 2, after "system," delete "the MAP control system,".

Column 49, Line 56, In Claim 3, after "system," delete "the MAP control system,".

Column 50, Line 2, In Claim 3, delete "of," and insert -- of --, therefor.

Column 50, Line 34, In Claim 5, delete "wherein," and insert -- wherein --, therefor.

Signed and Sealed this  
Thirteenth Day of August, 2013

Teresa Stanek Rea  
*Acting Director of the United States Patent and Trademark Office*